United States Patent
Song et al.

(10) Patent No.: US 10,609,424 B2
(45) Date of Patent: Mar. 31, 2020

(54) SINGLE-LAYER PROGRESSIVE CODING FOR SUPPORTING MULTI-CAPABILITY HDR COMPOSITION

(71) Applicant: DOLBY LABORATORIES LICENSING CORPORATION, San Francisco, CA (US)

(72) Inventors: Qing Song, Sunnyvale, CA (US); Harshad Kadu, Santa Clara, CA (US); Guan-Ming Su, Fremont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/294,875

(22) Filed: Mar. 6, 2019

(65) Prior Publication Data

US 2019/0281325 A1      Sep. 12, 2019

Related U.S. Application Data

(60) Provisional application No. 62/640,808, filed on Mar. 9, 2018.

(30) Foreign Application Priority Data

Mar. 9, 2018   (EP) .................................... 18161041

(51) Int. Cl.
    *H04N 19/98*   (2014.01)
    *H04N 19/186*  (2014.01)
    (Continued)

(52) U.S. Cl.
    CPC ............ *H04N 19/98* (2014.11); *H04N 19/14* (2014.11); *H04N 19/186* (2014.11);
    (Continued)

(58) Field of Classification Search
    None
    See application file for complete search history.

(56) References Cited

U.S. PATENT DOCUMENTS 8,811,490 B2   8/2014  Su
9,264,681 B2   2/2016  Gish
(Continued)

FOREIGN PATENT DOCUMENTS

WO   2017/201139   11/2017
WO   2018/231968   12/2018

OTHER PUBLICATIONS

Siyeong Lee et al., "Deep Chain HDRI: Reconstructing a High Dynamic Range Image from a Single Low Dynamic Range Image", EEE Journals & Magazines, Year: 2018 , vol. 6, pp. 49913-49924.
(Continued)

*Primary Examiner* — Frederick D Bailey

(57) ABSTRACT

A standard dynamic range (SDR) image is received. Composer metadata of the first level through the N-th level is generated. Composer metadata of the j-th level is generated based on the composer metadata of the first level through (j−1)-th level. The composer metadata of the first level through the composer metadata of the j-th level is to be used for mapping the SDR image to the j-th target image specifically optimized for the j-th reference target display. The SDR image is encoded with the composer metadata of the first level through the k-th level in an output SDR video signal, where 1<=k<=N. A display device renders a display image derived from a composed target image composed from the SDR image based on the composer metadata of the first level through the k-th level in the output SDR video signal.

20 Claims, 12 Drawing Sheets

(51) Int. Cl.
  *H04N 19/14* (2014.01)
  *H04N 19/169* (2014.01)
  *H04N 19/30* (2014.01)
  *H04N 19/463* (2014.01)
(52) U.S. Cl.
  CPC ......... *H04N 19/1887* (2014.11); *H04N 19/30* (2014.11); *H04N 19/463* (2014.11)

(56) References Cited

U.S. PATENT DOCUMENTS

| | | | |
|---|---|---|---|
| 10,080,026 | B2 | 9/2018 | Su |
| 2013/0064462 | A1* | 3/2013 | Ninan ................. H04N 19/46 382/233 |
| 2015/0245044 | A1 | 8/2015 | Guo |
| 2016/0292834 | A1* | 10/2016 | Tsuru ................. G06T 5/009 |
| 2017/0085827 | A1* | 3/2017 | Terada ................. H04N 9/87 |
| 2017/0105042 | A1* | 4/2017 | Toma ................. H04N 5/765 |
| 2017/0295382 | A1 | 10/2017 | Su |
| 2018/0070107 | A1 | 3/2018 | Ramasubramonian |
| 2018/0232867 | A1* | 8/2018 | Park ................. G06T 5/00 |
| 2019/0019277 | A1* | 1/2019 | Chen ................. G06T 5/009 |
| 2019/0082186 | A1* | 3/2019 | Van Der Vleuten ..... H04N 9/67 |
| 2019/0110054 | A1 | 4/2019 | Su |
| 2019/0130542 | A1* | 5/2019 | Tichelaar ................. G06T 5/007 |
| 2019/0172421 | A1* | 6/2019 | Eto ................. G09G 5/10 |
| 2019/0266710 | A1* | 8/2019 | Oya ................. H04N 9/64 |

OTHER PUBLICATIONS

ITU-R BT.1886 "Reference Electro-Optical Transfer Function for Flat Panel Displays Used in HDTV Studio Production" Mar. 2011.
SMPTE ST 2084:2014 "High Dynamic Range EOTF of Mastering Reference Displays".

* cited by examiner

SINGLE-LAYER PROGRESSIVE CODING FOR SUPPORTING MULTI-CAPABILITY HDR COMPOSITION

CROSS-REFERENCE TO RELATED APPLICATIONS

This application claims the benefit of priority from U.S. Provisional Patent Application No. 62/640,808 and European Application No. 18161041.1 both filed Mar. 9, 2018, which are hereby incorporated by reference in their entirety.

TECHNOLOGY

The present invention relates generally to images. More particularly, an embodiment of the present invention relates to single-layer progressive coding for supporting multi-capability high dynamic range composition.

BACKGROUND

As used herein, the term "dynamic range" (DR) may relate to a capability of the human visual system (HVS) to perceive a range of intensity (e.g., luminance, luma) in an image, e.g., from darkest blacks (darks) to brightest whites (highlights). In this sense, DR relates to a "scene-referred" intensity. DR may also relate to the ability of a display device to adequately or approximately render an intensity range of a particular breadth. In this sense, DR relates to a "display-referred" intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 or more orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus while perhaps somewhat narrower in relation to true scene referred HDR, EDR nonetheless represents a wide DR breadth and may also be referred to as HDR.

In practice, images comprise one or more color components (e.g., luma Y and chroma Cb and Cr) of a color space, where each color component is represented by a precision of n-bits per pixel (e.g., n=8). Using linear luminance coding, images where $n \leq 8$ (e.g., color 24-bit JPEG images) are considered images of standard dynamic range, while images where $n > 8$ may be considered images of enhanced dynamic range.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (March 2011), which is incorporated herein by reference in its entirety, defines the reference EOTF for flat panel displays. Given a video stream, information about its EOTF is typically embedded in the bitstream as metadata. As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

Displays that support luminance of 200 to 1,000 cd/m² or nits typify a lower dynamic range (LDR), also referred to as a standard dynamic range (SDR), in relation to EDR (or HDR). EDR content may be displayed on EDR displays that support higher dynamic ranges (e.g., from 1,000 nits to 5,000 nits or more). Such displays may be defined using alternative EOTFs that support high luminance capability (e.g., 0 to 10,000 nits). An example of such an EOTF is defined in SMPTE ST 2084:2014 "High Dynamic Range EOTF of Mastering Reference Displays" (hereinafter "SMPTE"), which is incorporated herein by reference in its entirety. As appreciated by the inventors here, improved techniques for encoding and decoding video data that can be used to support display capabilities of a wide variety of SDR and HDR display devices are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1A:
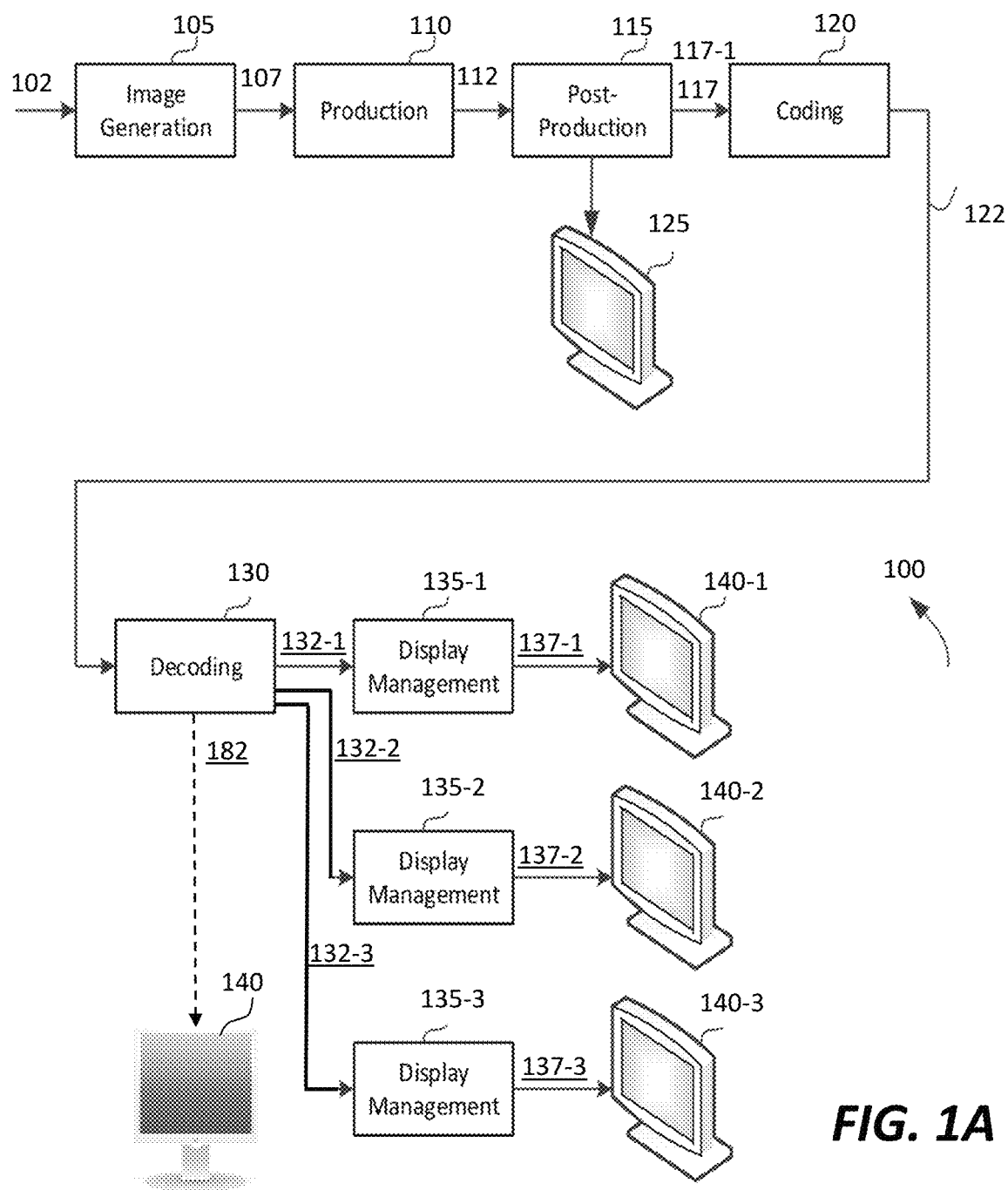
FIG. 1A depicts an example process of a video delivery pipeline.

Single-layer progressive coding (SLPC) for supporting multi-capability HDR composition is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to encoding video data with SLPC related image metadata. A standard dynamic range (SDR) image is received. Composer metadata of the first level through composer metadata of the N-th level is generated, where N is a positive integer greater than one (1). Composer metadata of the i-th level in the composer metadata of the first level through the composer metadata of the N-th level is generated jointly (concurrently) or sequentially with (e.g., no later than, etc.) composer metadata of the j-th level in the composer metadata of the first level through the composer metadata of the N-th level, where $1<=i<j<=N$. The composer metadata of the j-th level is generated dependent and based on the composer metadata of the first level through composer metadata of $(j-1)$-th level, where i and j are positive integers. The composer metadata of the first level through the composer metadata of the i-th level in the composer metadata of the first level through the composer metadata of the N-th level is to be used for mapping the SDR image to the i-th target image specifically optimized for the i-th reference target display in N different reference target displays. Generally speaking, the N different reference target displays may have different target dynamic ranges (e.g., ranging from a relatively narrow dynamic range such as one comparable with the standard dynamic range to a relatively high dynamic range such as the highest dynamic range among multiple high dynamic ranges) from each other. The composer metadata of those levels higher than the i-th level (i.e., the composer metadata of the (i+1)-th level through the composer metadata of the N-th level) in the composer metadata of the first level through the composer metadata of the N-th level may be generally not used for mapping the SDR image to the i-th target image specifically optimized for the i-th reference target display in N different reference target displays. In other words, the composer metadata of those levels higher than the i-th level (i.e., the composer metadata of the (i+1)-th level through the composer metadata of the N-th level) may be typically not required for mapping the SDR image to the i-th target image specifically optimized for the i-th reference target display in N different reference target displays. The composer metadata of the first level through the composer metadata of the j-th level in the composer metadata of the first level through the composer metadata of the N-th level is to be used for mapping the SDR image to the j-th target image specifically optimized for the j-th reference target display in the N different reference target displays. That is to say, the composer metadata of those levels higher than the j-th level (i.e., the composer metadata of the (j+1)-th level through the composer metadata of the N-th level) in the composer metadata of the first level through the composer metadata of the N-th level may be generally not used for mapping the SDR image to the j-th target image specifically optimized for the j-th reference target display in N different reference target displays. In other words, the composer metadata of those levels higher than the j-th level (i.e., the composer metadata of the (j+1)-th level through the composer metadata of the N-th level) may be typically not required for mapping the SDR image to the j-th target image specifically optimized for the j-th reference target display in N different reference target displays. The SDR image is encoded with the composer metadata of the first level through composer metadata of the k-th level in the composer metadata of the first level through the composer metadata of the N-th level in an output SDR video signal, where $1<=k<=N$, where k is a positive integer. The composer metadata of the first level through the composer metadata of the k-th level is progressively encoded from the first level to the k-th level in the output signal. A display device operating with a receiver of the output SDR video signal is caused to render a display image. The display image is derived from a composed target image composed from the SDR image based on the composer metadata of the first level through the composer metadata of the k-th level in the output SDR video signal.

Generally speaking, the composer metadata (all or a part thereof) is used for mapping a source image (e.g., an SDR image) or even multiple source images to one or more corresponding target images (e.g., one or more target HDR images specifically optimized for respective reference target displays). That is to say, the composer metadata (or in some cases also called backward reshaping mappings) can be used by for example downstream decoders to perform backward reshaping (e.g., inverse tone mapping, etc.) on one or more SDR images in order to generate backward reshaped images that may be optimized for rendering on one or more (target) HDR reference displays. Furthermore, the mapping (backward reshaping) of the SDR images to the target images may generally refer to image processing operations that can convert images (i.e., SDR images) back to the original EOTF domain (e.g., gamma or PQ), for further downstream processing, such as the display management, etc. By way of example but not limitation, the mapping may refer to image processing operations that take each of the pixels (or codewords) of the image in the SDR range and map them to the corresponding pixels (or codewords) in the HDR range.

Example embodiments described herein relate to decoding video data with SLPC related image metadata. A standard dynamic range (SDR) video signal that is encoded with an SDR image and composer metadata of the first level through composer metadata of the k-th level in the composer metadata of the first level through composer metadata of the N-th level is received, where N is a positive integer greater than one (1), where $1<=k<=N$, where k is a positive integer. The composer metadata of the first level through the composer metadata of the k-th level is progressively encoded from the first level to the k-th level in the received signal. The composer metadata of the first level through the composer metadata of the N-th level was generated by an upstream video encoder. Composer metadata of the i-th level in the composer metadata of the first level through the composer metadata of the N-th level was generated by the upstream video encoder jointly (concurrently) or sequentially with (e.g., no later than, etc.) composer metadata of the j-th level in the composer metadata of the first level through the composer metadata of the N-th level, where $1<=i<j<=N$, where i and j are positive integers. The composer metadata of the j-th level was generated by the upstream video encoder dependent and based on the composer metadata of the first level through composer metadata of $(j-1)$-th level. The composer metadata of the first level through the composer metadata of the i-th level in the composer metadata of the first level through composer metadata of the N-th level is to be used for mapping the SDR image to the i-th target image specifically optimized for the i-th reference target display in N different reference target displays. Generally speaking, the N different reference target displays may have different target dynamic ranges (e.g., ranging from a relatively narrow dynamic range such as one comparable with the standard dynamic range to a relatively high dynamic range such as the highest dynamic range among multiple high dynamic ranges) from each other. The composer metadata of those levels higher than the i-th level (i.e., the composer metadata of the (i+1)-th level through the composer metadata of the N-th level) in the composer metadata of the first level through the composer metadata of the N-th level may be generally not used for mapping the SDR image to the i-th target image specifically optimized for the i-th reference target display in N different reference target displays. In other words, the composer metadata of those levels higher than the i-th level (i.e., the composer metadata of the (i+1)-th level through the composer metadata of the N-th level) may be typically not required for mapping the SDR image to the i-th target image specifically optimized for the i-th reference target display in N different reference target displays. The composer metadata of the first level through the composer metadata of the j-th level in the composer metadata of the first level through composer metadata of the N-th level is to be used for mapping the SDR image to the j-th target image specifically optimized for the j-th reference target display in the N different reference target displays. That is to say, the composer metadata of those levels higher than the j-th level (i.e., the composer metadata of the (j+1)-th level through the composer metadata of the N-th level) in the composer metadata of the first level through the composer metadata of the N-th level may be generally not used for mapping the SDR image to the j-th target image specifically optimized for the j-th reference target display in N different reference target displays. In other words, the composer metadata of those levels higher than the j-th level (i.e., the composer metadata of the (j+1)-th level through the composer metadata of the N-th level) may be typically not required for mapping the SDR image to the j-th target image specifically optimized for the j-th reference target display in N different reference target displays. The composer metadata of the first level through the composer metadata of the k-th level is used to map the SDR image to a composed target image optimized for the k-th reference target display in the N different reference target displays. A display device operating with a receiver of the SDR video signal is caused to render a display image. The display image is derived from a composed target image composed from the SDR image based on the composer metadata of the first level through composer metadata of the k-th level in the SDR video signal.

Generally speaking, the composer metadata (complete or a part thereof) is used for mapping a source image (e.g., an SDR image) or even multiple source images to one or more corresponding target images (e.g., one or more target HDR images specifically optimized for respective reference target displays). That is to say, the composer metadata (or in some cases also called backward reshaping mappings) can be used by for example downstream decoders to perform backward reshaping (e.g., inverse tone mapping, etc.) on one or more SDR images in order to generate backward reshaped images that may be optimized for rendering on one or more (target) HDR reference displays. Furthermore, the mapping (backward reshaping) of the SDR images to the target images may generally refer to image processing operations that can convert images (i.e., SDR images) back to the original EOTF domain (e.g., gamma or PQ), for further downstream processing, such as the display management, etc. By way of example but not limitation, the mapping may refer to image processing operations that take each of the pixels (or codewords) of the image in the SDR range and map them to the corresponding pixels (or codewords) in the HDR range.

Example Video Delivery Processing Pipeline

FIG. 1A depicts an example process of a video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide the video data (107). In a production phase (110), the video data (107) is edited to provide a video production stream (112).

Figure 2A:
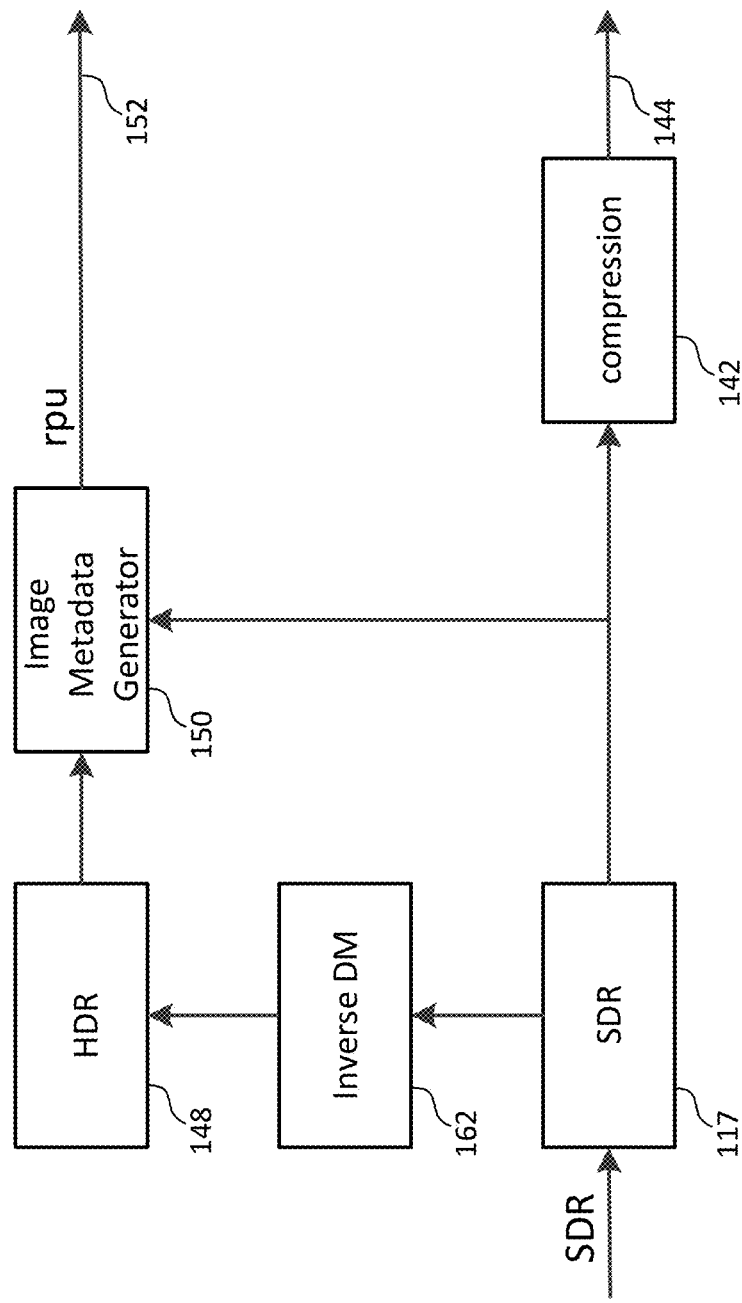
FIG. 2A through FIG. 2C illustrate example single-layer SLPC codec framework(s)
Figure 2B:
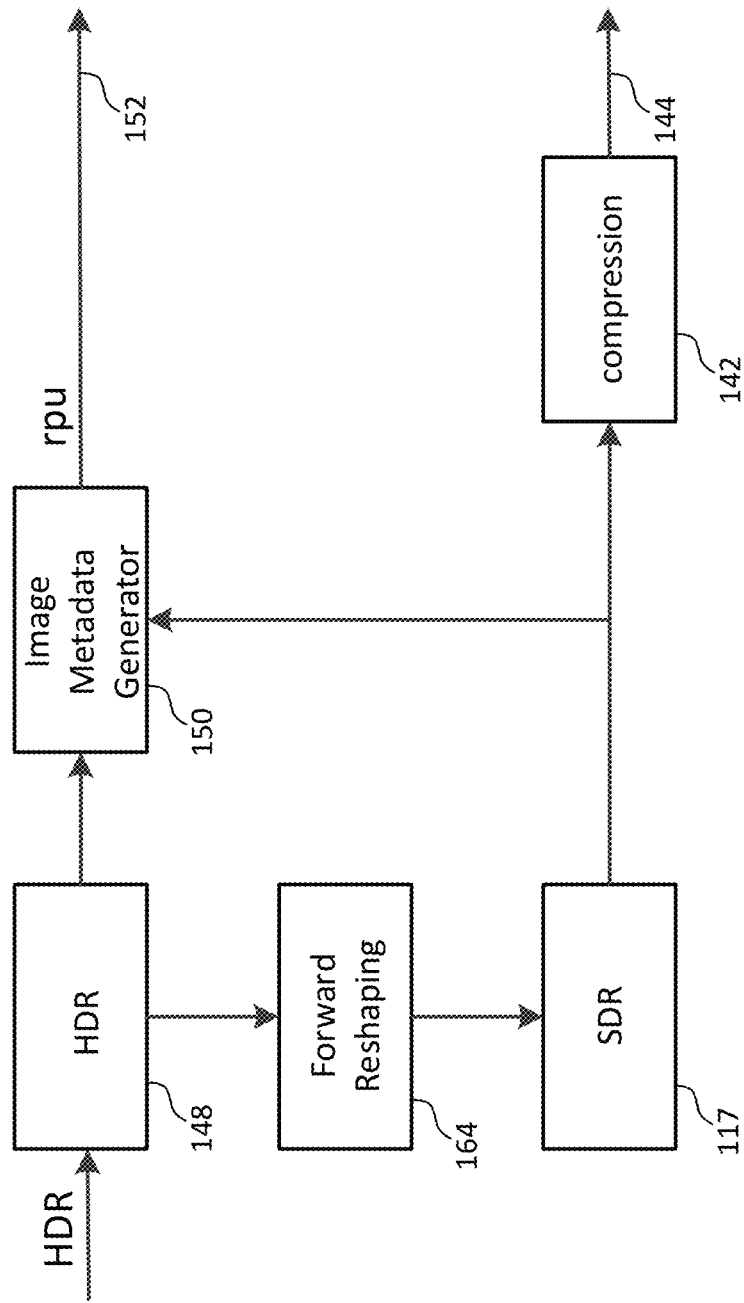

The video data of the production stream (112) is then provided to a processor for post-production editing (115). The post-production editing (115) may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, manual and/or automatic scene cut information generation, image cropping, addition of computer-generated visual special effects, etc.) may be performed at the post-production editing (115) to yield a release version of HDR images (117-1) or SDR (or relatively narrow dynamic range) images (117) (e.g., SDR, etc.). In some embodiments, during post-production editing (115), the HDR images (117-1) are viewed on a reference HDR display that supports the high dynamic range by a colorist who is performing post-production editing operations on the HDR images (117-1). In some other embodiments, during post-production editing (115), the SDR images (117) are viewed on a reference display (125) that supports the standard dynamic range (or a relatively narrow dynamic range) by a colorist who is performing post-production editing operations on the SDR images (117). In some embodiments, the coding block (120) may implement a single layer SLPC codec framework such as illustrated in FIG. 2A or FIG. 2B. In operational scenarios in which the coding block (120) receives the HDR images (117-1) from the post-production editing (115), the HDR images (117-1) may be forward reshaped by the coding block (120) into SDR images (e.g., 117).

The SDR images (117) are compressed by the coding block (120) into a coded bitstream (122), for example in a single layer. In some embodiments, the coding block (120) may include audio and video encoders, such as those defined by ATSC, DVB, DVD, Blu-Ray, and other delivery formats, to generate the coded bitstream (122).

In some embodiments, the coded bitstream (122) is encoded with the SDR images (117) that preserve the artistic intent with which the SDR images (117) are generated in the post-production editing (115).

The SDR images (117) may be encoded into video data in a video signal (e.g., an 8-bit SDR video signal, a 10-bit SDR video signal, etc.) that is backward compatible (or alternatively non-backward compatible) with a wide variety of SDR display devices (e.g., SDR displays, etc.). In a non-limiting example, the video signal encoded with the SDR images (117) may be a single-layer backward compatible (or alternatively non-backward compatible) video signal.

In some embodiments, the coded bitstream (122) is a video signal in compliance with the same video signal format as the input SDR YCbCr video signal received by the coding block (120). For example, in cases where the input SDR YCbCr video signal received by the coding block (120) is an 8-bit SDR YCbCr video signal, the coded bitstream (122) outputted by the coding block (120) may represent an output 8-bit SDR YCbCr video signal with the image metadata including but not limited to composer metadata as generated by the coding block (120). The composer metadata (or backward reshaping mappings) can be used by downstream decoders to perform backward reshaping (e.g., inverse tone mapping, etc.) on the SDR images (117) in order to generate backward reshaped images that may be optimized for rendering on (e.g., multiple target, etc.) HDR reference displays. In some embodiments, the backward reshaped images may be generated from the SDR images (117) (or a decoded version thereof) using one or more SDR-to-HDR conversion tools implementing inverse tone mapping based at least in part on the composer metadata. A used herein, backward reshaping refers to image processing operations that convert re-quantized images back to the original EOTF domain (e.g., gamma or PQ), for further downstream processing, such as the display management. Example backward reshaping operations are described in U.S. Provisional Application Ser. No. 62/136,402, filed on Mar. 20, 2015, the entire contents of which are hereby incorporated by reference as if fully set forth herein.

Additionally, optionally, or alternatively, the coded bit stream (122) is further encoded with image metadata including but not limited to display management (DM) metadata that can be used by the downstream decoders to perform display management operations on the backward reshaped images for the HDR reference displays to generate display images optimized for rendering on (e.g., multiple, etc.) device-specific HDR displays.

The coded bitstream (122) is then delivered downstream to receivers such as decoding and playback devices, media source devices, media streaming client devices, television sets (e.g., smart TVs, etc.), set-top boxes, movie theaters, and the like. In a receiver (or a downstream device), the coded bitstream (122) is decoded by decoding block (130) to generate decoded images 182, which may be the same as the SDR images (117), subject to quantization errors generated in compression performed by the coding block (120) and decompression performed by the decoding block (130).

In some embodiments, the coding block (120) includes a progressive codec (or progressive video encoder) that implements an encoder-side codec architecture for SLPC. SLPC is scalable in terms of target display capability. More specifically, in these embodiments, the image metadata such as the composer metadata, the DM metadata, etc., as generated by the coding block (120) for different target displays (each of the target displays may represent a display family with the same display capabilities) can scale with these target displays' respective capabilities.

For example, in operational scenarios in which the receiver operates with (or is attached to) a target display 140 that supports the standard dynamic range or a relatively narrow dynamic range comparable with or less than the standard dynamic range, the coding block (120) that implements SLPC techniques as described herein may encode the SDR images (117) in the single layer of the coded bitstream (122) and encode no composer metadata in the coded bitstream (122). The decoding block (130) can decode the SDR images (117) from (e.g., the single layer in, etc.) the coded bitstream (122), and use the decoded SDR images (117) directly or indirectly for rendering on the target display (140). In embodiments in which the target display (140) is of similar characteristics as the SDR reference display (125), the SDR images (117) edited with the artistic content as represented in the decoded images (182) can be directly watchable on the target display (140).

In some embodiments, the receiver operates with (or is attached to) a HDR target display (e.g., 140-1, 140-2, 140-3, etc.) instead of the non-HDR target display (140). The coding block (120) can encode progressive levels of composer metadata into the coded bitstream (122) with the SDR images (117) that scales with the capability (e.g., in terms of a supported dynamic range, the darkest black level and the brightest white level, etc.) of the HDR target display. The progressive levels of composer metadata can be used to support any dynamic range that ranges from comparable to a minimum high dynamic range (e.g., 600 nits, 700 nits, 1000 nits, etc.) to comparable to a maximum high dynamic range (e.g., 5000 nits, 10,000 nits, 40,000 or more nits, etc.).

In operational scenarios in which the receiver operates with (or is attached to) a first HDR target display 140-1 that supports a first high dynamic range (e.g., 400 nits, etc.), the coding block (120) that implements SLPC techniques as described herein encodes the SDR images (117) in the single layer of the coded bitstream (122), and encodes first-level composer metadata in the coded bitstream (122) or a metadata container encoded therein. The decoding block (130) can decode the SDR images (117) (or the decoded image (182)) from the coded bitstream (122), extract the first-level progressive composer metadata from (e.g., the metadata container in, etc.) the coded bitstream (122), use the first-level progressive composer metadata to compose first backward reshaped images 132-1 from the SDR images (117) by backward reshaping the SDR images (117) based on the first-level progressive composer metadata, and use the first backward reshaped images (132-1) directly or indirectly for rendering on the first HDR target display (140-1).

The first backward reshaped images (132-1) may be optimized for viewing on a first HDR reference display that is not the same but rather is comparable with for example, supports a maximum or peak luminance value greater than that of the first HDR target display (140-1). A display management block (e.g., 135-1, etc.) which may be in the receiver, in the first HDR target display (140-1), or in a separate device further adjusts the first backward reshaped images (132-1) to characteristics of the first HDR target display (140-1) by generating a first display-mapped signal (137-1) adapted to the characteristics of the first HDR target display (140-1).

In operational scenarios in which the receiver operates with (or is attached to) a second HDR target display 140-2 that supports a second high dynamic range (e.g., no less than the first high dynamic range, 1000 nits, etc.), the coding block (120) that implements SLPC techniques as described herein encodes the SDR images (117) in the single layer of the coded bitstream (122), and encodes second-level progressive composer metadata as well as the first-level composer metadata in the coded bitstream (122) or the metadata container encoded therein. The decoding block (130) can decode the SDR images (117) from the coded bitstream (122), extract the first-level and second-level composer metadata from (e.g., the metadata container in, etc.) the coded bitstream (122), use the first-level and second-level progressive composer metadata to compose second backward reshaped images 132-2 from the SDR images (117) by backward reshaping the SDR images (117) based on the first-level and second-level progressive composer metadata, and use the second backward reshaped images (132-2) directly or indirectly for rendering on the second HDR target display (140-2).

The second backward reshaped images (132-2) may be optimized for viewing on a second HDR reference display that is not the same but rather is comparable with the second HDR target display (140-2). A display management block (e.g., 135-2, etc.) which may be in the receiver, in the second HDR target display (140-2), or in a separate device further adjusts the second backward reshaped images (132-2) to characteristics of the second HDR target display (140-2) by generating a second display-mapped signal (137-2) adapted to the characteristics of the second HDR target display (140-2).

In operational scenarios in which the receiver operates with (or is attached to) a third HDR target display 140-3 that supports a third high dynamic range (e.g., no less than the second high dynamic range, 4000 nits, etc.), the coding block (120) that implements SLPC techniques as described herein encodes the SDR images (117) in the single layer of the coded bitstream (122), and encodes third-level progressive composer metadata as well as the first-level and second-level progressive composer metadata in the coded bitstream (122) or the metadata container encoded therein. The decoding block (130) can decode the SDR images (117) from the coded bitstream (122), extract the first-level, second-level and third-level progressive composer metadata from (e.g., the metadata container in, etc.) the coded bitstream (122), use the first-level, second-level and third-level progressive composer metadata to compose third backward reshaped images 132-3 from the SDR images (117) by backward reshaping the SDR images (117) based on the first-level, second-level and third-level progressive composer metadata, and use the third backward reshaped images (132-3) directly or indirectly for rendering on the third HDR target display (140-3).

The third backward reshaped images (132-3) may be optimized for viewing on a third HDR reference display that is not the same but rather is comparable with the third HDR target display (140-3). A display management block (e.g., 135-3, etc.) which may be in the receiver, in the third HDR target display (140-3), or in a separate device further adjusts the third backward reshaped images (132-3) to characteristics of the third HDR target display (140-3) by generating a third display-mapped signal (137-3) adapted to the characteristics of the third HDR target display (140-3).

Single-Layer Progressive Coding

As discussed previously, a video encoder as described herein (e.g., the coding block (120), etc.) that implements SLPC techniques can generated, encode, and/or transmit image metadata (e.g., composer metadata, DM metadata, etc.) that is scalable with capabilities of target displays.

Example capabilities of target displays with which the image metadata may be progressively encoded or decoded may include, but are not necessarily limited to only, dynamic ranges. The plurality of target display (e.g., 140, 140-1, 140-2, 140-3, etc.) as described herein may have a plurality of target dynamic ranges from a relatively narrow dynamic range such as one comparable with the standard dynamic range to a relatively high dynamic range such as the highest dynamic range among multiple high dynamic ranges.

Figure 1B:
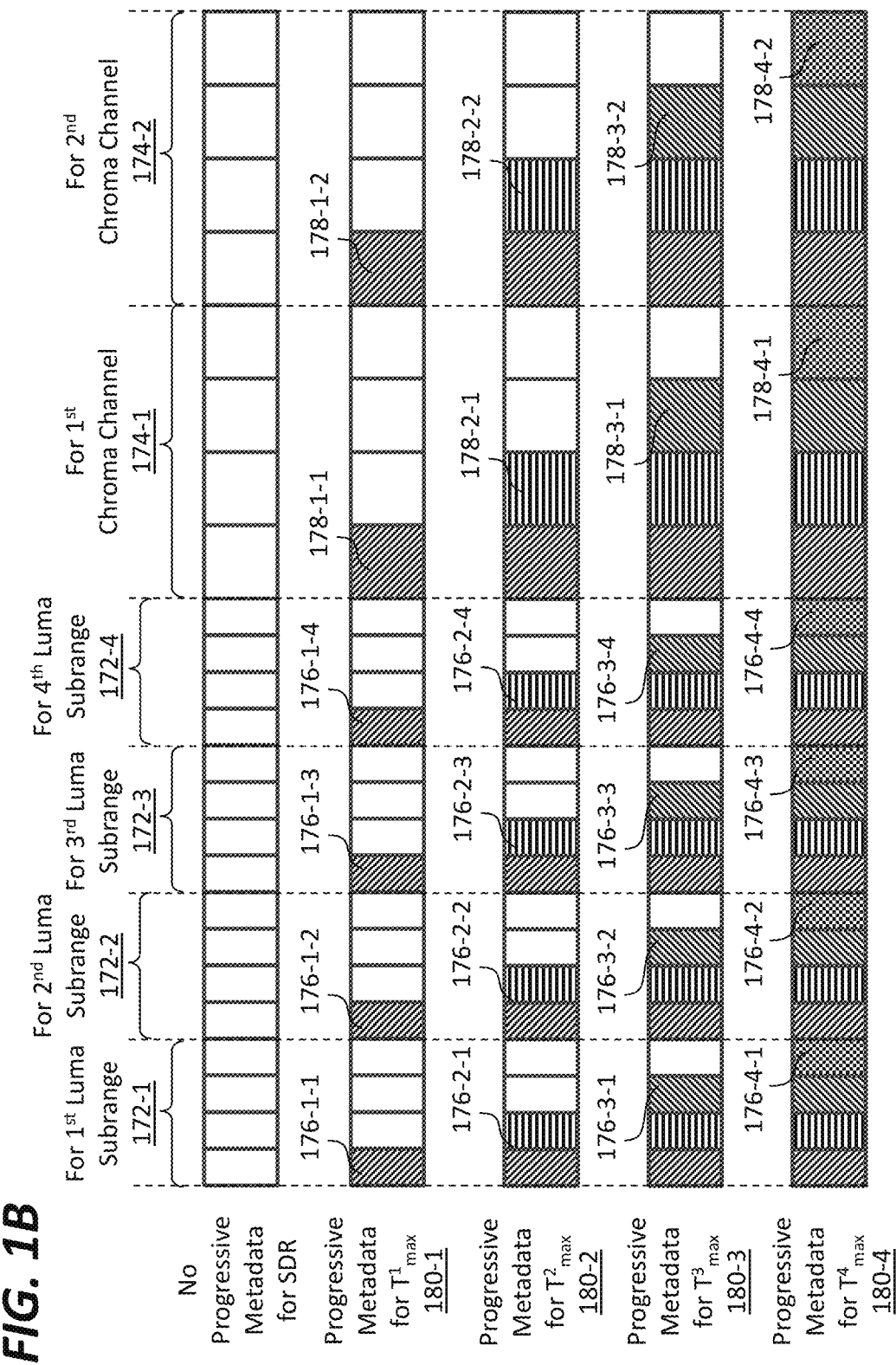
FIG. 1B depicts example progressive coding of image metadata such as composer metadata to support a plurality of target displays.

FIG. 1B depicts example progressive coding of image metadata (or progressive composer metadata) such as composer metadata to support a plurality of reference target displays having a plurality of different target dynamic ranges.

In general, that means the plurality of reference target displays have different target dynamic ranges (e.g., ranging from a relatively narrow dynamic range such as one comparable with the standard dynamic range to a relatively high dynamic range such as the highest dynamic range among multiple high dynamic ranges) from each other.

By way of illustration but not limitation, for a target display (e.g., 140 of FIG. 1A, etc.) that supports the standard dynamic range or a relatively narrow dynamic range comparable with or less than the standard dynamic range, the video encoder generates no progressive composer metadata in a coded bitstream from the video encoder to a recipient video decoder operating with the target display, as the SDR images (117) encoded in the coded bitstream without progressive composer metadata already supports the standard dynamic range.

On the other hand, for a first target display (e.g., 140-1 of FIG. 1A, etc.) that supports a dynamic range comparable with or less than a first target dynamic range $T_{max}^1$ (but more than the standard dynamic range), the video encoder generates first progressive composer metadata 180-1 for the first target dynamic range $T_{max}^1$ in a coded bitstream from the video encoder to a recipient video decoder operating with the first target display. The first progressive composer metadata (180-1) for the first target dynamic range $T_{max}^1$ can be used by the recipient video decoder to perform backward reshaping (e.g., inverse tone mapping, etc.) on the SDR images (117) (or the decoded images (182)) as decoded from the coded bitstream to generate first backward reshaped images (e.g., 132-1 of FIG. 1A, etc.) from the SDR images (117).

The first progressive composer metadata (108-1) comprises first progressive composer metadata for backward reshaping luma codewords and first progressive composer metadata for backward reshaping chroma codewords.

In some embodiments, the first progressive composer metadata (108-1) for backward reshaping luma codewords may comprise first polynomial parameters (or values thereof) that define a first multi-piece polynomial or a first set of polynomials (e.g., an 8-piece polynomial, a set of 8 polynomials, etc.). By way of example but not limitation, the first multi-piece polynomial or the first set of polynomials may comprise a first polynomial to map SDR codewords in a first luma subrange 172-1 of the standard dynamic range to be mapped to a first luma subrange of the first target dynamic range $T_{max}^1$, a second polynomial to map SDR codewords in a second luma subrange 172-2 of the standard dynamic range to be mapped to a second luma subrange of the first target dynamic range $T_{max}^1$, a third polynomial to map SDR codewords in a third luma subrange 172-3 of the standard dynamic range to be mapped to a third luma subrange of the first target dynamic range $T_{max}^1$, a fourth polynomial to map SDR codewords in a fourth luma subrange 172-4 of the standard dynamic range to be mapped to a fourth luma subrange of the first target dynamic range $T_{max}^1$, and so forth.

In some embodiments, the first progressive composer metadata (108-1) for backward reshaping chroma codewords may comprise first MMR coefficients (or values thereof) for mapping chroma codewords in a first chroma channel 174-1 and first MMR coefficients (or values thereof) for mapping chroma codewords in a second chroma channel 174-2.

As illustrated in FIG. 1B, the first progressive composer metadata (108-1) comprises a set of first-level progressive composer metadata portions 176-1-1, 176-1-2, 176-1-3, 176-1-4, and so forth, for backward reshaping luma codewords into the first target dynamic range $T_{max}^1$, and a set of first-level progressive composer metadata portions 178-1-1, 178-1-2, and so forth, for backward reshaping chroma codewords.

For example, a first-level progressive composer metadata portion 176-1-1 may comprise $0^{th}$ and $1^{st}$ order polynomial parameters (or values thereof) for a polynomial to map codewords in the first luma subrange (172-1), and another first-level progressive composer metadata portion 176-1-2 may comprise $0^{th}$ and $1^{st}$ order polynomial parameters (or values thereof) for another polynomial to map codewords in the second luma subrange (172-2). Other first-level progressive composer metadata portions (e.g., 176-1-3, 176-1-4, etc.) may comprise $0^{th}$ and $1^{st}$ order polynomial parameters (or values thereof) respectively for other polynomial to map codewords in other luma subranges such as the third luma subrange (172-3), the fourth luma subrange (172-4), and so forth.

A first-level progressive composer metadata portion 178-1-1 may comprise $1^{st}$ order MMR coefficients (or values thereof) to map codewords in the first chroma channel (174-1), and another first-level progressive composer metadata portion 178-1-2 may comprise $1^{st}$ order MMR coefficients (or values thereof) to map codewords in the second chroma channel (174-2).

For a second target display (e.g., 140-2 of FIG. 1A, etc.) that supports a dynamic range comparable with or less than a second target dynamic range $T_{max}^2$ (but more than the standard dynamic range and different from the first target dynamic range $T_{max}^1$), the video encoder generates second progressive composer metadata 180-2 for the second target dynamic range $T_{max}^2$ in a coded bitstream from the video encoder to a recipient video decoder operating with the second target display. The second progressive composer metadata (180-2) for the second target dynamic range $T_{max}^2$ can be used by the recipient video decoder to perform backward reshaping (e.g., inverse tone mapping, etc.) on the SDR images (117) (or the decoded images (182)) as decoded from the coded bitstream to generate second backward reshaped images (e.g., 132-2 of FIG. 1A, etc.) from the SDR images (117).

The second progressive composer metadata (108-2) comprises second progressive composer metadata for backward reshaping luma codewords and second progressive composer metadata for backward reshaping chroma codewords.

In some embodiments, the second progressive composer metadata (108-2) for backward reshaping luma codewords may comprise second polynomial parameters (or values thereof) that define a second multi-piece polynomial or a second set of polynomials (e.g., an 8-piece polynomial, a set of 8 polynomials, etc.). By way of example but not limitation, the second multi-piece polynomial or the second set of polynomials may comprise a first polynomial to map SDR codewords in the first luma subrange (172-1) of the standard dynamic range to be mapped to the first luma subrange of the second target dynamic range $T_{max}^2$, a second polynomial to map SDR codewords in the second luma subrange (172-2) of the standard dynamic range to be mapped to the second luma subrange of the second target dynamic range $T_{max}^2$, a third polynomial to map SDR codewords in the third luma subrange (172-3) of the standard dynamic range to be mapped to the third luma subrange of the second target dynamic range $T_{max}^2$, a fourth polynomial to map SDR codewords in the fourth luma subrange (172-4) of the standard dynamic range to be mapped to the fourth luma subrange of the second target dynamic range $T_{max}^2$, and so forth.

In some embodiments, the second progressive composer metadata (108-2) for backward reshaping chroma codewords may comprise second MMR coefficients (or values thereof) for mapping chroma codewords in the first chroma channel (174-1) and second MMR coefficients (or values thereof) for mapping chroma codewords in the second chroma channel (174-2).

As illustrated in FIG. 1B, the second progressive composer metadata (108-2) comprises a set of second-level progressive composer metadata portions 176-2-1, 176-2-2, 176-2-3, 176-2-4, and so forth, in addition to the first progressive composer metadata (108-1) comprising the set of first-level progressive composer metadata portions 176-1-1, 176-1-2, 176-1-3, 176-1-4, and so forth, for backward reshaping luma codewords into the second target dynamic range $T_{max}^2$, and a set of second-level progressive composer metadata portions 178-2-1, 178-2-2, and so forth, in addition to the set of first-level progressive composer metadata portions 178-1-1, 178-1-2, and so forth, for backward reshaping chroma codewords.

Under techniques as described herein, for the second target display, the video encoder does not need to replace the first progressive composer metadata (108-1) generated for the first target display in the code bitstream. Instead, the coded bitstream that contains the first progressive composer metadata (108-1) for the first target display can be progressively or consecutively added or appended with (1) the set of second-level progressive composer metadata portions 176-2-1, 176-2-2, 176-2-3, 176-2-4, and so forth, for backward reshaping luma codewords and (2) the set of second-level progressive composer metadata portions 178-2-1, 178-2-2, and so forth, for backward reshaping chroma codewords for the second target display.

These progressively or consecutively added/appended second-level progressive composer metadata portions 176-2-1, 176-2-2, 176-2-3, 176-2-4, 178-2-1, 178-2-2, and so forth, by themselves, are insufficient for the recipient video decoder to generate appropriate luma and chroma mappings to backward reshape the SDR images (117) received in the coded stream. However, these progressively or consecutively added/appended second-level progressive composer metadata portions 176-2-1, 176-2-2, 176-2-3, 176-2-4, 178-2-1, 178-2-2, and so forth, as combined with preceding levels of progressive composer metadata portions such as the first-level progressive composer metadata portions 176-1-1, 176-1-2, 176-1-3, 176-1-4, 178-1-1, 178-1-2, and so forth, are sufficient for the recipient video decoder to generate appropriate luma and chroma mappings to backward reshape the SDR images (117) received in the coded stream.

For example, a second-level progressive composer metadata portion 176-2-1 may comprise a subset of polynomial parameters (or values thereof) for a polynomial to map codewords in the first luma subrange (172-1). The second-level progressive composer metadata portion (176-2-1) by itself is insufficient for the recipient video decoder operating with the second target display to generate the polynomial to map codewords in the first luma subrange (172-1). However, the second-level progressive composer metadata portion (176-2-1) as combined with preceding-level progressive composer metadata portions such as the first-level progressive composer metadata portion (176-1-1) is sufficient for the recipient video decoder operating with the second target display to generate the polynomial to map codewords in the first luma subrange (172-1). Another second-level progressive composer metadata portion (e.g., any of 176-2-2, 176-2-3, 176-2-4, etc.) may comprise a subset of polynomial parameters (or values thereof) for another polynomial to map codewords in another luma subrange (e.g., a corresponding one of 172-2, 172-3, 172-4, etc.). The other second-level progressive composer metadata portion (e.g., any of 176-2-2, 176-2-3, 176-2-4, etc.) by itself is insufficient for the recipient video decoder operating with the second target display to generate the other polynomial to map codewords in the other luma subrange (e.g., a corresponding one of 172-2, 172-3, 172-4, etc.). However, the other second-level progressive composer metadata portion (e.g., any of 176-2-2, 176-2-3, 176-2-4, etc.) as combined with preceding-level progressive composer metadata portions such as a first-level progressive composer metadata portion (e.g., a corresponding one of 176-1-2, 176-1-3, 176-1-4, etc.) is sufficient for the recipient video decoder operating with the second target display to generate the other polynomial to map codewords in the other luma subrange (e.g., a corresponding one of 172-2, 172-3, 172-4, etc.).

A second-level progressive composer metadata portion 178-2-1 may comprise a subset of MMR coefficients (or values thereof) for mapping codewords in the first chroma channel (174-1). The second-level progressive composer metadata portion (178-2-1) by itself is insufficient for the recipient video decoder operating with the second target display to generate the MMR mapping to map codewords in the first chroma channel (174-1). However, the second-level progressive composer metadata portion (178-2-1) as combined with preceding-level progressive composer metadata portions such as the first-level progressive composer metadata portion (178-1-1) is sufficient for the recipient video decoder operating with the second target display to generate the MMR mapping to map codewords in the first chroma codewords. Similarly, a second-level progressive composer metadata portion 178-2-2 may comprise a subset of MMR coefficients (or values thereof) for mapping codewords in the second chroma channel (174-2). The second-level progressive composer metadata portion (178-2-2) by itself is insufficient for the recipient video decoder operating with the second target display to generate the MMR mapping to map codewords in the second chroma channel (174-2). However, the second-level progressive composer metadata portion (178-2-2) as combined with preceding-level progressive composer metadata portions such as the first-level progressive composer metadata portion (178-1-2) is sufficient for the recipient video decoder operating with the second target display to generate the MMR mapping to map codewords in the second chroma channel (174-2).

For a third target display (e.g., 140-3 of FIG. 1A, etc.) that supports a dynamic range comparable with or less than a third target dynamic range $T_{max}^3$ (but more than the standard dynamic range and different from the first and second target dynamic range $T_{max}^1$ and $T_{max}^2$), the video encoder generates third progressive composer metadata 180-3 for the third target dynamic range $T_{max}^3$ in a coded bitstream from the video encoder to a recipient video decoder operating with the third target display. The third progressive composer metadata (180-3) for the third target dynamic range $T_{max}^3$ can be used by the recipient video decoder to perform backward reshaping (e.g., inverse tone mapping, etc.) on the SDR images (117) (or the decoded images (182)) as decoded from the coded bitstream to generate third backward reshaped images (e.g., 132-3 of FIG. 1A, etc.) from the SDR images (117).

The third progressive composer metadata (108-3) comprises third progressive composer metadata for backward reshaping luma codewords and third progressive composer metadata for backward reshaping chroma codewords.

In some embodiments, the third progressive composer metadata (108-3) for backward reshaping luma codewords may comprise third polynomial parameters (or values thereof) that define a third multi-piece polynomial or a third set of polynomials (e.g., an 8-piece polynomial, a set of 8 polynomials, etc.). By way of example but not limitation, the third multi-piece polynomial or the third set of polynomials may comprise a first polynomial to map SDR codewords in the first luma subrange (172-1) of the standard dynamic range to be mapped to the first luma subrange of the third target dynamic range $T_{max}^3$, a second polynomial to map SDR codewords in the second luma subrange (172-2) of the standard dynamic range to be mapped to the third luma subrange of the third target dynamic range $T_{max}^3$, a third polynomial to map SDR codewords in the third luma subrange (172-3) of the standard dynamic range to be mapped to the third luma subrange of the third target dynamic range $T_{max}^3$, a fourth polynomial to map SDR codewords in the fourth luma subrange (172-4) of the standard dynamic range to be mapped to the fourth luma subrange of the third target dynamic range $T_{max}^3$, and so forth.

In some embodiments, the third progressive composer metadata (108-3) for backward reshaping chroma codewords may comprise third MMR coefficients (or values thereof) for mapping chroma codewords in the first chroma channel (174-1) and third MMR coefficients (or values thereof) for mapping chroma codewords in the second chroma channel (174-2).

As illustrated in FIG. 1B, the third progressive composer metadata (108-3) comprises a set of third-level progressive composer metadata portions 176-3-1, 176-3-2, 176-3-3, 176-3-4, and so forth—in addition to the second progressive composer metadata (108-2) comprising (1) the set of first-level progressive composer metadata portions 176-1-1, 176-1-2, 176-1-3, 176-1-4, and so forth, and (2) the set of second-level progressive composer metadata portions 176-2-1, 176-2-2, 176-2-3, 176-2-4, and so forth—for backward reshaping luma codewords into the third target dynamic range $T_{max}^3$. In addition, the third progressive composer metadata (108-3) comprises a set of third-level progressive composer metadata portions 178-3-1, 178-3-2, and so forth—in addition to (1) the set of first-level progressive composer metadata portions 178-1-1, 178-1-2, and so forth, and (2) the set of second-level progressive composer metadata portions 178-2-1, 178-2-2, and so forth—for backward reshaping chroma codewords.

Under techniques as described herein, for the third target display, the video encoder does not need to replace the first progressive composer metadata (108-1) generated for the first target display or to replace the second progressive composer metadata (108-2) generated for the second target display in the code bitstream. Instead, the coded bitstream that contains the second progressive composer metadata (108-2) for the second target display can be progressively or consecutively added or appended with (1) the set of third-level progressive composer metadata portions 176-3-1, 176-3-2, 176-3-3, 176-3-4, and so forth, for backward reshaping luma codewords and (2) the set of third-level progressive composer metadata portions 178-3-1, 178-3-2, and so forth, for backward reshaping chroma codewords for the third target display.

These progressively or consecutively added/appended third-level progressive composer metadata portions 176-3-1, 176-3-2, 176-3-3, 176-3-4, 178-3-1, 178-3-2, and so forth, by themselves, are insufficient for the recipient video decoder to generate appropriate luma and chroma mappings to backward reshape the SDR images (117) received in the coded stream. However, these progressively or consecutively added/appended third-level progressive composer metadata portions 176-3-1, 176-3-2, 176-3-3, 176-3-4, 178-3-1, 178-3-2, and so forth, as combined with preceding levels of progressive composer metadata portions—such as (1) the first-level progressive composer metadata portions 176-1-1, 176-1-2, 176-1-3, 176-1-4, 178-1-1, 178-1-2, and so forth, and (2) the second-level progressive composer metadata portions 176-2-1, 176-2-2, 176-2-3, 176-2-4, 178-2-1, 178-2-2, and so forth are sufficient for the recipient video decoder to generate appropriate luma and chroma mappings to backward reshape the SDR images (117) received in the coded stream.

For example, a third-level progressive composer metadata portion 176-3-1 may comprise a subset of polynomial parameters (or values thereof) for a polynomial to map codewords in the first luma subrange (172-1). The third-level progressive composer metadata portion (176-3-1) by itself is insufficient for the recipient video decoder operating with the third target display to generate the polynomial to map codewords in the first luma subrange (172-1). However, the third-level progressive composer metadata portion (176-3-1) as combined with preceding-level progressive composer metadata portions such as the first-level progressive composer metadata portion (176-1-1) and the second-level progressive composer metadata portion (176-2-1) is sufficient for the recipient video decoder operating with the third target display to generate the polynomial to map codewords in the first luma subrange (172-1). Another third-level progressive composer metadata portion (e.g., any of 176-3-2, 176-3-3, 176-3-4, etc.) may comprise a subset of polynomial parameters (or values thereof) for another polynomial to map codewords in another luma subrange (e.g., a corresponding one of 172-2, 172-3, 172-4, etc.). The other third-level progressive composer metadata portion (e.g., any of 176-3-2, 176-3-3, 176-3-4, etc.) by itself is insufficient for the recipient video decoder operating with the third target display to generate the other polynomial to map codewords in the other luma subrange (e.g., a corresponding one of 172-2, 172-3, 172-4, etc.). However, the other third-level progressive composer metadata portion (e.g., any of 176-3-2, 176-3-3, 176-3-4, etc.) as combined with preceding-level progressive composer metadata portions such as a first-level progressive composer metadata portion (e.g., a corresponding one of 176-1-2, 176-1-3, 176-1-4, etc.) and a second-level progressive composer metadata portion (e.g., a corresponding one of 176-2-2, 176-2-3, 176-2-4, etc.) is sufficient for the recipient video decoder operating with the third target display to generate the other polynomial to map codewords in the other luma subrange (e.g., a corresponding one of 172-2, 172-3, 172-4, etc.).

A third-level progressive composer metadata portion 178-3-1 may comprise a subset of MMR coefficients (or values thereof) for mapping codewords in the first chroma channel (174-1). The third-level progressive composer metadata portion (178-3-1) by itself is insufficient for the recipient video decoder operating with the third target display to generate the MMR mapping to map codewords in the first chroma channel (174-1). However, the third-level progressive composer metadata portion (178-3-1) as combined with preceding-level progressive composer metadata portions such as the first-level progressive composer metadata portion (178-1-1) and the second-level progressive composer metadata portion (178-2-1) is sufficient for the recipient video decoder operating with the third target display to generate the MMR mapping to map codewords in the first chroma codewords. Similarly, a third-level progressive composer metadata portion 178-3-2 may comprise a subset of MMR coefficients (or values thereof) for mapping codewords in the second chroma channel (174-2). The third-level progressive composer metadata portion (178-3-2) by itself is insufficient for the recipient video decoder operating with the third target display to generate the MMR mapping to map codewords in the second chroma channel (174-2). However, the third-level progressive composer metadata portion (178-3-2) as combined with preceding-level progressive composer metadata portions such as the first-level progressive composer metadata portion (178-1-2) and the second-level progressive composer metadata portion (178-2-2) is sufficient for the recipient video decoder operating with the third target display to generate the MMR mapping to map codewords in the second chroma channel (174-2).

For a fourth target display (not shown) that supports a dynamic range comparable with or less than a fourth target dynamic range $T_{max}^4$ (but more than the standard dynamic range and different from the first and second target dynamic range $T_{max}^1$, $T_{max}^2$ and $T_{max}^3$), the video encoder generates fourth progressive composer metadata 180-4 for the fourth target dynamic range $T_{max}^4$ in a coded bitstream from the video encoder to a recipient video decoder operating with the fourth target display. The fourth progressive composer metadata (180-4) for the fourth target dynamic range $T_{max}^4$ can be used by the recipient video decoder to perform backward reshaping (e.g., inverse tone mapping, etc.) on the SDR images (117) (or the decoded images (182)) as decoded from the coded bitstream to generate fourth backward reshaped images (e.g., 132-3 of FIG. 1A, etc.) from the SDR images (117).

The fourth progressive composer metadata (108-4) comprises fourth progressive composer metadata for backward reshaping luma codewords and fourth progressive composer metadata for backward reshaping chroma codewords.

In some embodiments, the fourth progressive composer metadata (108-4) for backward reshaping luma codewords may comprise fourth polynomial parameters (or values thereof) that define a fourth multi-piece polynomial or a fourth set of polynomials (e.g., an 8-piece polynomial, a set of 8 polynomials, etc.). By way of example but not limitation, the fourth multi-piece polynomial or the fourth set of polynomials may comprise a first polynomial to map SDR codewords in the first luma subrange (172-1) of the standard dynamic range to be mapped to the first luma subrange of the fourth target dynamic range $T_{max}^4$, a second polynomial to map SDR codewords in the second luma subrange (172-2) of the standard dynamic range to be mapped to the third luma subrange of the fourth target dynamic range $T_{max}^4$, a third polynomial to map SDR codewords in the third luma subrange (172-3) of the standard dynamic range to be mapped to the third luma subrange of the fourth target dynamic range $T_{max}^4$, a fourth polynomial to map SDR codewords in the fourth luma subrange (172-4) of the standard dynamic range to be mapped to the fourth luma subrange of the fourth target dynamic range $T_{max}^4$, and so forth.

In some embodiments, the fourth progressive composer metadata (108-4) for backward reshaping chroma codewords may comprise fourth MMR coefficients (or values thereof) for mapping chroma codewords in the first chroma channel (174-1) and fourth MMR coefficients (or values thereof) for mapping chroma codewords in the second chroma channel (174-2).

As illustrated in FIG. 1B, the fourth progressive composer metadata (108-4) comprises a set of fourth-level progressive composer metadata portions 176-4-1, 176-4-2, 176-4-3, 176-4-4, and so forth in addition to the third progressive composer metadata (108-3) comprising (1) the set of first-level progressive composer metadata portions 176-1-1, 176-1-2, 176-1-3, 176-1-4, and so forth, (2) the set of second-level progressive composer metadata portions 176-2-1, 176-2-2, 176-2-3, 176-2-4, and so forth, and (3) the set of third-level progressive composer metadata portions 176-3-1, 176-3-2, 176-3-3, 176-3-4, and so forth—for backward reshaping luma codewords into the fourth target dynamic range $T_{max}^4$. In addition, the fourth progressive composer metadata (108-4) comprises a set of fourth-level progressive composer metadata portions 178-4-1, 178-4-2, and so forth—in addition to (1) the set of first-level progressive composer metadata portions 178-1-1, 178-1-2, and so forth, (2) the set of second-level progressive composer metadata portions 178-2-1, 178-2-2, and so forth, and (3) the set of third-level progressive composer metadata portions 178-3-1, 178-3-2, and so forth—for backward reshaping chroma codewords.

Under techniques as described herein, for the fourth target display, the video encoder does not need to replace the first progressive composer metadata (108-1) generated for the first target display, to replace the second progressive composer metadata (108-2) generated for the second target display, or to replace the third progressive composer metadata (108-3) generated for the third target display, in the code bitstream. Instead, the coded bitstream that contains the third progressive composer metadata (108-3) for the third target display can be progressively or consecutively added or appended with (1) the set of fourth-level progressive composer metadata portions 176-4-1, 176-4-2, 176-4-3, 176-4-4, and so forth, for backward reshaping luma codewords and (2) the set of fourth-level progressive composer metadata portions 178-4-1, 178-4-2, and so forth, for backward reshaping chroma codewords for the fourth target display.

These progressively or consecutively added/appended fourth-level progressive composer metadata portions 176-4-1, 176-4-2, 176-4-3, 176-4-4, 178-4-1, 178-4-2, and so forth, by themselves, are insufficient for the recipient video decoder to generate appropriate luma and chroma mappings to backward reshape the SDR images (117) received in the coded stream. However, these progressively or consecutively added/appended fourth-level progressive composer metadata portions 176-4-1, 176-4-2, 176-4-3, 176-4-4, 178-4-1, 178-4-2, and so forth, as combined with preceding levels of progressive composer metadata portions—such as (1) the first-level progressive composer metadata portions 176-1-1, 176-1-2, 176-1-3, 176-1-4, 178-1-1, 178-1-2, and so forth, (2) the second-level progressive composer metadata portions 176-2-1, 176-2-2, 176-2-3, 176-2-4, 178-2-1, 178-2-2, and so forth, and (3) the third-level progressive composer metadata portions 176-3-1, 176-3-2, 176-3-3, 176-3-4, 178-3-1, 178-3-2, and so forth—are sufficient for the recipient video decoder to generate appropriate luma and chroma mappings to backward reshape the SDR images (117) received in the coded stream.

For example, a fourth-level progressive composer metadata portion 176-4-1 may comprise a subset of polynomial parameters (or values thereof) for a polynomial to map codewords in the first luma subrange (172-1). The fourth-level progressive composer metadata portion (176-4-1) by itself is insufficient for the recipient video decoder operating with the fourth target display to generate the polynomial to map codewords in the first luma subrange (172-1). However, the fourth-level progressive composer metadata portion (176-4-1) as combined with preceding-level progressive composer metadata portions such as the first-level progressive composer metadata portion (176-1-1), the second-level progressive composer metadata portion (176-2-1) and the third-level progressive composer metadata portion (176-3-1) is sufficient for the recipient video decoder operating with the target display to generate the polynomial to map codewords in the first luma subrange (172-1). Another fourth-level progressive composer metadata portion (e.g., any of 176-4-2, 176-4-3, 176-4-4, etc.) may comprise a subset of polynomial parameters (or values thereof) for another polynomial to map codewords in another luma subrange (e.g., a corresponding one of 172-2, 172-3, 172-4, etc.). The other fourth-level progressive composer metadata portion (e.g., any of 176-4-2, 176-4-3, 176-4-4, etc.) by itself is insufficient for the recipient video decoder operating with the fourth target display to generate the other polynomial to map codewords in the other luma subrange (e.g., a corresponding one of 172-2, 172-3, 172-4, etc.). However, the other fourth-level progressive composer metadata portion (e.g., any of 176-4-2, 176-4-3, 176-4-4, etc.) as combined with preceding-level progressive composer metadata portions such as a first-level progressive composer metadata portion (e.g., a corresponding one of 176-1-2, 176-1-3, 176-1-4, etc.), a second-level progressive composer metadata portion (e.g., a corresponding one of 176-2-2, 176-2-3, 176-2-4, etc.) and a third-level progressive composer metadata portion (e.g., a corresponding one of 176-3-2, 176-3-3, 176-3-4, etc.) is sufficient for the recipient video decoder operating with the fourth target display to generate the other polynomial to map codewords in the other luma subrange (e.g., a corresponding one of 172-2, 172-3, 172-4, etc.).

A fourth-level progressive composer metadata portion 178-4-1 may comprise a subset of MMR coefficients (or values thereof) for mapping codewords in the first chroma channel (174-1). The fourth-level progressive composer metadata portion (178-4-1) by itself is insufficient for the recipient video decoder operating with the fourth target display to generate the MMR mapping to map codewords in the first chroma channel (174-1). However, the fourth-level progressive composer metadata portion (178-4-1) as combined with preceding-level progressive composer metadata portions such as the first-level progressive composer metadata portion (178-1-1), the second-level progressive composer metadata portion (178-2-1) and the third-level progressive composer metadata portion (178-3-1) is sufficient for the recipient video decoder operating with the fourth target display to generate the MMR mapping to map codewords in the first chroma codewords. Similarly, a fourth-level progressive composer metadata portion 178-4-2 may comprise a subset of MMR coefficients (or values thereof) for mapping codewords in the second chroma channel (174-2). The fourth-level progressive composer metadata portion (178-4-2) by itself is insufficient for the recipient video decoder operating with the fourth target display to generate the MMR mapping to map codewords in the second chroma channel (174-2). However, the fourth-level progressive composer metadata portion (178-3-2) as combined with preceding-level progressive composer metadata portions such as the first-level progressive composer metadata portion (178-1-2), the second-level progressive composer metadata portion (178-2-2) and the third-level progressive composer metadata portion (178-2-3) is sufficient for the recipient video decoder operating with the fourth target display to generate the MMR mapping to map codewords in the second chroma channel (174-2).

Under SLPC techniques as described herein, composer metadata of preceding levels in an ordered set of composer metadata of different levels can be progressively or consecutively added into image metadata to support different target displays of different target dynamic ranges, reused and combined with composer metadata of a subsequent level to support a target display with a target dynamic range to which the composer metadata of the subsequent level corresponds.

If a receiver (or a video decoder) uses no composer metadata, decoded images (e.g., 182, etc) from a single layer (or a base layer) of a coded bitstream (e.g., 122, etc.) can be rendered on a target display such as an SDR display. If the receiver uses first-level composer metadata (e.g., 176-1-1, 176-1-2, 176-1-3, 176-1-4, 178-1-1, 178-1-2, etc.) decoded from the coded bitstream (122), backward reshaped images (or reconstructed images) generated by backward reshaping the decoded images (182) can be shown on a first target (e.g., HDR, etc.) display with a higher dynamic range (or a higher brightness) than SDR such as $T_{max}^1$. When the receiver uses higher-level composer metadata (e.g., 176-2-1, 176-2-2, 176-2-3, 176-2-4, 178-2-1, 178-2-2, 176-3-1, 176-3-2, 176-3-3, 176-3-4, 178-3-1, 178-3-2, 176-4-1, 176-4-2, 176-4-3, 176-4-4, 178-4-1, 178-4-2, etc.) decoded from the coded bitstream (122) in combination with all preceding level composer metadata (e.g., 176-1-1, 176-1-2, 176-1-3, 176-1-4, 178-1-1, 178-1-2, 176-2-1, 176-2-2, 176-2-3, 176-2-4, 178-2-1, 178-2-2, 176-3-1, 176-3-2, 176-3-3, 176-3-4, 178-3-1, 178-3-2, etc.), backward reshaped images (or reconstructed images) generated by backward reshaping the decoded images (182) can be shown on a HDR target display with even higher dynamic ranges (or even higher brightness) such as $T_{max}^2$ or $T_{max}^3$ or $T_{max}^4$. When the device uses composer metadata of all levels, backward reshaped images (or reconstructed images) generated by backward reshaping the decoded images (182) can be shown on a HDR target display with the highest dynamic range (or the highest brightness) such as $T_{max}^4$ (e.g., 10,000 nits, a target dynamic range of Dolby Vision Pulsar displays commercially available from Dolby Laboratories, Inc., California, etc.).

Under an SLPC-based paradigm as described herein, a single coded bitstream can be accessed or streamed by a receiver (or a source device) operating in conjunction with a target display. Based on the capability of the target display, composer metadata of any preceding levels up to a target level can be progressively or consecutively encoded into the coded bitstream. SDR images can be decoded and used by the receiver to generate backward reshaped images for the target display based on a combination of composer metadata of the target level and composer metadata of the preceding levels preceding the target level in the ascending order of the plurality of target dynamic ranges supported by the (e.g., upstream, etc.) video encoder.

SLPC related Image metadata (e.g., composer metadata, DM metadata, etc.) can be encoded into a coded bitstream in one or more different ways. In an example, an existing coding syntax supported by many media client devices already deployed in the field may be used to encode the image metadata into the coded bitstream. Different existing profiles/levels in the coding syntax can be used or reused to carry the composer metadata and/or corresponding DM metadata of different levels. Additionally, optionally or alternatively, a receiver (or a video decoder) that is to take advantage of the composer metadata of different levels and/or the corresponding DM metadata may be installed or upgraded with some or all of SLPC related functionality. In another example, a new coding syntax and/or new profiles/levels may be developed and implemented to encode or decode the composer metadata and/or corresponding DM metadata of different levels.

In some embodiments, the composer metadata and/or corresponding DM metadata of different levels may be interleaved within a full coded bitstream that supports up to the highest dynamic range.

In some embodiments, the composer metadata and/or corresponding DM metadata of different levels may be truly progressive in a full coded bitstream that supports up to the highest dynamic range; for example, receiving/streaming a first portion (e.g., no composer metadata, etc.) of the full coded bitstream enables rendering video (e.g., base layer images, SDR images (117), decoded images (182), etc.) on a relatively narrow dynamic range display, whereas receiving additional portions of the full coded bitstream can progressively support higher and higher dynamic range displays up to the highest dynamic range.

In some embodiments, an SLPC codec architecture as described herein comprises a luma part and a chroma part. The luma part may, but is not limited to only, use a set of polynomial pieces such as an 8-piece polynomial with specific polynomial coefficients to construct backward reshaping function(s). To implement progressive coding, different orders of polynomial coefficients can be used for different target displays. For example, a set of $1^{st}$ order polynomial pieces with respective specific $0^{th}$ and $1^{st}$ order polynomial coefficients can be used to compose images (or backward reshaped images) for a first target display such as a 400-nit target display. A set of $2^{nd}$ order polynomial pieces with respective specific $2^{nd}$ order polynomial coefficients in combination with the same $0^{th}$ and $1^{st}$ order polynomial coefficients for the first target display can be used to compose images (or backward reshaped images) for a second target display such as an 800-bit target display.

The chroma part may, but is not limited to only, use multi-channel multiple regression (MMR) coefficients. Similar to the luma part, to implement progressive coding, different orders of MMR coefficients can be used for different target displays. For example, a set of $1^{st}$ order MMR coefficients can be used to compose images (or backward reshaped images) for a first target display such as a 400-nit target display. A set of $2^{nd}$ order MMR coefficients in combination with the same $0^{th}$ and $1^{st}$ order MMR coefficients for the first target display can be used to compose images (or backward reshaped images) for a second target display such as an 800-bit target display. In some embodiments in which each order of MMR coefficients introduces seven (7) parameters, each order of MMR coefficients can be further partitioned, for example into a set of three (3) parameters and a set of four (4) parameters for finer granularity. Finer-granularity form of partitioning MMR coefficients can be repeated throughout different orders. Additionally, optionally or alternatively, finer-granularity form of partitioning can be extended to polynomial coefficients throughout different orders.

SLPC techniques as described herein can be used to generate coded bitstream that (e.g., concurrently, etc.) support a wide variety of target displays that may implement different video standards. For example, these techniques can be readily applied to support both hybrid log gamma (HLG) video standards (or target display in compliance with the HLG video standards) and HDR10 (or target display in compliance with the HDR10 video standards). In some embodiments, composer metadata in a first layer (corresponding to one or more first levels) may be used to support target displays of 1000 nits such as HLG/HDR10 displays, whereas composer metadata in a second layer (corresponding to one or more second levels higher than the first levels) may be used to support target displays of 4000 nits or such as Dolby Vision Pulsar displays. Thus, a progressive codec implementing techniques as describe herein can provide two layers of backward-compatibility with coded bitstreams. In some embodiments, a media client device such as a source device that operates with a target display can determine the capability of the target display and select to stream or receive a specific level of composer metadata (and any preceding levels of composer metadata) suitable for the target display among multiple target displays supported by SLPC. As a result, the media client device may compose and render images optimized for the target display based on the composer metadata up to the specific level without needing to perform DM operations. This can be a cost saving factor from a device manufacturing point of view.

Techniques as described herein can be used to generate, encode and decode SLPC related image metadata for luma and chroma channels of color spaces, support real-time non-reference scenarios using luma intensity for modulation, convert different polynomial modulation functions to progressive MMR coefficients via simple matrix conversion, extend the SLPC techniques to other coefficient format, apply unequal weighting in different layers, and so forth.

Codec Architecture(s)

Figure 2C:
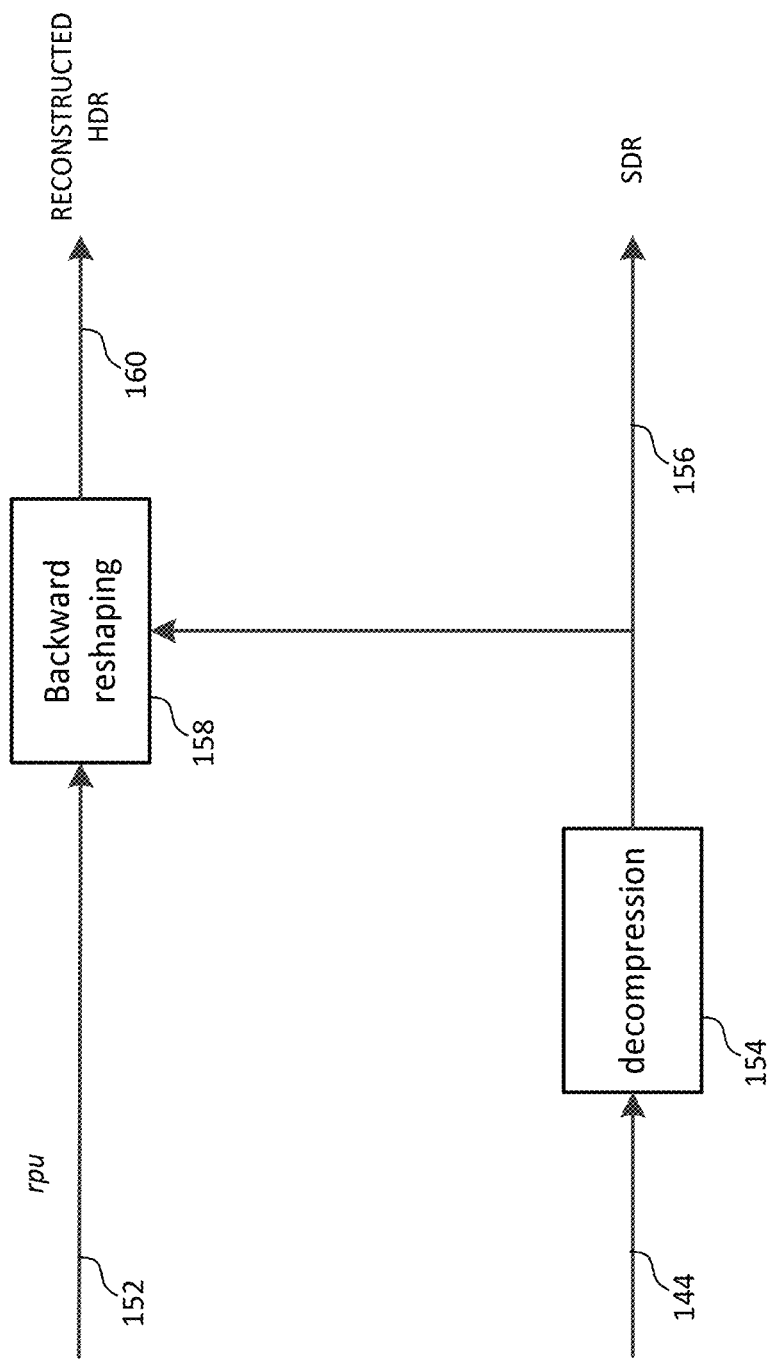

FIG. 2A through FIG. 2C illustrate example single-layer SLPC codec framework(s). More specifically, FIG. 2A illustrates an example of a first SLPC encoder-side codec architecture, which may be implemented with one or more computing processors in an upstream video encoder, etc. FIG. 2B illustrates an example of a second SLPC encoder-side codec architecture, which may be implemented with one or more computing processors in an upstream video encoder, etc. FIG. 2C illustrates an example of an SLPC decoder-side codec architecture, which may also be implemented with one or more computing processors in a downstream video decoder (e.g., a receiver, etc.), etc.

In the first SLPC framework, as illustrated in FIG. 2A, backward compatible SDR images such as the SDR images (117), etc., are received as input on the encoder side of the codec framework. Here, "backward compatible SDR images" may refer to SDR images that are specifically optimized or color graded for SDR displays.

By way of illustration but not limitation, an inverse dynamic-range mapping (DM) module 146—which may represent a SDR-to-HDR conversion tool, etc.—is used to convert the SDR images (117) to HDR images 148 that are optimized for viewing on reference HDR displays. In some embodiments, the inverse-DM module may also be referred to as an inverse tone-mapping tool.

In the SLPC framework as illustrated in FIG. 2B, the HDR images (148) such as those optimized for reference HDR displays, etc., are received as input on the encoder side of the codec framework. Here, "HDR images optimized for reference HDR displays" may refer to HDR images that are specifically color graded for HDR displays.

By way of illustration but not limitation, a forward reshaping module 164—which may represent a HDR-to-SDR conversion tool, etc.—is used to convert the HDR images (148) to the SDR images (117) that are optimized for viewing on SDR displays. In some embodiments, the forward reshaping module may also be referred to as a tone-mapping tool.

In both the first and second SLPC encoder-side codec architectures, an image metadata generator 150 (e.g., a part of the coding block (120), etc.) receives both of the SDR images (117) and the HDR images (148) as input, generates image metadata 152 such as SLPC related composer metadata, DM metadata, and so forth. For example, the image metadata generator (150) can perform SLPC related optimization to find out composer metadata of different levels for multiple target displays supported under SLPC. The composer metadata of up to a specific level among the different levels can be progressively or consecutively encoded into a coded bitstream depending on the specific capability of a specific target display (among the multiple target displays supported under SLPC) with which a downstream receiver of the coded bitstream operates, and used by the downstream receiver to construct a specific optimal backward reshaping function for the specific target display. Backward reshaped images (132) optimized for the specific target display can be generated by backward reshaping the SDR images (117) with the specific optimal backward reshaping function.

In some embodiments, the backward reshaped images (132) represent production-quality or near-production-quality HDR images that are optimized for the specific HDR target display. The backward reshaped images (132) may be outputted in an output HDR video signal 160 (e.g., over an HDMI interface, over a video link, etc.) to and rendered on the HDR display device. In these embodiments, the receiver can retrieve the composer metadata of up to a specific level to support the maximum dynamic range that can be supported by the display device with which the receiver operates and to reconstruct and render images of the maximum dynamic range from the SDR images (117) based on the computer metadata of the up to the specific level. Thus, in these embodiments, DM functionality may not be implemented by a receiver to simplify device operations and reduce device costs.

Additionally, optionally or alternatively, in some embodiments, the image metadata generator (150) generates DM metadata for the multiple target displays supported under SLPC. The DM metadata may be used by recipient devices to perform DM operations, for example on reconstructed HDR images (or backward reshaped images) to generate display images for display devices that may be different from the target displays supported under SLPC.

In both the first and second SLPC encoder-side architecture, a compression block 142 (e.g., a part of the coding block (120) of FIG. 1A, etc.) compresses/encodes the SDR images (117) in a single layer 144 of a video signal. An example video signal may be, but is not necessarily limited to only, the coded bitstream (122) of FIG. 1A. The image metadata (152) (denoted as "rpu"), as generated by the image metadata generator (150), may be progressively or consecutively encoded (e.g., by the coding block (120) of FIG. 1A, etc.) into the video signal (e.g., a coded bitstream, etc.) based on the capability of the specific target display with which the receiver operates.

In both the first and second SLPC encoder-side architectures, the image metadata (152) may be separately carried in the video signal from the single layer in which the SDR images are encoded in the video signal. For example, the image metadata (152) may be encoded in a component stream in the coded bitstream, which component stream may or may not be separate from the single layer (of the coded bitstream) in which the SDR images (117) are encoded.

In both the first and second SLPC encoder-side architectures, the composer metadata in the image metadata (152) in the video signal can be used to enable downstream receivers to backward reshape the SDR images (117) (which are encoded in the video signal) into reconstructed images (or backward reshaped images) that are optimized for the target displays.

In both the first and second SLPC encoder-side architectures, SDR content is encoded and transmitted, in a single layer of a video signal such as the code bit stream (122), etc., by an upstream encoding device that implements the encoder-side codec architecture. The SDR content is received and decoded, in the single layer of the video signal, by a downstream decoding device (or a receiver) that implements the decoder-side codec architecture. Composer metadata is also encoded and transmitted in the video signal with the SDR content so that recipient devices can reconstruct HDR content based on the SDR content and the composer metadata.

In some embodiments, as illustrated in FIG. 2C, the video signal encoded with the SDR images (117) in the single layer (144) and the backward reshaping metadata (152) as a part of the overall image metadata are received as input on the decoder side of the first and second SLPC encoder-side architectures.

A decompression block 154 (e.g., a part of the decoding block (130) of FIG. 1A, etc.) decompresses/decodes compressed video data in the single layer (144) of the video signal into the decoded SDR images (182). The decoded SDR images (182) may be the same as the SDR images (117), subject to quantization errors in the compression block (142) and in the decompression block (154), which may have been optimized for SDR display devices. The decoded SDR images (182) may be outputted in an output SDR video signal 156 (e.g., over an HDMI interface, over a video link, etc.) to and rendered on an SDR display device.

In addition, a backward reshaping block 158 selects a specific HDR target display (e.g., closest to and below the highest dynamic range supported by a HDR display device with which the video decoder operates, etc.) from among multiple HDR target displays supported under SLPC, determines a specific composer metadata level to which the specific HDR target display corresponds, extracts the image metadata (152) such as the composer metadata of up to the specific composer metadata level (to which the HDR target display corresponds) from the input video signal, constructs the optimal backward reshaping functions based on the extracted composer metadata in the image metadata, and performs backward reshaping operations on the decoded SDR images (117) based on the optimal backward reshaping functions to generate the backward reshaped images (132) (or reconstructed HDR images) for the specific HDR target display.

In some embodiments, the backward reshaped images represent production-quality or near-production-quality HDR images that are optimized for the specific HDR target display. The backward reshaped images (132) may be outputted in an output HDR video signal 160 (e.g., over an HDMI interface, over a video link, etc.) to and rendered on the HDR display device. In these embodiments, the receiver can retrieve the composer metadata of up to a specific level to support the maximum dynamic range that can be supported by the display device with which the receiver operates and to reconstruct and render images of the maximum dynamic range from the SDR images (117) based on the computer metadata of the up to the specific level. Thus, in these embodiments, DM functionality may not be implemented by a receiver to simplify device operations and reduce device costs.

Additionally, optionally or alternatively, in some embodiments, DM metadata may be transmitted with the composer metadata and the SDR images (117) to the receiver. Display management operations specific to the HDR display device may be performed on the backward reshaped images (132) based at least in part on the DM metadata in the image metadata (152), for example to generate display images to be rendered on the HDR display device.

For the purpose of illustration, single layer codec architectures have been described. It should be noted that techniques as described herein can be used in different single-layer codec architectures other than those illustrated in FIG. 2A through FIG. 2C. Additionally, optionally or alternatively, these techniques can be used in multi-layer codec architectures. Thus, these and other variations of single-layer or multi-layer codec architectures may operate with some or all of the techniques as described herein.

Progressive Luma Coding

Techniques as described herein can be used to implement one or more optimization methods at the encoder side to generate polynomial coefficients and pivot points in connection with progressive luma encoding. These techniques can also be used to implement post-processing operations at the decoder side to handle (e.g., reduce, avoid, prevent, etc.) any discontinuity between pivot points.

Denote bit depths of codeword spaces for SDR and HDR as $B_s$ and $B_v$, respectively. Denote target displays to be supported under SLPC as target displays $1, \ldots, k, \ldots H$, where H is an integer greater than one and represents the total number of the target displays, and where k is an integer between 1 and H (or $k \in [1, H]$). The target displays support maximum or peak luminance values (of the target dynamic ranges) $T_{max}^1, \ldots, T_{max}^k \ldots T_{max}^H$, respectively.

Denote a reshaping LUT from the SDR codeword space (or the standard dynamic range for the luma channel) to the k-th target codeword space (or the k-th target dynamic range for the luma channel) of the k-th target display with the maximum luminance value $T_{max}^k$ (e.g., in nits, etc.) as $L_b^k$, where $b \in [0, 2^{B_s}-1]$ represents SDR codeword values and $k \in [1, H]$.

By way of example but not limitation, a set of polynomial pieces such as an 8-piece (e.g., k-th order, etc.) polynomial is used to approximate the reshaping LUT $L_b^k$. Nine (9) pivot points $M_0, M_1 \ldots M_7, M_8$ may be used to define the 8 polynomial pieces in the polynomial, where $0 \leq M_0 < M_1 \ldots < M_7 < M_8 \leq 2^{Bis\ s}-1$. The pivot points partition the SDR codeword space into a plurality of SDR codeword space ranges. Denote the $p^{th}$ pivot point as $M_p$, where p represents an integer between 0 and 8 (or $p \in [0,8]$). For a SDR pixel having an SDR luma value b between $[M_p, M_{p+1})$, the fully reconstructed value (or the full backward reshaped value) $\hat{L}_b$ for the H-th target display can be generated from all polynomials (or all reshaping LUTs) up to the H-th target display as follows:

$$\hat{L}_b = \sum_{i=0}^{H} m_{p,i} \cdot b^i \quad (1)$$

where $m_{p,i}$ represents the i-th order polynomial coefficient for the SDR luma value b between $[M_p, M_{p+1})$; $b^i$ represents the i-th power of b (or i represents the exponent).

At the decoder side, polynomial coefficients $\{m_{p,i}\}$, for $i=0, \ldots, k$, can be used to reconstruct the reshaping LUT $L_b^k$ for the k-th target display with the maximum luminance value $T_{max}^k$ as follows:

$$\hat{L}_b^k = \sum_{i=0}^{k} m_{p,i} \cdot b^i \quad (2)$$

where $\hat{L}_b^k$ represents the k-th reconstructed value (or the k-th backward reshaped value) for the k-th target display as generated by backward reshaping the SDR luma value b using expression (2).

For example, polynomial coefficients $\{m_{p,0}\}$ and $\{m_{p,1}\}$ can be used to reconstruct the $1^{st}$ order reshaping LUT for the $1^{st}$ target display with the maximum luminance value $T_{max}^1$ as follows:

$$\hat{L}_b^1 = \sum_{i=0}^{1} m_{p,i} \cdot b^i \qquad (3)$$

where "·" on the right-hand side (RHS) denotes multiplication.

Under techniques as described herein, polynomial coefficients for a plurality of target displays may be optimized at the encoder side by an upstream video encoder. Under techniques as described herein, the polynomial coefficients can be obtained such that these polynomial coefficients can be efficiently and progressively or consecutively encoded in coded bitstreams to optimally exploit different capabilities of downstream display devices that may support a wide variety of dynamic ranges from a relatively narrow dynamic range comparable to SDR and a relatively high dynamic range up to the maximum high dynamic range in the plurality of target displays.

Given the pivot points $\{M_p\}$, progressive luma encoding can be formulated as an optimization problem as follows.

Denote the k-th reshaping LUT (or the k-th reshaping function) $L_p^k$ for all SDR codewords between the $p^{th}$ segment $[M_p, M_{p+1})$ (in the SDR codeword space) to be approximated by the 8-piece polynomial for the k-th target display as follows:

$$L_p^k = \begin{bmatrix} L_{M_p}^k \\ L_{M_p+1}^k \\ \vdots \\ L_{M_{p+1}-1}^k \end{bmatrix} \qquad (4)$$

Define a number of constructs based on the SDR codewords and polynomial coefficients as follows:

$$A_p^k = \begin{bmatrix} 1 & M_p & \ldots & (M_p)^k \\ 1 & M_p+1 & \ldots & (M_p+1)^k \\ \vdots & \vdots & & \vdots \\ 1 & M_{p+1}-1 & \ldots & (M_{p+1}-1)^k \end{bmatrix} \qquad (5)$$

$$m_p^k = \begin{bmatrix} m_{p,0} \\ m_{p,1} \\ \vdots \\ m_{p,k} \end{bmatrix} \qquad (6)$$

Estimated values $\hat{L}_p^k$ for the k-th reshaping LUT (or the k-th reshaping function) $L_p^k$ may be generated using the polynomial coefficients as follows:

$$\hat{L}_p^k = \begin{bmatrix} \hat{L}_{M_p}^k \\ \hat{L}_{M_p+1}^k \\ \vdots \\ \hat{L}_{M_{p+1}-1}^k \end{bmatrix} = \begin{bmatrix} 1 & M_p & \ldots & (M_p)^k \\ 1 & M_p+1 & \ldots & (M_p+1)^k \\ \vdots & \vdots & & \vdots \\ 1 & M_{p+1}-1 & \ldots & (M_{p+1}-1)^k \end{bmatrix} \begin{bmatrix} m_{p,0} \\ m_{p,1} \\ \vdots \\ m_{p,k} \end{bmatrix} = A_p^k m_p^k \qquad (7)$$

The optimization problem for obtaining optimized values for the polynomial coefficients $m_p^k$ can be formulated to minimize the overall approximation error for all k as follows:

$$\min_{m_p^H} \sum_{k=1}^{H} \left\| L_p^k - \hat{L}_p^k \right\|^2 \qquad (8)$$

The optimization problem can be reformulated with respect to constructs defined as follows:

$$\hat{L}_p = \begin{bmatrix} \hat{L}_p^1 \\ \hat{L}_p^2 \\ \vdots \\ \hat{L}_p^H \end{bmatrix} \qquad (9\text{-}1)$$

$$L_p = \begin{bmatrix} L_p^1 \\ L_p^2 \\ \vdots \\ L_p^H \end{bmatrix} \qquad (9\text{-}2)$$

By denoting the $w^{th}$ column of $A_p^k$ as $a_{p,w}^k$, a new matrix can be defined as follows:

$$A_p = \begin{bmatrix} a_{p,0}^1 & a_{p,1}^1 & 0 & \ldots & 0 \\ a_{p,0}^2 & a_{p,1}^2 & a_{p,2}^2 & \ldots & 0 \\ \vdots & \vdots & \vdots & \ddots & 0 \\ a_{p,0}^H & a_{p,1}^H & a_{p,2}^H & \ldots & a_{p,H}^H \end{bmatrix} \qquad (10)$$

Then $\hat{L}_p$ can be derived as follows:

$$\hat{L} = A_p m_p^H \qquad (11)$$

The optimization problem can be reformulated as follows:

$$\min_{m_p^H} \left\| L_p - \hat{L}_p \right\|^2 \qquad (12)$$

The optimal solution $m_p^{H,opt}$ for the polynomial coefficients $m_p^H$ can be obtained as follows:

$$m_p^{H,opt} = ((A_p)^T A_p)^{-1} ((A_p)^T L_p) \qquad (13)$$

In some embodiments, $A_p$ may be partitioned into smaller constructs as follows:

$$A_p^{(1)} = [a_{p,0}^1 a_{p,1}^1 0 \ldots 0] \qquad (14\text{-}1)$$

$$A_p^{(2)} = [a_{p,0}^2 a_{p,1}^2 a_{p,2}^2 0 \ldots 0] \qquad (14\text{-}2)$$

$$A_p^{(H)} = [a_{p,0}^H a_{p,1}^H a_{p,2}^H \ldots a_{p,H}^H] \qquad (14\text{-}3)$$

The optimal polynomial coefficients $m_p^{H,opt}$ can be generated by way of summation based on the smaller constructs as follows:

$$m_p^{H,opt} = \left( \sum_{i=1}^{H} (A_p^{(i)})^T A_p^{(i)} \right)^{-1} \left( \sum_{i=1}^{H} (A_p^{(i)})^T L_p \right) \qquad (15)$$

Additionally, optionally or alternatively, sequential optimization may also be used in one embodiment.

In various embodiments, pivot points may be fixed or dynamically partitioned/optimized. In an example, the SDR codeword space may be evenly divided into a plurality of SDR codeword space segments. In an example, the SDR codeword space may be unevenly divided into a plurality of SDR codeword space segments.

In a non-limiting embodiment, the first pivot point (e.g., $M_0$, etc.) is selected at a first non-flat point (e.g., a minimum SDR codeword, etc.), for example in a reference curve (e.g., representing an original reshaping function to be approximated by a multi-piece polynomial, etc.). The last pivot point (e.g., $M_8$, etc.) is selected at second non-flat point, for example in the reference curve. The rest of the pivot points may be equally distributed between the first and last pivot points.

The optimized polynomial coefficients and/or the pivot points may be progressively or consecutively (depending on the capability of a specific display device) encoded in image metadata as composer metadata and transmitted with SDR images to a receiver (operating with the specific display device).

A video decoder (or a receiver) operating with a specific display device may determine that the capability of the specific display device is comparable to a specific target display (or is completely able to support a target dynamic range of the specific target display) among the target displays supported under SLPC (or target displays 1, ..., k, ... H).

In response to determining that the specific display device is comparable to the SDR reference display (e.g., 125 of FIG. 1A, etc.), the receiver may select to retrieve SDR images (117) but no composer metadata from the upstream video encoder.

In response to determining that the specific display device is comparable to the $1^{st}$ target display or is completely able to support the $1^{st}$ target dynamic range of the $1^{st}$ target display with the maximum luminance value $T_{max}^1$, the receiver may select to retrieve the SDR images (117) along with polynomial coefficients $\{m_{p,0}, m_{p,1}\}$ in the form of composer metadata of the first level from the upstream video encoder. The polynomial coefficients $\{m_{p,0}, m_{p,1}\}$ may be used by the video decoder to construct the $1^{st}$ backward reshaping LUT (e.g., a smooth LUT or function, etc.) to backward reshape the SDR images (117) into first backward reshaped images optimized for the $1^{st}$ target display.

In response to determining that the specific display device is comparable to the $2^{nd}$ target display or is completely able to support the $2^{nd}$ target dynamic range of the $2^{nd}$ target display with the maximum luminance value $T_{max}^2$, the receiver may select to retrieve the SDR images (117) along with polynomial coefficients $\{m_{p,2}\}$ in the form of composer metadata of the second level, in combination with the polynomial coefficients $\{m_{p,0}, m_{p,1}\}$ in the form of composer metadata of the first level, from the upstream video encoder. The polynomial coefficients $\{m_{p,0}, m_{p,1}, m_{p,2}\}$ may be used by the video decoder to construct the $2^{nd}$ backward reshaping LUT (e.g., a smooth LUT or function, etc.) to backward reshape the SDR images (117) into second backward reshaped images optimized for the $2^{nd}$ target display.

In response to determining that the specific display device is comparable to the k-th target display or is completely able to support the k-th target dynamic range of the k-th target display with the maximum luminance value $T_{max}^k$, the receiver may select to retrieve the SDR images (117) along with polynomial coefficients $\{m_{p,k}\}$ in the form of composer metadata of the k-th level, in combination with the polynomial coefficients $\{m_{p,0}, m_{p,1}, \ldots, m_{p,k-1}\}$ in the form of composer metadata of preceding levels up to the (k−1)-th level, from the upstream video encoder. The polynomial coefficients $\{m_{p,0}, m_{p,1}, \ldots, m_{p,k-1}, m_{p,k}\}$ may be used by the video decoder to construct the k-th backward reshaping LUT (e.g., a smooth LUT or function, etc.) to backward reshape the SDR images (117) into k-th backward reshaped images optimized for the k-th target display.

A basic backward reshaping LUT for the k-th target display can be built by the receiver with the polynomial coefficients in the received composer metadata of all levels up to the k-th level as follows: For each SDR codeword b, the p-th segment in which the SDR codeword b is located may be identified. An LUT entry $\hat{L}_b^k$ for the k-th target display can be constructed/reconstructed for the SDR codeword b using the polynomial coefficients $\{m_{p,0}, m_{p,1}, \ldots, m_{p,k}\}$ in the received composer metadata as follows:

$$\hat{L}_b^k = \sum_{i=0}^{k} m_{p,i} \cdot b^i \qquad (16)$$

If the SDR codeword b is smaller than the first pivot point $M_0$, then the SDR codeword is reassigned to a new value equal to the first pivot point $M_0$. On the other hand, if the SDR codeword b is larger than the last pivot point $M_8$, then the SDR codeword is reassigned to a new value equal to the last pivot point $M_8$.

The basic backward reshaping LUT (denoted as BLUT) for the k-th target display may not be smooth. In some embodiments, smooth filtering may be performed to generate a relatively smooth backward reshaping LUT or function from the basic backward reshaping LUT directly derived from the polynomial coefficients received in the composer metadata. Smooth filtering operations may be performed for each SDR codeword b between $M_0$ and $M_8$ as follows:

$$\alpha = \min\{b - M_0 + 2, M_8 - b + 2, W\} \qquad (17\text{-}1)$$

$$FL_b = clip3(b - \alpha - 1, 0, 2^{B_s} - 1) \qquad (17\text{-}2)$$

$$FU_b = clip3(b + \alpha, 0, 2^{B_s} - 1) \qquad (17\text{-}3)$$

$$\tilde{L}_b^k = \frac{1}{FU_b - FL_b + 1} \sum_{i=FL_b}^{FU_b} \hat{L}_i^k \qquad (17\text{-}4)$$

where an example value of W can be selected as $2^{B_s}/8$ (where $B_s$ may be the bit depth of the SDR codeword space in one embodiment). In a non-limiting embodiment, the smooth filtering operations may be performed twice to ensure sufficient smoothness.

Figure 3A:
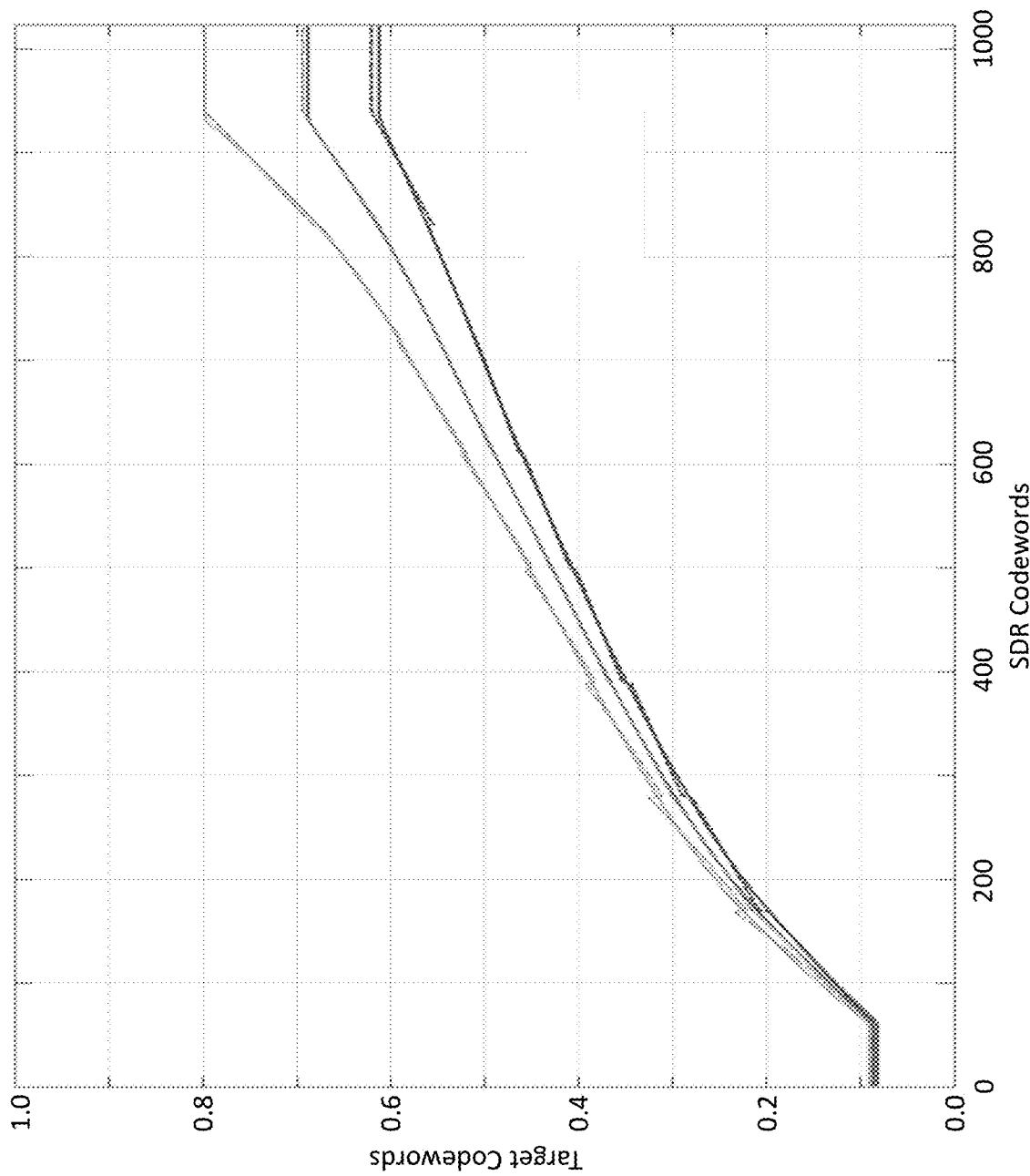
FIG. 3A and FIG. 3B illustrate example reference BLUTs and example predicted/constructed BLUTs with and without smoothing for three target displays.

FIG. 3A illustrates example reference BLUTs and example predicted/constructed BLUTs without smoothing for three target displays that respectively support maximum luminance values of 400 nits, 1000 nits, and 4000 nits (or 3 layers). As shown, relatively large discontinuities exist around pivot points in the predicted/constructed BLUTs approximating the reference BLUTs with relatively large distortions around the discontinuities.

Figure 3B:
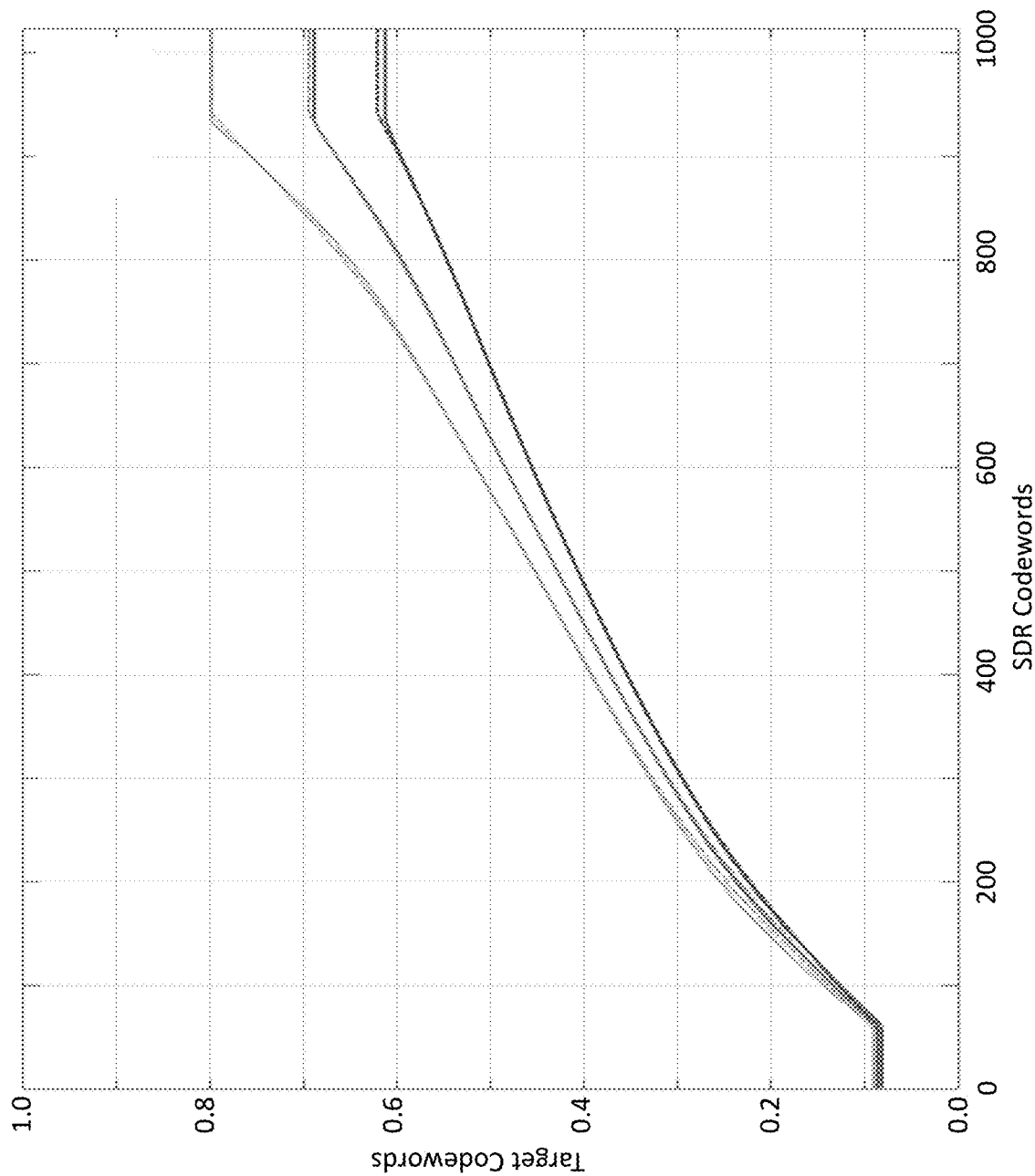

FIG. 3B illustrates reference BLUTs and predicted/constructed BLUTs with smoothing for three target displays that respectively support maximum luminance values of 400 nits, 1000 nits, and 4000 nits (or 3 layers). As shown, discontinuities as observed with FIG. 3A around pivot points have been removed to a relatively significant extent in the smoothened predicted/constructed BLUTs, which become closely approximating the reference BLUTs.

Figure 3C:
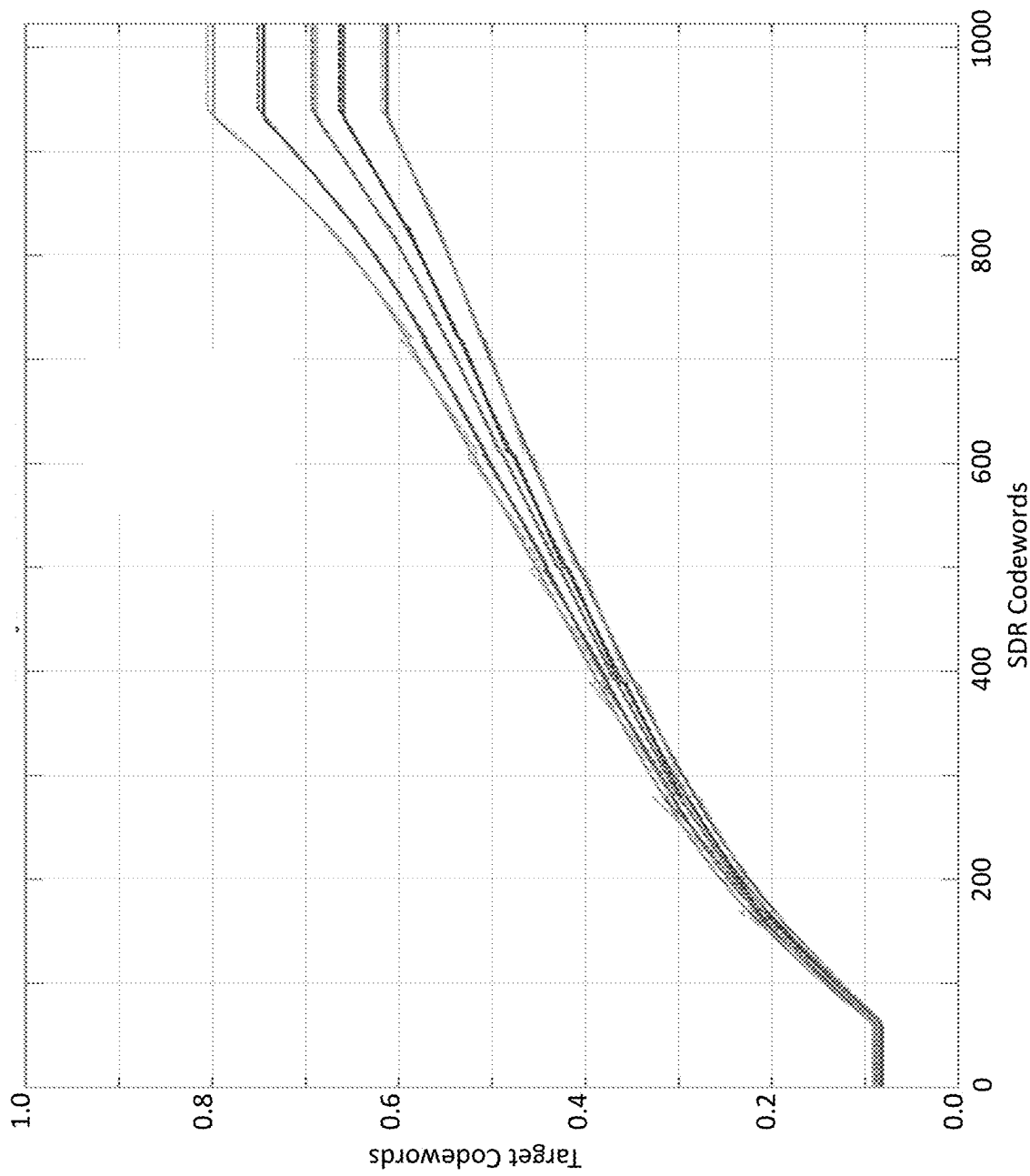
FIG. 3C and FIG. 3D illustrate example reference BLUTs and example predicted/constructed BLUTs with and without smoothing for five target displays.

FIG. 3C illustrates example reference BLUTs and example predicted/constructed BLUTs without smoothing for five target displays that respectively support maximum luminance values of 400 nits, 700 nits, 1000 nits, 2000 nits, and 4000 nits (or 5 layers). As shown, relatively large discontinuities exist around pivot points in the predicted/constructed BLUTs approximating the reference BLUTs with relatively large distortions around the discontinuities.

Figure 3D:
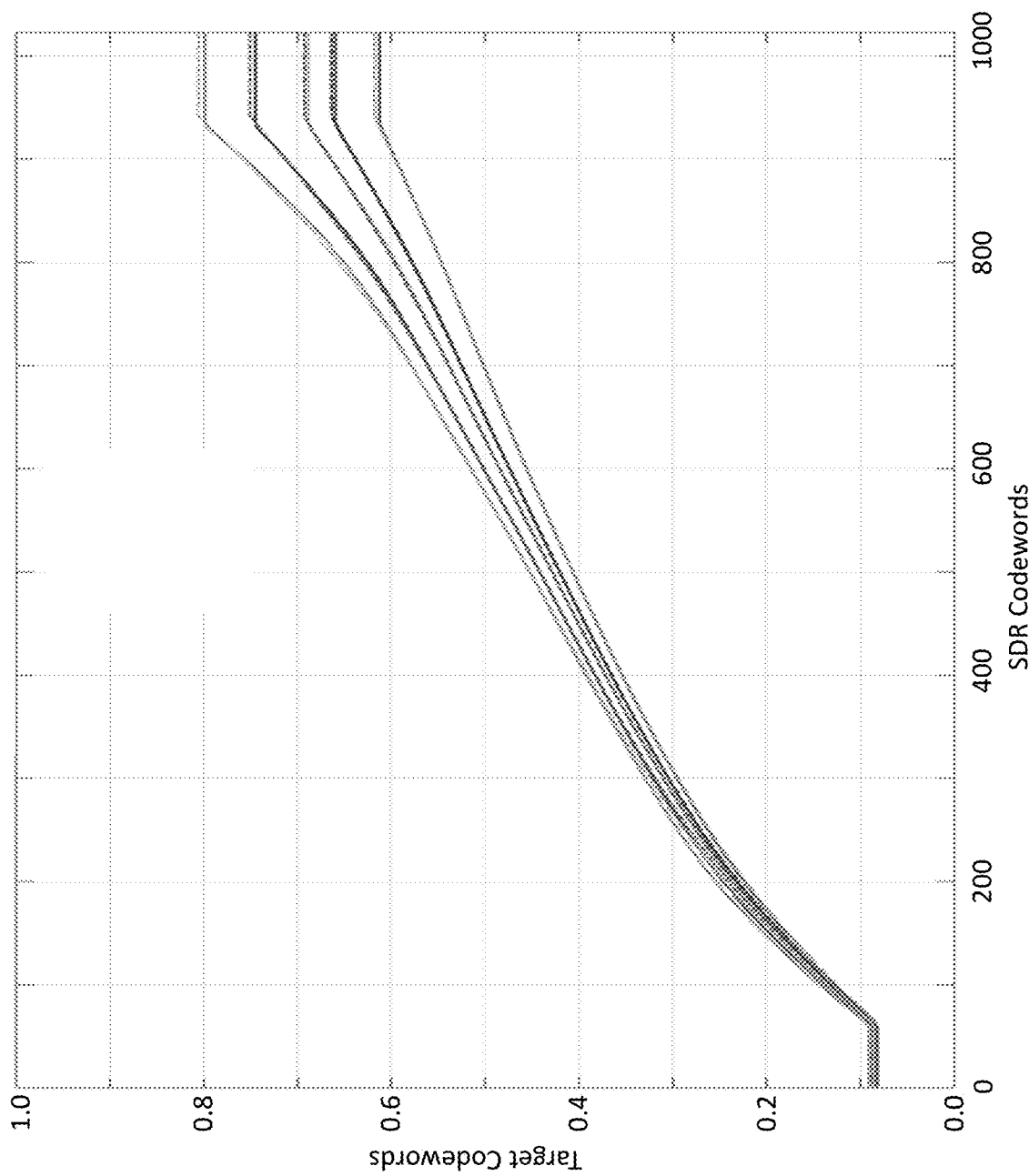

FIG. 3D illustrates reference BLUTs and predicted/constructed BLUTs with smoothing for five target displays that respectively support maximum luminance values of 400 nits, 700 nits, 1000 nits, 2000 nits, and 4000 nits (or 5 layers). As shown, discontinuities as observed with FIG. 3C around pivot points have been removed to a relatively significant extent in the smoothened predicted/constructed BLUTs, which become closely approximating the reference BLUTs.

Progressive Chroma Coding

Techniques as described herein can be used to implement one or more optimization methods at the encoder side to generate MMR coefficients in connection with progressive chroma encoding. In some embodiments, the optimization procedure used to generate the MMR coefficients for progressive chroma encoding is similar to the optimization procedure used to generate polynomial coefficients for progressive luma encoding. Example generation of MMR coefficients can be found in U.S. Provisional Application Ser. No. 61/475,359, filed on Apr. 14, 2011, (now U.S. Pat. No. 8,811,490), which is incorporated herein by reference in its entirety.

In some embodiments, the MMR coefficients can be represented as a vector consists of R coefficients (e.g., 8 MMR coefficients for the 0-th and $1^{st}$ order SDR codewords, 15 MMR coefficients for the $2^{nd}$ order SDR codewords, 22 MMR coefficients for the $3^{rd}$ order SDR codewords, etc.) for each of chroma channels c0 and c1 as follows:

$$u^{c0} = [u_0^{c0} u_1^{c0} \ldots u_{R-1}^{c0}]^T \qquad (18\text{-}1)$$

$$u^{c1} = [u_0^{c1} u_1^{c1} \ldots u_{R-1}^{c1}]^T \qquad (18\text{-}2)$$

where the superscript T denotes transposition; $u^{c0}$ denotes a vector comprising the MMR coefficients $u_0^{c0} u_1^{c0} \ldots u_{R-1}^{c0}$ for chroma channel c0; and $u^{c1}$ denotes a vector comprising the MMR coefficients $u_0^{c1} u_1^{c1} \ldots u_{R-1}^{c1}$ for chroma channel c1.

Denote SDR codewords of the t-th pixel in the three SDR color channels as $(s_t^y, s_t^{c0}, s_t^{c1})$, where $s_t^y$ represents the SDR codeword of the t-th pixel for the luma channel denoted as y, $s_t^{c0}$ represents the SDR codeword of the t-th pixel for chroma channel c0, and $s_t^{c1}$ represents the SDR codeword of the t-th pixel for chroma channel c1. To predict target chroma codewords (or to generate backward reshaped chroma codewords) from the SDR codewords of the t-th pixel for a target display, a vector of R elements representing various order SDR codewords may be constructed as follows:

$$g_t = [1 \, s_t^y \, s_t^{c0} \, s_t^{c1} \, s_t^y \cdot s_t^{c0} \, s_t^y \cdot s_t^{c1} \, s_t^{c0} \cdot s_t^{c1} \, s_t^y \cdot s_t^{c0} \cdot s_t^{c1} \, (s_t^y)^2 \\ (s_t^{c0})^2 (s_t^{c1})^2 (s_t^y \cdot s_t^{c0})^2 (s_t^y \cdot s_t^{c1})^2 (s_t^{c0} \cdot s_t^{c1})^2 \\ (s_t^y \cdot s_t^{c0} \cdot s_t^{c1})^2 (s_t^y)^3 (s_t^{c0})^3 (s_t^{c1})^3 (s_t^y \cdot s_t^{c0})^3 (s_t^y \cdot s_t^{c1})^3 \\ (s_t^{c0} \cdot s_t^{c1})^3 (s_t^y \cdot s_t^{c0} \cdot s_t^{c1})^3] \qquad (19)$$

Denote the 1-th element inside $g_t$ as $g_{t,l}$, where l is an integer between 0 and R−1. The predicted target codewords can be obtained based on the MMR coefficients as follows:

$$\hat{v}_t^{c0} = g_t \cdot u^{c0} \qquad (20\text{-}1)$$

$$\hat{v}_t^{c1} = g_t \cdot u^{c1} \qquad (20\text{-}2)$$

To achieve H-layer progressive coding for the MMR coefficients, the MMR coefficients may be partitioned into H groups. Denote index partition boundaries in the MMR coefficient indexes (see expressions (18-1) and (18-2) above) from 0 to R−1 as $\{q_i\}$, where i is an integer between 1 and H; $q_H$ is R−1. Then the MMR coefficient indexes from 0 to R−1 can be partitioned as follows:

$$\Omega_1 = \{0, 1, \ldots, q_1 - 1\}$$

$$\Omega_2 = \{q_1, q_1 + 1, \ldots, q_2 - 1\}$$

$$\ldots$$

$$\Omega_H = \{q_{H-1}, q_{H-1} + 1, \ldots, q_H - 1\} \qquad (21)$$

Based on the partitions of the MMR coefficient indexes in expressions (21) above, the MMR coefficients can be partitioned into different MMR coefficient partitions $u_i^{c0} u_i^{c1}$, where i is an integer between 1 and H, as follows:

$$u_i^{c0} = [\{u_n^{c0} | n \in \Omega_i\}]^T \qquad (22\text{-}1)$$

$$u_i^{c1} = [\{u_n^{c1} | n \in \Omega_i\}]^T \qquad (22\text{-}2)$$

The vectors $u^{c0}$ and $u^{c1}$ may be rewritten based on the MMR coefficient partitions $u_i^{c0}$ and $u_i^{c1}$ as follows:

$$u^{c0} = \begin{bmatrix} u_1^{c0} \\ u_2^{c0} \\ \vdots \\ u_H^{c0} \end{bmatrix} \qquad (23\text{-}1)$$

$$u^{c1} = \begin{bmatrix} u_1^{c1} \\ u_2^{c1} \\ \vdots \\ u_H^{c1} \end{bmatrix} \qquad (23\text{-}2)$$

Based on the partitions of the MMR coefficient indexes in expressions (21) above, the R elements in the vector $g_t$ constructed from the SDR codewords of the t-th pixel in expression (19) can also be partitioned into different partitions $g_{t,i}$, where i is an integer between 1 and H, as follows:

$$g_{t,i} = [\{g_{t,n} | n \in \Omega_i\}] \qquad (24)$$

Thus, the vector $g_t$ may be rewritten based on the partitions $g_{t,i}$ as follows:

$$g_t = [g_{t,1} g_{t,2} \ldots g_{t,H}] \qquad (25)$$

Optimized MMR coefficients may be progressively or consecutively (depending on the capability of a specific display device) encoded in image metadata as composer metadata and transmitted with SDR images to a receiver (operating with the specific display device).

A video decoder (or a receiver) operating with a specific display device may determine that the capability of the specific display device is comparable to a specific target display among the target displays supported under SLPC (or target displays 1, . . . , k, . . . H).

In response to determining that the specific display device is comparable to the SDR reference display (e.g., 125 of FIG. 1A, etc.), the receiver may select to retrieve SDR images (117) but no composer metadata from the upstream video encoder.

In response to determining that the specific display device is comparable to the $1^{st}$ target display, the receiver may select to retrieve the SDR images (117) along with MMR coefficients $\{u_1^{c0}\}$ and $\{u_1^{c1}\}$ in the composer metadata of the first level from the upstream video encoder. The MMR coefficients $\{u_1^{c0}\}$ and $\{u_1^{c1}\}$ may be used by the video decoder to backward reshape chroma codewords in the SDR images (117) into first target chroma codewords in the first backward reshaped images optimized for the $1^{st}$ target display.

In response to determining that the specific display device is comparable to the $2^{nd}$ target display, the receiver may select to retrieve the SDR images (117) along with MMR coefficients $\{u_2^{c0}\}$ and $\{u_2^{c1}\}$ in the composer metadata of the second level, in combination with the MMR coefficients $\{u_1^{c0}\}$ and $\{u_1^{c1}\}$ in the composer metadata of the first level, from the upstream video encoder. The MMR coefficients $\{u_1^{c0}, u_2^{c0}\}$ and $\{u_1^{c1}, u_2^{c1}\}$ may be used by the video decoder to backward reshape the chroma codewords in the SDR images (117) into second target chroma codewords in the second backward reshaped images optimized for the $1^{st}$ target display.

In response to determining that the specific display device is comparable to the k-th target display, the receiver may select to retrieve the SDR images (117) along with M coefficients $\{u_k^{c0}\}$ and $\{u_k^{c1}\}$ in the composer metadata of the k-th level, in combination with the MMR coefficients $\{u_1^{c0}, u_2^{c0}, \ldots, u_{k-1}^{c0}\}$ and $\{u_1^{c1}, u_2^{c1}, \ldots, u_{k-1}^{c1}\}$ the composer metadata of preceding levels up to the (k−1)-th level, from the upstream video encoder. The MMR coefficients $\{u_1^{c0}, u_2^{c0}, \ldots, u_{k-1}^{c0}, u_k^{c0}\}$ and $\{u_1^{c1}, u_2^{c1}, \ldots, u_{k-1}^{c1}, u_k^{c1}\}$ may be used by the video decoder to backward reshape the chroma codewords in the SDR images (117) into k-th target chroma codewords in the k-th backward reshaped images optimized for the k-th target display.

Backward reshaping mappings $u_{1 \to k}^{c0}$ and $u_{1 \to k}^{c1}$ (e.g., backward reshaping matrixes, etc.) to be used to obtain/predict target chroma codewords in the chroma channels c0 and c1 for the k-th target display can be built by the receiver with the MMR coefficients $\{u_1^{c0}, u_2^{c0}, \ldots, u_{k-1}^{c0}, u_k^{c0}\}$ and $\{u_1^{c1}, u_2^{c1}, \ldots, u_{k-1}^{c1}, u_k^{c1}\}$ in the received composer metadata of all levels up to the k-th level as follows:

$$u_{1 \to k}^{c0} = \begin{bmatrix} u_1^{c0} \\ u_2^{c0} \\ \vdots \\ u_k^{c0} \end{bmatrix} \quad (26\text{-}1)$$

$$u_{1 \to k}^{c1} = \begin{bmatrix} u_1^{c1} \\ u_2^{c1} \\ \vdots \\ u_k^{c1} \end{bmatrix} \quad (26\text{-}2)$$

A vector representing up to the k-th order SDR codewords may be constructed as follows:

$$g_{t,1 \to k} = [g_{t,1} g_{t,2} \cdots g_{t,k}] \quad (27)$$

Target chroma codewords in the chroma channels c0 and c1 for the k-th target display with a maximum luminance value $T_{max}^k$ can be obtained or predicted as follows:

$$\hat{v}_t^{k,c0} = g_{t,1 \to k} \cdot u_{1 \to k}^{c0} \quad (28\text{-}1)$$

$$\hat{v}_t^{k,c1} = g_{t,1 \to k} \cdot u_{1 \to k}^{c1} \quad (28\text{-}2)$$

Pixel-Based MMR Optimization

In some embodiments, reference target images (e.g., reference HDR images, etc.) that represent high quality version of the same content as SDR images (117) may be available for some or all of the target displays.

In some embodiment, pixel-based optimization and/or encoding methods may be used to generate and/or encode MMR coefficients as described herein with the reference target images.

Denote the total number of pixels in an SDR image or its corresponding reference target image for the k-th target display as J. Reference target pixel values in the reference target image for the k-th target display with the maximum luminance value $T_{max}^k$ can be collected into vectors as follows:

$$v^{k,c0} = \begin{bmatrix} v_0^{k,c0} \\ v_1^{k,c0} \\ \vdots \\ v_{J-1}^{k,c0} \end{bmatrix} \quad (29\text{-}1)$$

$$v^{k,c1} = \begin{bmatrix} v_0^{k,c1} \\ v_1^{k,c1} \\ \vdots \\ v_{J-1}^{k,c1} \end{bmatrix} \quad (29\text{-}2)$$

Similarly, predicted (or backward reshaped) target pixel values in a backward reshaped image to approximate the reference target image for the k-th target display with the maximum $T_{max}^k$ can be collected into vectors as follows:

$$\hat{v}^{k,c0} = \begin{bmatrix} \hat{v}_0^{k,c0} \\ \hat{v}_1^{k,c0} \\ \vdots \\ \hat{v}_{J-1}^{k,c0} \end{bmatrix} \quad (30\text{-}1)$$

$$\hat{v}^{k,c1} = \begin{bmatrix} \hat{v}_0^{k,c1} \\ \hat{v}_1^{k,c1} \\ \vdots \\ \hat{v}_{J-1}^{k,c1} \end{bmatrix} \quad (30\text{-}2)$$

A vector representing up to the k-th order SDR codewords may be constructed as follows:

$$G_{1 \to k} = \begin{bmatrix} g_{0,1 \to k} \\ g_{1,1 \to k} \\ \vdots \\ g_{J-1,1 \to k} \end{bmatrix} \quad (31)$$

The predicted (or backward reshaped) target pixel values in a backward reshaped image to approximate the reference target image for the k-th target display with the maximum $T_{max}^k$ can be derived from the SDR codewords as follows:

$$\hat{v}^{k,c0} = G_{1 \to k} \cdot u_{1 \to k}^{c0} \quad (32\text{-}1)$$

$$\hat{v}^{k,c1} = G_{1 \to k} \cdot u_{1 \to k}^{c1} \quad (32\text{-}2)$$

The optimization problem for obtaining optimized values for the MMR coefficients $u_{1 \to k}^{c0}$ and $u_{1 \to k}^{c1}$ can be formulated to minimize the overall approximation error for all k as follows:

for channel c0: $\min_{u_{1\to k}^{c0}} \sum_{k=1}^{H} \|v^{k,c0} - \hat{v}^{k,c0}\|^2$ (33-1)

for channel c1: $\min_{u_{1\to k}^{c1}} \sum_{k=1}^{H} \|v^{k,c1} - \hat{v}^{k,c1}\|^2$ (33-2)

The optimization problem may be reformulated by first collecting reference target pixel values for all H layers (or for all the target displays supported under SLPC) into reference vectors as follows:

$$V^{c0} = \begin{bmatrix} v^{1,c0} \\ v^{2,c0} \\ \vdots \\ v^{H,c0} \end{bmatrix}$$ (34-1)

$$V^{c1} = \begin{bmatrix} v^{1,c1} \\ v^{2,c1} \\ \vdots \\ v^{H,c1} \end{bmatrix}$$ (34-2)

Then predicted (or backward reshaped) target pixel values for all H layers (or for all the target displays supported under SLPC) may be collected into predicted vectors as follows:

$$\hat{V}^{c0} = \begin{bmatrix} \hat{v}^{1,c0} \\ \hat{v}^{2,c0} \\ \vdots \\ \hat{v}^{H,c0} \end{bmatrix}$$ (35-1)

$$\hat{V}^{c1} = \begin{bmatrix} \hat{v}^{1,c1} \\ \hat{v}^{2,c1} \\ \vdots \\ \hat{v}^{H,c1} \end{bmatrix}$$ (35-2)

Denote $$G_k = \begin{bmatrix} g_{0,k} \\ g_{1,k} \\ \vdots \\ g_{J-1,k} \end{bmatrix}$$ (36)

$$G = \begin{bmatrix} G_1 & 0 & 0 & \cdots & 0 \\ G_1 & G_2 & 0 & \cdots & 0 \\ \vdots & \vdots & \vdots & \ddots & 0 \\ G_1 & G_2 & G_3 & \cdots & G_H \end{bmatrix}$$ (37)

Then the predicted vectors for the chroma channels c0 and c1 can be obtained or predicted as follows:

$$\hat{V}^{c0} = G \cdot u^{c0}$$ (38-1)

$$\hat{V}^{c1} = G \cdot u^{c1}$$ (38-2)

Further, the optimization problem for obtaining the optimized MMR coefficients in the chroma channels c0 and c1 can be reformulated as follows:

for channel c0: $\min_{u^{c0}} \|V^{c0} - \hat{V}^{c0}\|^2$ (39-1)

for channel c1: $\min_{u^{c1}} \|V^{c1} - \hat{V}^{c1}\|^2$ (39-2)

The optimal MMR coefficients can be obtained as a solution to the optimization program as follows:

$$u^{c0,opt} = ((G)^T G)^{-1}((G)^T V^{c0})$$ (40-1)

$$u^{c1,opt} = ((G)^T G)^{-1}((G)^T V^{c1})$$ (40-2)

In some embodiments, the matrixes in expressions (40-1) and (40-2) may be partitioned into smaller constructs. The optimal MMR coefficients can be generated by way of summation based on the smaller constructs. Additionally, optionally or alternatively, sequential optimization may also be used in one embodiment.

Histogram-Based MMR Optimization

In some embodiment, histogram-based optimization and/or encoding methods may be used to generate and/or encode MMR coefficients as described herein with the reference target images.

An SDR codeword space (e.g., comprising all possible SDR codewords for encoding, etc.) within which SDR codewords (e.g., in the SDR images (117), decoded images (182), etc.) in an input SDR signal are encoded can be partitioned into a plurality of histogram bins for each color channel in the luma and chroma channels. In a non-limiting embodiment, the SDR codeword space is partitioned into $\pi \times \pi \times \pi$ cubes or P histogram bins in total, where $\pi$ may be R or may be a different integer greater than one, P is $\pi \times \pi \times \pi$.

Each pixel (in the SDR images (117) encoded in the input SDR signal) with SDR codewords in the luma and chroma channels that fall within a SDR codeword sub-space represented by a histogram bin (e.g., each of the P histogram, etc.) with a histogram bin index ($b^y$, $b^{c0}$, $b^{c1}$), where each of $b^y$, $b^{c0}$, $b^{c1}$ represents an integer between 1 and $\pi$, can be counted or aggregated into the histogram bin.

In addition, SDR codewords in the histogram bin may be collectively represented by representative SDR codewords $s(b^y, b^{c0}, b^{c1})$ located within the SDR codeword sub-space represented by the histogram as follows:

$$s(b^y, b^{c0}, b^{c1}) = \begin{bmatrix} s^y(b^y, b^{c0}, b^{c1}) \\ s^{c0}(b^y, b^{c0}, b^{c1}) \\ s^{c1}(b^y, b^{c0}, b^{c1}) \end{bmatrix}$$ (41)

where the representative SDR codewords $s(b^y, b^{c0}, b^{c1})$ may be selected to correspond to a specific point such as the center in the codeword sub-space represented by the histogram. Additionally, optionally or alternatively, the representative SDR codewords $s(b^y, b^{c0}, b^{c1})$ may be set to weighted or unweighted mean values among all the SDR codewords counted into the histogram bin.

In some embodiments, reference target images (e.g., reference HDR images, etc.) that represent high quality version of the same content as the SDR images (117) are available for some or all of the target displays. For example, reference target images may be available for the k-th target display with the maximum luminance value $T_{max}^k$.

SDR pixels in the SDR images (117) for the SDR display (125) have corresponding target pixels in the reference target images for the k-th target display with the maximum luminance value $T_{max}^k$.

Based on reference target codewords of the target pixels (corresponding to the SDR pixels that are counted into the histogram bin) in the reference target images for the k-th target display, mapped reference codewords for the representative SDR codewords $s(b^y, b^{c0}, b^{c1})$ of the histogram bin may be determined (e.g., as mean values, etc.) as follows:

Denote mapped reference codewords for the k-th target display with the maximum luminance value $T_{max}^k$, which correspond to the representative SDR codewords $s(b^y, b^{c0}, b^{c1})$ of the histogram bin (e.g., in a three-dimensional or 3D lookup table, etc.), as follows:

$$v^k(b^y, b^{c0}, b^{c1}) = \begin{bmatrix} v^{k,y}(b^y, b^{c0}, b^{c1}) \\ v^{k,c0}(b^y, b^{c0}, b^{c1}) \\ v^{k,c1}(b^y, b^{c0}, b^{c1}) \end{bmatrix} \quad (42)$$

By collecting all SDR pixels into all the P histogram bins (as indexed by $(b^y, b^{c0}, b^{c1})$ respectively and determining all mapped reference codewords corresponding to all representative SDR codewords, all codeword mappings from the all representative SDR codewords of all the P histogram bins to all mapped reference codewords for the k-th target display with the maximum luminance value $T_{max}^k$. These codeword mappings may be denoted as follows:

$$\{s(b^y,b^{c0},b^{c1})\} \text{ to } \{v^k(b^y,b^{c0},b^{c1})\} \quad (43)$$

In some embodiments, mapped reference codewords may be computed (e.g., as mean values, etc.) from reference target codewords of target pixels (in the reference target images) corresponding to the SDR pixels (whose SDR codewords are used to determine histogram bin indexes).

An example procedure for counting the SDR pixels into histograms and computing aggregated reference target codewords for each of the histogram bins is illustrated in TABLE 1 below.

TABLE 1

```
// initialization
h^s(b^y ,b^{c0} ,b^{c1}) = 0 // for all bin index (b^y ,b^{c0} ,b^{c1})
v^{k,y}(b^y ,b^{c0} ,b^{c1}) = 0 // for sums of reference target codewords in the luma
            // channels for all bin index (b^y , b^{c0} ,b^{c1})
v^{k,c0}(b^y ,b^{c0} ,b^{c1}) = 0 // for sums of reference target codewords in the
chroma
            // channel c0 for all bin index (b^y,b^{c0},b^{c1})
v^{k,c1}(b^y ,b^{c0} ,b^{c1}) = 0 // for sums of reference target codewords in the
chroma
            // channel c1 for all bin index (b^y ,b^{c0} ,b^{c1})
// scan for each pixel
for each pixel t in an SDR image/frame and a reference target image/
frame
   find SDR value (s_t^y ,s_t^{c0} ,s_t^{c1})
   find bin index for (s_t^y ,s_t^{c0} ,s_t^{c1}) as (b_t^y ,b_t^{c0} ,b_t^{c1}) // quantization
   // update a corresponding histogram bin
   h^s(b_t^y ,b_t^{c0} ,b_t^{c1}) ++
   // update the sums of reference target codewords for the
   corresponding
   // histogram bin in all luma and chroma channels
   v^{k,y}(b_t^y ,b_t^{c0} ,b_t^{c1}) = v^{k,y} (b_t^y ,b_t^{c0} ,b_t^{c1}) + v_t^{k,y}
   v^{k,c0}(b_t^y ,b_t^{c0} ,b_t^{c1}) = v^{k,c0} (b_t^y ,b_t^{c0} ,b_t^{c1}) + v_t^{k,c0}
   v^{k,c1}(b_t^y ,b_t^{c0} ,b_t^{c1}) = v^{k,c1} (b_t^y ,b_t^{c0} ,b_t^{c1}) + v_t^{k,c1}
End
```

In some embodiments, only a histogram bin as indexed by $(b^y, b^{c0}, b^{c1})$ whose $h^s(b^y, b^{c0}, b^{c1}) > 0$ is included in a valid set $\Phi$ used in the MMR coefficient generation process. Thus, $$\Phi = \{(b^y,b^{c0},b^{c1}) | h^s(b^y,b^{c0},b^{c1}) > 0\} \quad (44)$$

An example procedure for constructing the valid set $\Phi$ is illustrated in TABLE 2 below.

TABLE 2

```
// scan for each cube
i = 0;
for each cube (b^y,b^{c0},b^{c1})
   if( h^s(b^y,b^{c0},b^{c1}) > 0 )
      // assign the histogram index (b^y,b^{c0},b^{c1})to 1D index φ_i
      φ_i ← (b^y,b^{c0},b^{c1})
      // assign SDR value
      s_{φ_i}^y = s^y (b^y,b^{c0},b^{c1})
      s_{φ_i}^{c0} = s^{c0} (b^y,b^{c0},b^{c1})
      s_{φ_i}^{c1} = s^{c1} (b^y,b^{c0},b^{c1})
      // calculate mapped reference codewords (or values)
```

$$v_{φ_i}^{k,y} = \frac{v^{k,y}(b^y, b^{c0}, b^{c1})}{h^s(b^y, b^{c0}, b^{c1})} \text{ // compute mean value(s)}$$

$$v_{φ_i}^{k,c0} = \frac{v^{k,c0}(b^y, b^{c0}, b^{c1})}{h^s(b^y, b^{c0}, b^{c1})} \text{ // compute mean value(s)}$$

$$v_{φ_i}^{k,c1} = \frac{v^{k,c1}(b^y, b^{c0}, b^{c1})}{h^s(b^y, b^{c0}, b^{c1})} \text{ // compute mean value(s)}$$

```
      i ++;
   end
end
```

Denote the total number of all codeword mappings (or non-zero mapping pairs) from all representative SDR codewords $\{s_{\Phi_i}^y, s_{\Phi_i}^{c0}, s_{\Phi_i}^{c1}\}$ to all mapped reference codewords $\{v_{\Phi_i}^{k,y}, v_{\Phi_i}^{k,c0}, v_{\Phi_i}^{k,c1}\}$ for the k-th target display with the maximum luminance value $T_{max}^k$ in the valid set $\Phi$ as Q (or $Q=|\Phi|$).

Based on the Q codeword mappings (or non-zero mapping pairs) in the valid set $\Phi$, a MMR coefficient generation method like that used in pixel-based MMR coefficient optimization can be used to generate optimized MMR coefficients.

The optimization problem may be reformulated by first collecting mapped reference codewords up to the k-th target display (in all the target displays supported under SLPC) into reference vectors as follows:

$$v^{k,c0} = \begin{bmatrix} v_{\phi_0}^{k,c0} \\ v_{\phi_1}^{k,c0} \\ \vdots \\ v_{\phi_{Q-1}}^{k,c0} \end{bmatrix} \quad (45-1)$$

$$v^{k,c1} = \begin{bmatrix} v_{\phi_0}^{k,c1} \\ v_{\phi_1}^{k,c1} \\ \vdots \\ v_{\phi_{Q-1}}^{k,c1} \end{bmatrix} \quad (45-2)$$

Then predicted (or backward reshaped) target codewords up to the k-th target display (in all the target displays supported under SLPC) may be collected into predicted vectors as follows:

$$\hat{v}^{k,c0} = \begin{bmatrix} \hat{v}^{k,c0}_{\phi_0} \\ \hat{v}^{k,c0}_{\phi_1} \\ \vdots \\ \hat{v}^{k,c0}_{\phi_{Q-1}} \end{bmatrix} \quad (46\text{-}1)$$

$$\hat{v}^{k,c1} = \begin{bmatrix} \hat{v}^{k,c1}_{\phi_0} \\ \hat{v}^{k,c1}_{\phi_1} \\ \vdots \\ \hat{v}^{k,c1}_{\phi_{Q-1}} \end{bmatrix} \quad (46\text{-}2)$$

Denote $$g_{\phi_i} = [1\, s^y_{\phi_i}\, s^{c0}_{\phi_i}\, s^{c1}_{\phi_i}\, s^y_{\phi_i}\cdot s^{c0}_{\phi_i}\, s^y_{\phi_i}\cdot s^{c1}_{\phi_i}\, s^{c0}_{\phi_i}\cdot s^{c1}_{\phi_i}\, s^y_{\phi_i}\cdot s^{c0}_{\phi_i}\cdot s^{c1}_{\phi_i}\, (s^y_{\phi_i})^2 \ldots ] \quad (47)$$

The rest of procedures for histogram-based MMR coefficient optimization may be identical or similar to those for pixel-based MMR coefficient optimization (see, e.g., expressions (37) through (40)).

MMR Coefficient Optimization without Reference Target Images

In operational scenarios in which reference target images for target displays are not available, optimized polynomial and/or MMR coefficients may still be obtained based at least in part on pixel-based approximation, histogram-based approximation, coefficient training, machine learning, and so forth. Examples of training coefficients/parameters used in backward reshaping mappings (e.g., for luma codewords, etc.) can be found in U.S. Provisional Patent Application No. 62/520,832, filed on 16 Jun. 2017, the entire contents of which are hereby incorporated by reference as if fully set forth herein.

In some embodiments, a polynomial modulation predicted target chroma codeword $\tilde{v}_t^{k,c0}$ of a target pixel in a polynomial modulation predicted target image in the chroma channel c0 (for illustration purposes only; the chroma channel c1 can be similarly processed/deduced) for the k-th target display can be predicted by a luma-modulated function of SDR codewords $s_t^{c0}$ and $s_t^y$ of a corresponding SDR pixel in an SDR image as follows:

$$\tilde{v}_t^{k,c0} = (s_t^{c0} - 0.5)\cdot F_{1\to k}(s_t^y) + 0.5 \quad (48)$$

where $F_{1\to k}(s_t^y)$ may be represented as a M-th order polynomial of SDR luma codeword $s_t^y$ as follows:

$$F_{1\to k}(s_t^y) = \quad (49)$$

$$\alpha_{0,1\to k} + \alpha_{1,1\to k}\cdot s_t^y + \ldots + \alpha_{M,1\to k}\cdot (s_t^y)^M = \sum_{m=0}^{M} \alpha_{m,1\to k}\cdot (s_t^y)^m$$

$F_{1\to k}(s_t^y)$ in expression (49) above can be plugged into $\tilde{v}_t^{k,c0}$ in expression (48) above:

$$\tilde{v}_t^{k,c0} = (s_t^{c0} - 0.5)\cdot \sum_{m=0}^{M} \alpha_{m,1\to k}\cdot (s_t^y)^m + 0.5 \quad (50)$$

After reorganizing of the terms, the polynomial modulation predicted target chroma codeword $\tilde{v}_t^{k,c0}$ (of the target pixel in the target image in the chroma channel c0) in expression (50) can be rewritten as follows:

$$\tilde{v}_t^{k,c0} = [1\ s_t^y\ s_t^y\cdot s_t^{c0}\ \ldots\ s_t^{c0}\cdot(s_t^y)^M] \begin{bmatrix} 0.5 - 0.5\alpha_{0,1\to k} \\ \vdots \\ \vdots \\ \vdots \end{bmatrix} = \quad (51)$$

$$d_t^{c0} \cdot \varphi_{1\to k}$$

where $$d_t^{c0} = [1\ s_t^y\ s_t^y\cdot s_t^{c0}\ \ldots\ s_t^{c0}\cdot(s_t^y)^M] \quad (52\text{-}1)$$

$$\varphi_k = \begin{bmatrix} 0.5 - 0.5\alpha_{0,1\to k} \\ \vdots \\ \vdots \\ \vdots \end{bmatrix} \quad (52\text{-}2)$$

As shown in expression (52-2), $\varphi_k$ represents a vector comprising terms derived from $\alpha_{m,1\to k}$ in expression (49) above.

In some embodiment, pixel-based optimization and/or encoding methods may be used to generate and/or encode MMR coefficients as described herein with polynomial modulation predicted target codewords in polynomial modulation predicted target images, where the polynomial modulation predicted target codewords can be predicted based on expressions (48) through (52) above.

Denote the total number of pixels in an SDR image or its corresponding polynomial modulation predicted image for the k-th target display as J. Polynomial modulation predicted target codewords of the chroma channel c0 in the polynomial modulation predicted target image for the k-th target display with the maximum luminance value $T_{max}^k$ can be collected into vectors as follows:

$$\tilde{v}^{k,c0} = \begin{bmatrix} \tilde{v}_0^{k,c0} \\ \tilde{v}_1^{k,c0} \\ \vdots \\ \tilde{v}_{J-1}^{k,c0} \end{bmatrix}$$

$$\tilde{v}^{k,c0} = D^{c0}\cdot \varphi_k \quad (53)$$

where $$D^{c0} = \begin{bmatrix} d_0^{c0} \\ d_1^{c0} \\ \vdots \\ d_{B-1}^{c0} \end{bmatrix} \quad (54)$$

To support using MMR at the decoder side to perform prediction or backward reshaping, the polynomial modulation predicted target codewords $\tilde{v}_t^{k,c0}$ in the polynomial modulation predicted target image for the k-th target display as generated using $\varphi_{1\to k}$ can be converted to (or can serve as prediction targets for) predicted (or backward reshaped) codewords $\tilde{v}_t^{k,c0}$ in a backward reshaped target image generated using MMR coefficients as follows:

$$\tilde{v}^{k,c0} = \begin{bmatrix} \tilde{v}_0^{k,c0} \\ \tilde{v}_1^{k,c0} \\ \vdots \\ \tilde{v}_{J-1}^{k,c0} \end{bmatrix} \quad (55\text{-}1)$$

$$\tilde{v}_t^{k,c0} = g_{t,1 \to k} \cdot u_{1 \to k}^{c0} \quad (55\text{-}2)$$

$$\tilde{v}_t^{k,c0} = [\, g_{t,1} \;\; g_{t,2} \;\; \cdots \;\; g_{t,k} \,] \begin{bmatrix} u_1^{c0} \\ u_2^{c0} \\ \vdots \\ u_k^{c0} \end{bmatrix} \quad (55\text{-}3)$$

Using notations similar to those used in expressions (31) and (32) above, a vector representing up to the k-th order SDR codewords may be constructed as follows:

$$G_{1 \to k} = \begin{bmatrix} g_{0,1 \to k} \\ g_{1,1 \to k} \\ \vdots \\ g_{J-1,1 \to k} \end{bmatrix} \quad (56)$$

The predicted (or backward reshaped) target codewords in the chroma channel c0 in the backward reshaped image for the k-th target display with the maximum $T_{max}^k$ can be derived from the SDR codewords as follows:

$$\tilde{v}^{k,c0} = G_{1 \to k} \cdot u_{1 \to k}^{c0} \quad (57)$$

The optimization problem may be reformulated by first collecting polynomial modulation predicted target codewords in the chroma channel c0 for all H layers (or for all the target displays supported under SLPC) into polynomial modulation predicted vectors as follows:

$$\tilde{V}^{c0} = \begin{bmatrix} \tilde{v}^{1,c0} \\ \tilde{v}^{2,c0} \\ \vdots \\ \tilde{v}^{H,c0} \end{bmatrix} \quad (58)$$

Then predicted (or backward reshaped) target codewords in the chroma channel c0 for all H layers (or for all the target displays supported under SLPC) using MMR may be collected into predicted vectors as follows:

$$\hat{V}^{c0} = \begin{bmatrix} \hat{v}^{1,c0} \\ \hat{v}^{2,c0} \\ \vdots \\ \hat{v}^{H,c0} \end{bmatrix} \quad (59)$$

Denote $$\Psi = \begin{bmatrix} \varphi_1 \\ \varphi_2 \\ \vdots \\ \varphi_H \end{bmatrix} \quad (60)$$

-continued $$\tilde{D}^{c0} = \begin{bmatrix} D^{c0} & 0 & 0 & \cdots & 0 \\ 0 & D^{c0} & 0 & \cdots & 0 \\ \vdots & \vdots & \vdots & \ddots & 0 \\ 0 & 0 & 0 & \cdots & D^{c0} \end{bmatrix} \quad (61)$$

and similar to expressions (23), (36) and (37) above, $$G_k = \begin{bmatrix} g_{0,k} \\ g_{1,k} \\ \vdots \\ g_{B-1,k} \end{bmatrix} \quad (62\text{-}1)$$

$$G = \begin{bmatrix} G_1 & 0 & 0 & \cdots & 0 \\ G_1 & G_2 & 0 & \cdots & 0 \\ \vdots & \vdots & \vdots & \ddots & 0 \\ G_1 & G_2 & G_3 & \cdots & G_H \end{bmatrix} \quad (62\text{-}2)$$

$$u_{1 \to k}^{c0} = \begin{bmatrix} u_1^{c0} \\ u_2^{c0} \\ \vdots \\ u_k^{c0} \end{bmatrix} \quad (62\text{-}3)$$

$$u^{c0} = \begin{bmatrix} u_1^{c0} \\ u_2^{c0} \\ \vdots \\ u_H^{c0} \end{bmatrix} \quad (62\text{-}4)$$

Then the polynomial modulation predicted vector and the MMR predicted vectors for the chroma channel c0 can be obtained or predicted, respectively, as follows:

$$\tilde{V}^{c0} = \tilde{D}^{c0} \cdot \Psi \quad (63\text{-}1)$$

$$\hat{V}^{c0} = G \cdot u^{c0} \quad (63\text{-}2)$$

Optimized values $u^{c0,opt}$ of the MMR coefficients $u^{c0}$ for the chroma channel c0 can be obtained as a solution to the optimization problem as follows:

$$\min_{u^{c0}} \left\| \tilde{V}^{c0} - \hat{V}^{c0} \right\|^2$$

Thus the optimal MMR coefficients $u^{c0,opt}$ can be obtained as the solution as follows:

$$u^{c0,opt} = ((G)^T G)^{-1} ((G)^T \tilde{D}^{c0}) \Psi \quad (64)$$

Denote $$R^{c0} = ((G)^T G)^{-1} ((G)^T \tilde{D}^{c0}) \quad (65)$$

The matrix $R^{c0}$ in expressions (64) and (65) above can be trained (e.g., in advance, dynamically, continuously, etc.) with a training data set of images (which may be different from the SDR images (117) and corresponding reference target images) from an image database that comprises SDR images and their corresponding reference target images. In some embodiments, (e.g., most recently trained, etc.) $R^{c0}$ may be used as a static matrix to convert parameters/coefficients in polynomial modulation to optimal MMR coefficients in MMR by simply multiplying $\Psi$ with $R^{c0}$ as follows:

$$u^{c0,opt} = R^{c0} \cdot \Psi \quad (66)$$

In adaptive systems, for each input SDR image or each group of input SDR images, owing to different constraints such as those related to saturation or invertibility, different polynomials $\{F_{1\to k}(s_t^y)|k=1, \ldots, H\}$ may be used from frame to frame. Thus, given different $\Psi$ constructed from coefficients of the different polynomials, corresponding optimized MMR coefficients can be obtained via a simple matrix multiplication using expression (66).

Procedures similar to the foregoing procedures for obtaining optimal MMR coefficients for the chroma channel c0 can be used to obtain optimal MMR coefficients for the chroma channel c1, as follows:

$$u^{c1,opt} = ((G)^T G)^{-1}((G)^T \tilde{D}^{c1})\Psi \quad (67)$$

$$u^{c1,opt} = R^{c1} \cdot \Psi \quad (68)$$

where $$R^{c1} = ((G)^T G)^{-1}((G)^T \tilde{D}^{c1}) \quad (69)$$

Additionally, optionally or alternatively, $F_{1\to k}(s_t^y)$ in expression (49) above can be replaced by a more complicated polynomial that takes into account additional cross-variable terms, high-order terms, etc., as follows:

$$F_{1\to k}^{c0}(s_t^y, s_t^{c0}) = \beta_{0,1\to k} + \beta_{1,1\to k} \cdot s_t^y + \beta_{2,1\to k} \cdot s_t^{c0} + \beta_{3,1\to k} \cdot s_t^y \cdot s_t^{c0} + \ldots + \beta_{X,1\to k}(s_t^y)^M \cdot (s_t^{c0})^M \quad (70)$$

Optimal MMR coefficients can be converted or trained from coefficients of the polynomial in expression (70) above using procedures similar to those in connection with coefficients of the polynomial in expression (40).

In some embodiments, instead of converting from a polynomial modulated prediction, optimized MMR coefficients used for prediction or backward reshaping the SDR images (117) can be trained (e.g., directly, in advance, dynamically, continuously, etc.) with a training data set of images (which may be different from the SDR images (117) and corresponding reference target images) from an image database that comprises SDR images and their corresponding reference target images.

Denote $G^n$ as the G matrix of reference target image/frame n in the dataset. Denote $V^{n,c0}$ as the $V^{c0}$ of frame n. Given N frames in the dataset, the optimal MMR coefficients can be obtained as follows:

$$u^{c0,opt} = \sum_{n=1}^{N} ((G^n)^T G^n)^{-1} \sum_{n=1}^{N} ((G^n)^T V^{n,c0}) \quad (71\text{-}1)$$

$$u^{c1,opt} = \sum_{n=1}^{N} ((G^n)^T G^n)^{-1} \sum_{n=1}^{N} ((G^n)^T V^{n,c1}) \quad (71\text{-}2)$$

In some embodiments, (e.g., most recently trained, etc.) $u^{c0,opt}$ and $u^{c1,opt}$ may be progressively or consecutively encoded into coded bitstreams. Downstream receiver can extract these optimized MMR coefficients extracted from the coded bitstream to predict or backward reshape the SDR images (117) into target images to a given target display in the multiple target displays supported under SLPC.

Image metadata such as composer metadata that comprises luma polynomial coefficients used for backward reshaping SDR luma codewords into target luma codewords (e.g., HDR target luma codewords, etc.) and chroma MMR coefficients for predicting target chroma codewords (e.g., HDR target chroma codewords, etc.) can be encoded into existing metadata fields in existing metadata containers supported by receivers that have been deployed. Additionally, optionally or alternatively, these polynomial coefficients and/or MMR coefficients can be encoded into new metadata fields and/or new metadata containers supported by newly developed receivers that may or may not have been deployed.

Order of Coefficients in Composer Metadata

In some embodiments, instead of increasing a layer of support for a target display by increasing the polynomial order of a multi-piece polynomial approximating a backward reshaping function for the target display, new polynomial coefficients can be introduced to support a new target display under the same polynomial order (or without increasing the polynomial order of the multi-piece polynomial).

For example, for a total number H of layers of SLPC support for the same total number H of target displays, a mapping table $\beta( )$ may be defined or specified to map a layer index to a polynomial order.

By way of example but not limitation, $\beta( )=[\{0\ 1\}, 1, 2, 2, 2, 3, 3]$, which contains seven entries indexed by layer indexes from 0 to H (H=6). In this present example, the first entry "$\{0, 1\}$" (with a layer index 0) in $\beta( )$ defines a first layer of support for the first target display among the H display, and specifies that 0-th and $1^{st}$ order polynomial coefficients are to be used to define a multi-piece polynomial approximating a backward reshaping function for the first target display. The second entry "1" (with a layer index 1) following the first entry "$\{0, 1\}$" in $\beta( )$ defines a second layer of support for the second target display among the H display, and specifies that new $1^{st}$ order polynomial coefficients, in combination with the 0-th and $1^{st}$ order polynomial coefficients already in the first layer of support, are to be used to define a multi-piece polynomial approximating a backward reshaping function for the second target display. The third entry "2" (with a layer index 2) following the first and second entries "$\{0, 1\}$, 1" in $\beta( )$ defines a third layer of support for the third target display among the H display, and specifies that second order polynomial coefficients, in combination with the 0-th and $1^{st}$ order polynomial coefficients already in the first and second layers of support, are to be used to define a multi-piece polynomial approximating a backward reshaping function for the third target display. In some embodiments, these different layers of support (or different levels of composer metadata) for backward reshaping luma codewords may be consecutively encoded in a coded bitstream. For example, the polynomial coefficients in the first layer of support may be coded first, followed by the polynomial coefficients in the second layer of support, and so forth, in the coded bitstream. In some embodiments, signaling information may be transmitted with image metadata to inform a recipient video decoder how to interpret the "layer" or "level" in the composer metadata (e.g., for backward reshaping chroma codewords, etc.) encoded in a coded bitstream. The signaling information may specify the partition boundary between different layers or different levels (e.g., any two adjacent layers or levels, etc.) of polynomial parameters in the composer metadata. The signaling information allows the recipient video decoder to efficiently and/or accurately decode and construct polynomial(s) for mapping luma codewords.

A fully predicted (or backward reshaped) luma codeword $\hat{L}_b$ (for the H-th target display in the H-th layer of SLPC support) can be defined from a corresponding SDR luma codeword b as follows:

$$\hat{L}_b = \sum_{i=0}^{H} m_{p,i} \cdot b^{\beta(i)} \qquad (72)$$

where i represents the layer index in $\beta(\ )$; $b^{\beta(i)}$ represents the $\beta(i)$-th power of b ($\beta(i)$ represents the exponent).

A k-th predicted (or backward reshaped) luma codeword $\hat{L}_b$ (for the k-th target display) can be defined from a corresponding SDR luma codeword b as follows:

$$\hat{L}_b^k = \sum_{i=0}^{k} m_{p,i} \cdot b^{\beta(i)} \qquad (73)$$

The optimal coefficients can be obtained in the same procedure as described before with the following changed matrix:

$$A_p^k = \begin{bmatrix} 1 & (M_p)^{\beta(1)} & (M_p)^{\beta(2)} & (M_p)^{\beta(3)} & \ldots & (M_p)^{\beta(k)} \\ 1 & (M_p+1)^{\beta(1)} & (M_p+1)^{\beta(2)} & (M_p+1)^{\beta(3)} & \ldots & (M_p+1)^{\beta(k)} \\ \vdots & \vdots & \vdots & \vdots & \ddots & \vdots \\ 1 & (M_{p+1}-1)^{\beta(1)} & (M_{p+1}-1)^{\beta(2)} & (M_{p+1}-1)^{\beta(3)} & \ldots & (M_{p+1}-1)^{\beta(k)} \end{bmatrix} \qquad (74\text{-}1)$$

$$m_p^k = \begin{bmatrix} m_{p,0} \\ m_{p,1} \\ \vdots \\ m_{p,k} \end{bmatrix} \qquad (74\text{-}2)$$

Then $\hat{L}_p^k$ can be derived as follows:

$$\hat{L}_p^k = A_p^k m_p^k \qquad (74\text{-}3)$$

The optimal multi-piece polynomial coefficients for luma prediction (or luma backward reshaping) can be obtained using the same or similar procedures such as the least square method as indicated in expressions (11) through (17).

Similarly, for chroma channels, instead of increasing a layer of support for a target display by increasing the order of MMR terms for the target display, new MMR coefficients can be introduced to support a new target display under the same order of MMR terms (or without increasing the MMR order).

In some embodiments, for the chroma channels, one or more MMR terms can be repeated to support a new target display. Additionally, optionally or alternatively, new cross-channel MMR terms can be used to support a new target display.

An example for repeating MMR terms for (vector or matrix based) multiplication is show as follows:

$$g_t = \\ [1 s_t^y \cdot s_t^{c0} s_t^{c1} s_t^y \cdot s_t^{c0} s_t^y \cdot s_t^{c1} s_t^{c0} \cdot s_t^{c1} s_t^y \cdot s_t^{c0} \cdot s_t^{c1} 1 s_t^y s_t^{c0} s_t^{c1} s_t^y \cdot s_t^{c0} s_t^y \\ \cdot s_t^{c1} s_t^{c0} \cdot s_t^{c1} s_t^y \cdot s_t^{c0} \cdot s_t^{c1} (s_t^y)^2 (s_t^{c0})^2 (s_t^{c1})^2 (s_t^y \cdot s_t^{c0})^2 \\ (s_t^y \cdot s_t^{c1})^2 (s_t^{c0} \cdot s_t^{c1})^2 (s_t^y \cdot s_t^{c0} \cdot s_t^{c1})^2 (s_t^y)^2 (s_t^{c0} \cdot s_t^{c1})^2 \\ (s_t^y \cdot s_t^{c0})^2 (s_t^y \cdot s_t^{c1})^2 (s_t^{c0} \cdot s_t^{c1})^2 (s_t^y \cdot s_t^{c0} \cdot s_t^{c1})^2 (s_t^y)^3 \\ (s_t^{c0})^3 (s_t^{c1})^3 (s_t^y \cdot s_t^{c0})^3 (s_t^y \cdot s_t^{c1})^3 (s_t^{c0} \cdot s_t^{c1})^3 \\ (s_t^y \cdot s_t^{c0} \cdot s_t^{c1})^3 (s_t^y)^3 (s_t^{c0})^3 (s_t^{c1})^3 (s_t^y \cdot s_t^{c0})^3 (s_t^y \cdot s_t^{c1})^3 \\ (s_t^{c0} \cdot s_t^{c1})^3 (s_t^y \cdot s_t^{c0} \cdot s_t^{c1})^3] \qquad (75)$$

An example for creating new cross-channel MMR terms for (vector or matrix based) multiplication is show as follows:

$$g_t = [1 s_t^y s_t^{c0} s_t^{c1} s_t^y \cdot s_t^{c0} s_t^y \cdot s_t^{c1} s_t^{c0} \cdot s_t^{c1} s_t^y \cdot s_t^{c0} \cdot s_t^{c1} (s_t^y)^2 \\ (s_t^{c0})^2 (s_t^{c1})^2 (s_t^y \cdot s_t^{c0})^2 (s_t^y \cdot s_t^{c1})^2 (s_t^{c0} \cdot c1_t)^2 \\ (s_t^y \cdot s_t^{c0} \cdot s_t^{c1})^2 (s_t^y)^2 (s_t^{c0})(s_t^y)^2 (s_t^{c1})(s_t^{c1})^2 (s_t^{c0}) \\ {}^2(s_t^{c1})(s_t^y \cdot s_t^{c0})^2(s_t^{c1})(s_t^y \cdot s_t^{c1})^2(s_t^{c0})(s_t^{c0} \cdot s_t^{c1})^2(s_t^y) \\ (s_t^y)^3(s_t^{c0})^3(s_t^{c1})^3(s_t^y \cdot s_t^{c0})^3(s_t^y \cdot s_t^{c1})^3(s_t^{c0} \cdot s_t^{c1})^3 \\ (s_t^y \cdot s_t^{c0} \cdot s_t^{c1})^3(s_t^y)^3(s_t^{c0})(s_t^y)^3(s_t^{c1})(s_t^{c1})^3(s_t^{c0})(s_t^{c0}) \\ 3(s_t^{c1})(s_t^y \cdot s_t^{c0})^3(s_t^{c1})(s_t^y \cdot s_t^{c1})^3(s_t^{c0})(s_t^{c0} \cdot s_t^{c1})^3(s_t^y)] \qquad (76)$$

The optimal MMR coefficients for chroma prediction (or chroma backward reshaping) can be obtained using the same or similar procedures as previously discussed.

In a first non-limiting empirical example, three layers of SLPC support for three different target displays of enhanced dynamic ranges (EDRs) are supported by composer metadata of three levels. These target displays support maximum or peak luminance values of 400 nits, 1000 nits, and 4000 nits, respectively. SDR images with a spatial resolution of 1920×1080 pixels in a gamma-based Rec. 709 color space are encoded with the composer metadata of the three levels in a full version of a coded bitstream (with less than the full version used to support target displays below the maximum luminance target display). The composer metadata of the three levels can be generated based on three sets of reference target images of the EDRs for the three target displays, obtained based on machine learning using a training dataset, etc. In some embodiments, the three sets of reference target images may comprise images of the same spatial resolution of 1920×1080 pixels in a PQ P3 color space. The composer metadata of the three levels comprises (e.g., zero-th order, first-order, second-order, third-order, etc.) MMR coefficients. In the present example, different layers of SLPC support use different orders of MMR coefficients. More specifically, the composer metadata of the first level in the composer metadata of the three levels comprises eight (8 or indexes 1 through 8) zero-th and first-order MMR coefficients as indexed by eight index values in a first MMR coefficient index partition $\Omega_1 = \{1, \ldots, 8\}$. The composer metadata of the second level in the composer metadata of the three levels comprises seven (7 or indexes 9 through 15) second-order MMR coefficients as indexed by seven index values in a second MMR coefficient index partition $\Omega_2 = \{9, 10, \ldots, 15\}$. The composer metadata of the third level in the composer metadata of the three levels comprises seven (7 or indexes 16 through 22) third-order MMR coefficients as indexed by seven index values in a third MMR coefficient index partition $\Omega_3 = \{16, 17, \ldots, 22\}$. In some embodiments, these different layers of support (or different levels of composer metadata) for backward reshaping chroma codewords may be consecutively encoded in a coded bitstream. For example, the MMR coefficients in the first layer of support may be coded first, followed by the MMR coefficients in the second layer of support, and so forth, in the coded bitstream. In some embodiments, signaling information may be transmitted with image metadata to inform a recipient video decoder how to interpret the "layer" or "level" in the composer metadata (e.g., for backward reshaping chroma codewords, etc.) encoded in a coded bitstream. The signaling information may specify the partition boundary between different layers or different levels (e.g., any two adjacent layers or levels, etc.) of MMR coefficients in the composer metadata. The signaling information allows the recipient video decoder to efficiently and/or accurately decode and construct MMR mapping(s) for mapping chroma codewords.

In a second non-limiting empirical example, five layers of SLPC support for five different target displays of enhanced dynamic ranges (EDRs) are supported by composer metadata of five levels. These target displays support maximum or peak luminance values of 400 nits, 700 nits, 1000 nits, 2000 nits and 4000 nits, respectively. SDR images with a spatial resolution of 1920×1080 pixels in a gamma-based Rec. 709 color space are encoded with the composer metadata of the five levels in a full version of a coded bitstream (with less than the full version used to support target displays below the maximum luminance target display). The composer metadata of the five levels can be generated based on five sets of reference target images of the EDRs for the three target displays, obtained based on machine learning using a training dataset, etc. In some embodiments, the five sets of reference target images may comprise images of the same spatial resolution of 1920×1080 pixels in a PQ P3 color space. The composer metadata of the five levels comprises (e.g., zero-th order, first-order, second-order, third-order, etc.) MMR coefficients. In the present example, different layers of SLPC support may or may not use different orders of MMR coefficients. More specifically, the composer metadata of the first level in the composer metadata of the five levels comprises eight (8 or indexes 1 through 8) zero-th and first-order MMR coefficients as indexed by eight index values in a first MMR coefficient index partition $\Omega_1 = \{1, \ldots, 8\}$. The composer metadata of the second level in the composer metadata of the three levels comprises three (3 or indexes 9 through 11) second-order MMR coefficients as indexed by three index values in a second MMR coefficient index partition $\Omega_2 = \{9,10,11\}$. The composer metadata of the third level in the composer metadata of the five levels comprises four (4 or indexes 12 through 15) second-order MMR coefficients as indexed by four index values in a third MMR coefficient index partition $\Omega_3 = \{12,13,14,15\}$. The composer metadata of the fourth level in the composer metadata of the five levels comprises three (3 or indexes 16 through 18) third-order MMR coefficients as indexed by three index values in a fourth MMR coefficient index partition $\Omega_4 = \{16,17,18\}$. The composer metadata of the fifth level in the composer metadata of the five levels comprises four (4 or indexes 19 through 22) third-order MMR coefficients as indexed by four index values in a fifth MMR coefficient index partition $\Omega_5 = \{19, 20, 21, 22\}$.

Weighting in Composer Metadata Generation

In some embodiments, if there are some layers of SLPC support (for some target displays) having higher fidelity preferences, different weighting can be assigned to different layers during the optimization procedure.

Denote $w_Y^k$ and $w_C^k$ as the weighting factor for luma and chroma at the $k^{th}$ layer of support for the k-th target display among the H target displays.

The luma optimization problem can be formulated as follows:

$$\min_{m_p^H} \sum_{k=0}^{H} w_Y^k \cdot \|L_p^k - \hat{L}_p^k\|^2 \qquad (77)$$

The optimal solution can be solved based at least in part on the weighting matrix, $W_p^Y$, which may comprise (e.g., only, etc.) diagonal matrix elements, as follows:

$$m_p^{H,optW} = ((A_p)^T W_p^Y A_p)^{-1}((A_p)^T W_p^Y L_p) \qquad (78)$$

The chroma optimization problem can be formulated as follows:

$$\text{for channel } c0: \min_{u^{c0}} \sum_{k=1}^{H} w_C^k \cdot \|v^{k,c0} - \hat{v}^{k,c0}\|^2 \qquad (79\text{-}1)$$

$$\text{for channel } c1: \min_{u^{c1}} \sum_{k=1}^{H} w_C^k \cdot \|v^{k,c1} - \hat{v}^{k,c1}\|^2 \qquad (79\text{-}2)$$

The optimal solution can be solved based at least in part on the weighting matrix, $W^C$, which may comprise (e.g., only, etc.) diagonal matrix elements, as follows:

$$u^{c0,opt} = ((G)^T W^C G)^{-1}((G)^T W^C V^{c0}) \qquad (80\text{-}1)$$

$$u^{c1,opt} = ((G)^T W^C G)^{-1}((G)^T W^C V^{c1}) \qquad (80\text{-}2)$$

In summary, SLPC techniques and codec architecture as described herein can be implemented to support progressive coding for composer metadata used in constructing target images for a variety of target displays to be supported concurrently by an upstream video encoder. By partitioning the composer metadata (e.g., polynomial coefficients, MMR coefficients, etc.) into composer metadata of multiple levels (or multiple groups), the composer metadata of multiple levels can support adapting to or exploiting/accommodating an increasing overall range of display capabilities in an increasing number of target displays by encoding or decoding the composer metadata up to increasing levels in the plurality of levels. In other words, these techniques can be used to provide encoding a single overall coded bitstream for all the supported target displays and decoding (and even retrieving) specific portions of the single overall coded bitstream in multiple different ways to adapt to or exploit/accommodate different (e.g., HDR related, etc.) capabilities of end-user display devices. These techniques support progressive coding of composer image data for both luma and chroma channels. Additionally, optionally or alternative, these techniques can support real-time luma intensity modulation for chroma channels, for example, in a real-time video application, a near-real-time video application, an interactive video/gaming application, a live broadcast, and so forth. The composer metadata can be encoded in existing metadata fields, existing metadata containers, existing metadata coding syntaxes or syntax elements, and so forth, as well as in new metadata fields, new metadata containers, new metadata coding syntaxes or syntax elements, and so forth.

Example Process Flows

Figure 4A:
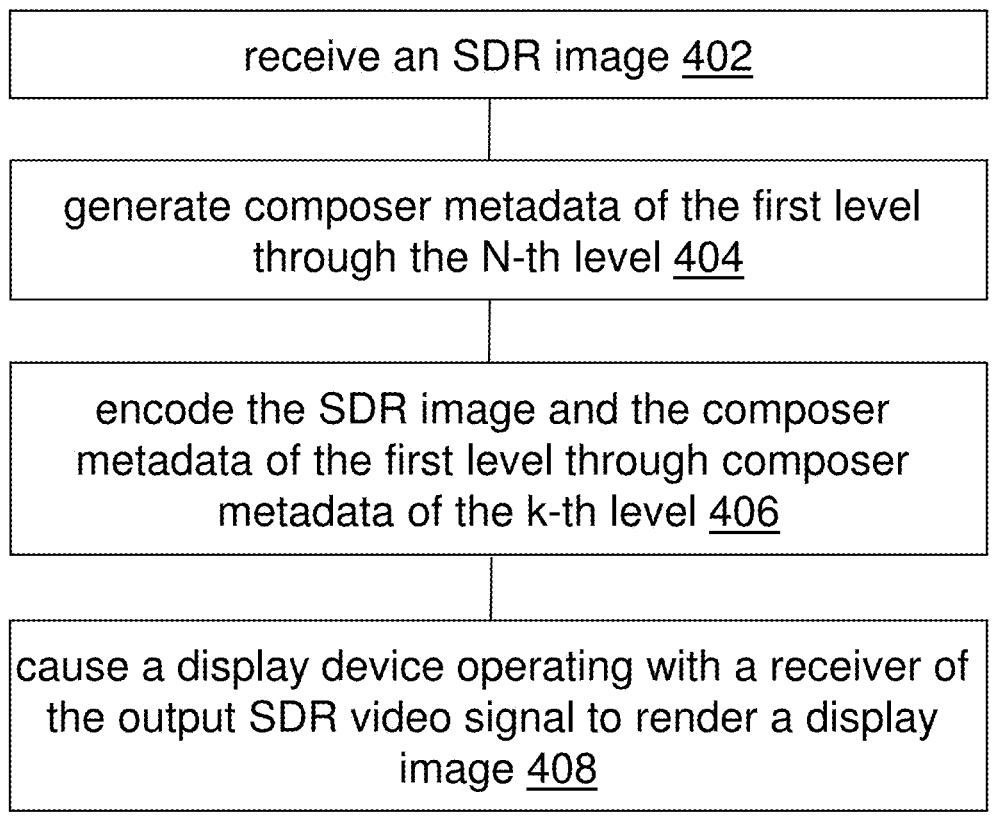
FIG. 4A and FIG. 4B illustrate example process flows.

FIG. 4A illustrates an example process flow according to an embodiment of the present invention. In some embodiments, one or more computing devices or components (e.g., an encoding device/module, a transcoding device/module, a decoding device/module, an inverse tone mapping device/module, a tone mapping device/module, a media device/module, etc.) may perform this process flow. In block 402, an image processing device (e.g., coding block (120), etc.) receives a standard dynamic range (SDR) image.

In block 404, the image processing device generates composer metadata of the first level through composer metadata of the N-th level, where N is a positive integer greater than one (1).

Composer metadata of the i-th level in the composer metadata of the first level through the composer metadata of the N-th level is generated jointly (concurrently) or sequentially (e.g., no later than, etc.) with composer metadata of the j-th level in the composer metadata of the first level through the composer metadata of the N-th level, where $1<=i<j<=N$. The composer metadata of the j-th level is generated dependent and based on the composer metadata of the first level through composer metadata of (j−1)-th level, where i and j are positive integers.

The composer metadata of the first level through the composer metadata of the i-th level in the composer metadata of the first level through the composer metadata of the N-th level is to be used for mapping the SDR image to the i-th target image specifically optimized for the i-th reference target display in N different reference target displays.

The composer metadata of the first level through the composer metadata of the j-th level in the composer metadata of the first level through the composer metadata of the N-th level is to be used for mapping the SDR image to the j-th target image specifically optimized for the j-th reference target display in the N different reference target displays.

In block 406, the image processing device encodes the SDR image and the composer metadata of the first level through composer metadata of the k-th level in the composer metadata of the first level through the composer metadata of the N-th level in an output SDR video signal, where $1<=k<=N$, where k is a positive integer. The composer metadata of the first level through the composer metadata of the k-th level is progressively encoded from the first level to the k-th level.

In block 408, the image processing device causes a display device operating with a receiver of the output SDR video signal to render a display image. The display image is derived from a composed target image composed from the SDR image based on the composer metadata of the first level through the composer metadata of the k-th level in the output SDR video signal.

In an embodiment, the SDR image is in a sequence of SDR images that are encoded in the output SDR video signal.

In an embodiment, the composer metadata of the first level through the composer metadata of the k-th level specifies one or more backward reshaping mappings for the receiver to backward reshape SDR luma and chroma codewords in the SDR image into target luma and chroma codewords for the k-th reference target display of a dynamic range different from a dynamic range of an SDR display.

In an embodiment, at least one of the one or more backward reshaping mappings represents one of: a multi-piece polynomial, a multi-channel multiple regression (MMR) matrix based mapping, a backward reshaping curve, a backward reshaping function, a parametrized mapping function, a backward lookup table (BLUT), etc.

In an embodiment, the composer metadata of the k-th level comprises one or more coefficients trained based at least in part on a plurality of SDR-image-to-target-image pairs in a training database, the plurality of SDR-image-to-target-image pairs comprising a plurality of SDR images and the plurality of SDR-image-to-target-image pairs comprising a plurality of target images, for the k-th reference target display, that corresponds to the plurality of SDR images.

In an embodiment, the SDR image is transmitted from an upstream video encoder to the receiver in one of: a real-time video application, a near-real-time video application, an interactive video application, a live broadcast, etc.

In an embodiment, the foregoing steps are performed by an upstream video encoder that receives a request for composing target images for the k-th reference target display from the receiver. The k-th reference target display is determined based on a peak luminance value supported by the device display with which the receiver operates.

In an embodiment, the receiver represents one of: a set-top box, a media source device, a smart television, a Blu ray player, a media streaming client, etc.

In an embodiment, the composed target image composed from the SDR image based on the composer metadata of the first level through the composer metadata of the k-th level is rendered as the display image by the display device with which the receiver operates.

In an embodiment, the display image rendered by the display device with which the receiver operates is derived by performing display management (DM) operations on the composed target image composed from the SDR image based on the composer metadata of the first level through the composer metadata of the k-th level is rendered as the display image by the display device with which the receiver operates.

In an embodiment, the (DM) operations are performed, based on DM metadata for the k-th reference target display, on the composed target image. The DM metadata is generated by an upstream video encoder and transmitted with the SDR images in the output SDR video signal from the upstream video encoder to the receiver.

In an embodiment, at least one of the SDR image or the composed target image is represented in one of: an IPT PQ (ICtCp) color space, an YCbCr color space, an RGB color space, a Rec. 2020 color space, a Rec. 709 color space, an extended dynamic range (EDR) color space, a PQ color space, a gamma color space, a hybrid log gamma color space, a high-dynamic range 10 (HDR10) color space, an SDR color space, etc.

In an embodiment, the SDR image is of a bit depth of one of 8, 9 or 10+ bits.

In an embodiment, the SDR image is received in an input SDR video signal that is of a same bit depth as the output SDR video signal.

In an embodiment, the SDR image is tone-mapped from a high dynamic range (HDR) image received in an input HDR video signal that is of a different bit depth as the output SDR video signal.

In an embodiment, the SDR image is created based a video professional's artistic intent.

In an embodiment, the plurality of target displays comprise target displays of peak luminance of 400 nits, 700 nits, 1000 nits, 2000 nits, 4000 nits, and 10000 or more nits.

In an embodiment, composer metadata of any two different levels comprises no coefficients of the same order.

In an embodiment, composer metadata of at least two different levels comprises coefficients of the same order.

In an embodiment, the composer metadata of the first level through the composer metadata of the N-th level is generated based on a plurality of different weighting factors applied to different reference target display in the N different reference target displays.

In an embodiment, the composer metadata of the first level through composer metadata of the k-th level is encoded consecutively encoded in the output SDR video signal.

In an embodiment, the composer metadata of the first level through composer metadata of the k-th level is encoded in the output SDR video signal in an order specified in signaling information encoded as a part of image metadata in the output SDR video signal.

In an embodiment, the composer metadata of the first level through the composer metadata of the i-th level comprises polynomial parameters fully specifying the i-th polynomial, among N different polynomials, for mapping SDR luma codewords in the SDR image into backward reshaped luma codewords of the i-th target image within the i-th dynamic range among the N different dynamic ranges; the composer metadata of the first level through the composer metadata of the j-th level comprises polynomial parameters fully specifying the j-th polynomial, among N different polynomials, for mapping SDR luma codewords in the SDR image into backward reshaped luma codewords of the j-th target image within the j-th dynamic range among the N different dynamic ranges; the polynomial parameters fully specifying the j-th polynomial comprises polynomial parameters in composer metadata of the (i+1)-th level through the composer metadata of the j-th level in combination with all of the polynomial parameters fully specifying the i-th polynomial.

In an embodiment, the N different polynomials are concurrently (jointly, e.g., in parallel) generated; the polynomial parameters in composer metadata of the (i+1)-th level through the composer metadata of the j-th level—which are in the j-th polynomial but not in the i-th polynomial—are generated concurrently (jointly) with all of the polynomial parameters fully specifying the i-th polynomial by minimizing concurrently (a) errors between the backward reshaped luma codewords of the i-th target image and reference luma codewords of the i-th reference target image of N different reference target images and (b) errors between the backward reshaped luma codewords of the j-th target image and reference luma codewords of the j-th reference target image of the N different reference target images.

In an embodiment, the N different polynomials are sequentially generated from the first polynomial to the N-th polynomial in the N different polynomials; the polynomial parameters in composer metadata of the (i+1)-th level through the composer metadata of the j-th level—which are in the j-th polynomial but not in the i-th polynomial—are generated by minimizing errors between the backward reshaped luma codewords of the j-th target image and reference luma codewords of the j-th reference target image of N different reference target images after polynomial parameters in the composer metadata of the i-th level are generated by minimizing errors between the backward reshaped luma codewords of the i-th target image and reference luma codewords of the i-th reference target image of the N different reference target images.

In an embodiment, the composer metadata of the first level through the composer metadata of the i-th level comprises MMR coefficients fully specifying the i-th MMR mapping, among N different MMR mappings, for mapping SDR chroma codewords in the SDR image into backward reshaped chroma codewords of the i-th target image; the composer metadata of the first level through the composer metadata of the j-th level comprises MMR coefficients fully specifying the j-th MMR mapping, among N different MMR mappings, for mapping SDR chroma codewords in the SDR image into backward reshaped chroma codewords of the j-th target image; the MMR coefficients fully specifying the j-th MMR mapping comprises MMR coefficients in composer metadata of the (i+1)-th level through the composer metadata of the j-th level in combination with all of the MMR coefficients fully specifying the i-th MMR mapping.

In an embodiment, the N different MMR mappings are concurrently (jointly, e.g., in parallel) generated; the MMR coefficients in composer metadata of the (i+1)-th level through the composer metadata of the j-th level—which are in the j-th MMR mapping but not in the i-th MMR mapping—are generated concurrently (jointly) with all of the MMR coefficients fully specifying the i-th MMR mapping by minimizing concurrently (a) errors between the backward reshaped chroma codewords of the i-th target image and reference chroma codewords of the i-th reference target image of N different reference target images and (b) errors between the backward reshaped chroma codewords of the j-th target image and reference chroma codewords of the j-th reference target image of the N different reference target images.

In an embodiment, the N different MMR mappings are sequentially generated from the first MMR mapping to the N-th MMR mapping in the N different MMR mappings; the MMR coefficients in composer metadata of the (i+1)-th level through the composer metadata of the j-th level—which are in the j-th MMR mapping but not in the i-th MMR mapping—are generated by minimizing errors between the backward reshaped chroma codewords of the j-th target image and reference target chroma codewords of the j-th reference target image of N different reference target images after MMR coefficients in the composer metadata of the i-th level are generated by minimizing errors between the backward reshaped chroma codewords of the i-th target image and reference target chroma codewords of the i-th reference target image of the N different reference target images.

Figure 4B:
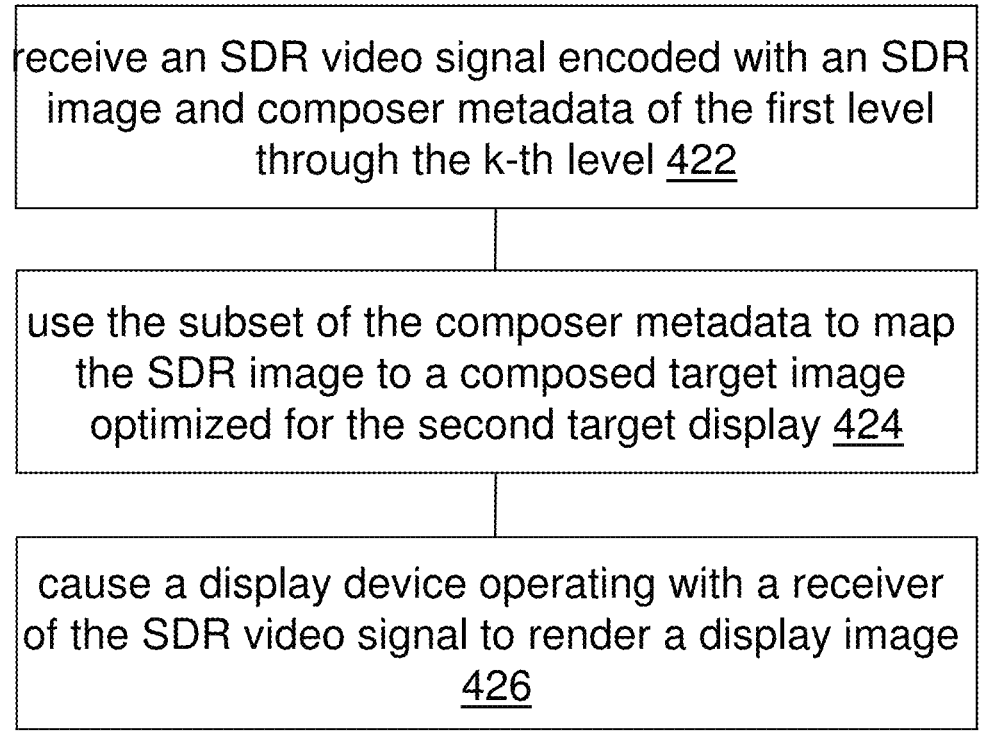

FIG. 4B illustrates an example process flow according to an embodiment of the present invention. In some embodiments, one or more computing devices or components (e.g., an encoding device/module, a transcoding device/module, a decoding device/module, an inverse tone mapping device/module, a tone mapping device/module, a media device/module, etc.) may perform this process flow. In block 422, an image processing device (e.g., decoding block (130), etc.) receives a standard dynamic range (SDR) video signal that is encoded with an SDR image and composer metadata of the first level through composer metadata of the k-th level in the composer metadata of the first level through composer metadata of the N-th level, where N is a positive integer greater than one (1), where 1<=k<=N, where k is a positive integer. The composer metadata of the first level through the composer metadata of the k-th level is progressively encoded from the first level to the k-th level.

The composer metadata of the first level through the composer metadata of the N-th level was generated by an upstream video encoder.

Composer metadata of the i-th level in the composer metadata of the first level through the composer metadata of the N-th level was generated by the upstream video encoder jointly (concurrently, e.g., in parallel) or sequentially with (e.g., no later than, etc.) composer metadata of the j-th level in the composer metadata of the first level through the composer metadata of the N-th level, where 1<=i<j<=N, where i and j are positive integers. The composer metadata of the j-th level was generated by the upstream video encoder dependent and based on the composer metadata of the first level through composer metadata of (j−1)-th level.

The composer metadata of the first level through the composer metadata of the i-th level in the composer metadata of the first level through composer metadata of the N-th level is to be used for mapping the SDR image to the i-th target image specifically optimized for the i-th reference target display in N different reference target displays.

The composer metadata of the first level through the composer metadata of the j-th level in the composer metadata of the first level through composer metadata of the N-th level is to be used for mapping the SDR image to the j-th target image specifically optimized for the j-th reference target display in the N different reference target displays.

In block 424, the image processing device uses the composer metadata of the first level through the composer metadata of the k-th level to map the SDR image to a composed target image optimized for the k-th reference target display in the N different reference target displays.

In block 426, the image processing device causes a display device operating with a receiver of the SDR video signal to render a display image. The display image is derived from a composed target image composed from the SDR image based on the composer metadata of the first level through composer metadata of the k-th level in the SDR video signal.

In an embodiment, the k-th reference target display is selected by the receiver.

In an embodiment, information for determining the k-th reference target display is indicated by the receiver to an upstream video encoder in a request for retrieving media content that includes the SDR image.

In an embodiment, the composer metadata of the first level through the composer metadata of the k-th level is carried in the SDR video signal as image metadata separate from the SDR image.

In an embodiment, the image processing device is further configured to perform color space conversion on the composed target image.

In an embodiment, the display image rendered by the display device is derived from the composes target image without performing display management operations.

In an embodiment, the image processing device is further configured to perform: extracting display management (DM) metadata from the SDR video signal; applying DM operations on the composed target image as a part of generating the display image from the composed EDR image.

In an embodiment, the composer metadata of the first level through the composer metadata of the k-th level specifies one or more backward reshaping mappings to backward reshape SDR luma and chroma codewords in the SDR image into target luma and chroma codewords for the k-th reference target display of a dynamic range different from a dynamic range of an SDR display; and the image processing device is further configured to perform smoothening operation on at least one of the one or more backward reshaping mappings.

In an embodiment, a computing device such as a display device, a mobile device, a set-top box, a multimedia device, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Note that, although separate embodiments are discussed herein, any combination of embodiments and/or partial embodiments discussed herein may be combined to form further embodiments.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the adaptive perceptual quantization of images with enhanced dynamic range, such as those described herein. The computer and/or IC may compute any of a variety of parameters or values that relate to the adaptive perceptual quantization processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to adaptive perceptual quantization of HDR images as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
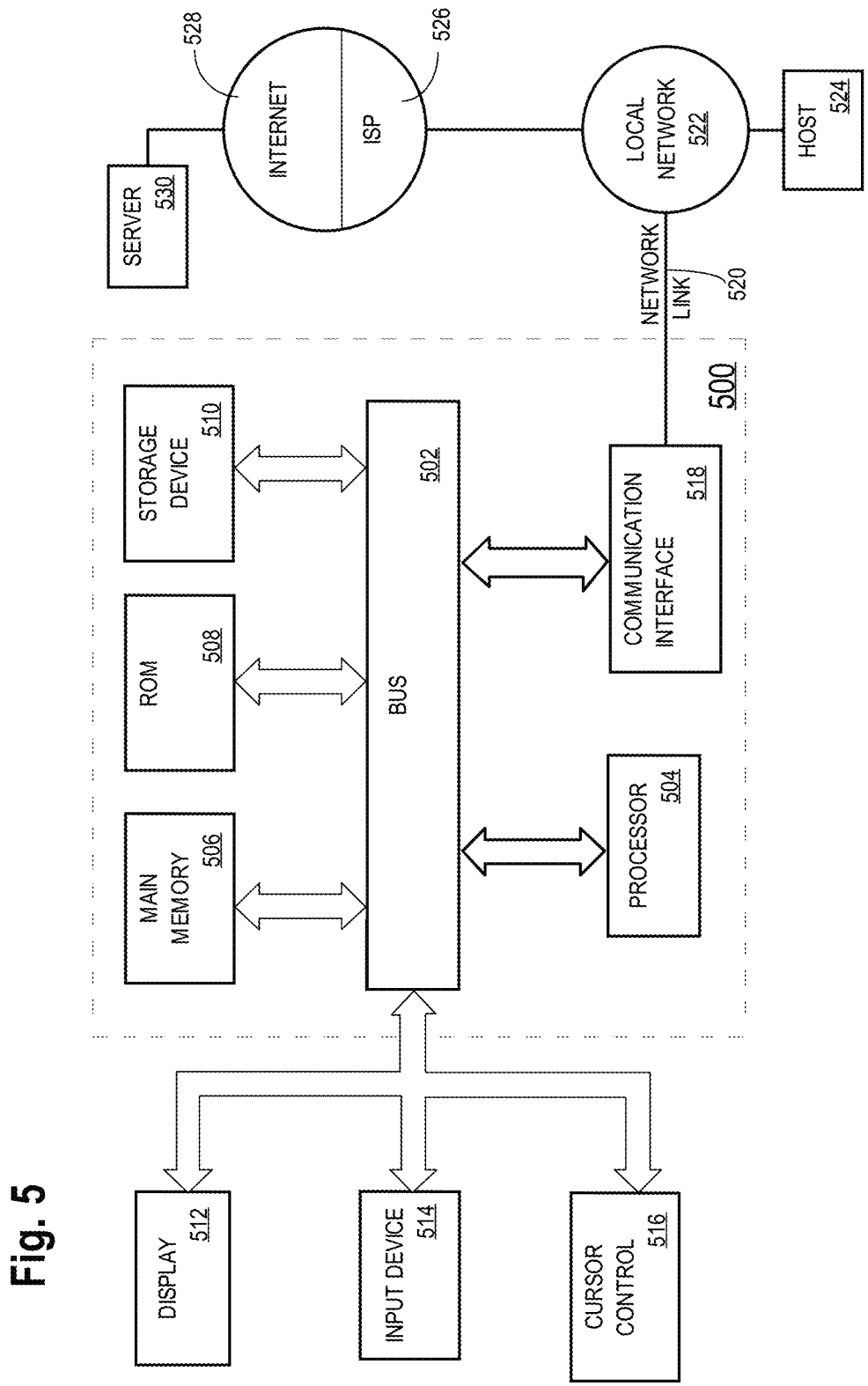
FIG. 5 illustrates a simplified block diagram of an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques as described herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

EQUIVALENTS, EXTENSIONS, ALTERNATIVES AND MISCELLANEOUS

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

ENUMERATED EXEMPLARY EMBODIMENTS

The invention may be embodied in any of the forms described herein, including, but not limited to the following Enumerated Example Embodiments (EEEs) which describe structure, features, and functionality of some portions of the present invention, which are not claims.

EEE1. A method comprising:
receiving a standard dynamic range (SDR) image;
generating composer metadata of the first level through composer metadata of the N-th level, where N is a positive integer greater than one (1);
wherein composer metadata of the i-th level in the composer metadata of the first level through the composer metadata of the N-th level is generated jointly or sequentially with composer metadata of the j-th level in the composer metadata of the first level through the composer metadata of the N-th level, where $1<=i<j<=N$, and wherein the composer metadata of the j-th level is generated dependent and based on the composer metadata of the first level through composer metadata of (j−1)-th level, where i and j are positive integers;
wherein the composer metadata of the first level through the composer metadata of the i-th level in the composer metadata of the first level through the composer metadata of the N-th level is to be used for mapping the SDR image to the i-th target image specifically optimized for the i-th reference target display in N different reference target displays;
wherein the composer metadata of the first level through the composer metadata of the j-th level in the composer metadata of the first level through the composer metadata of the N-th level is to be used for mapping the SDR image to the j-th target image specifically optimized for the j-th reference target display in the N different reference target displays;
encoding the SDR image and the composer metadata of the first level through composer metadata of the k-th level in the composer metadata of the first level through the composer metadata of the N-th level in an output SDR video signal, where $1<=k<=N$, where k is a positive integer, wherein the composer metadata of the first level through the composer metadata of the k-th level is progressively encoded from the first level to the k-th level;
causing a display device operating with a receiver of the output SDR video signal to render a display image, wherein the display image is derived from a composed target image composed from the SDR image based on the composer metadata of the first level through the composer metadata of the k-th level in the output SDR video signal.

EEE2. The method of EEE1, wherein the SDR image is in a sequence of SDR images that are encoded in the output SDR video signal.

EEE3. The method of any preceding EEE, wherein the composer metadata of the first level through the composer metadata of the k-th level specifies one or more backward reshaping mappings for the receiver to backward reshape SDR luma and chroma codewords in the SDR image into target luma and chroma codewords for the k-th reference target display of a dynamic range different from a dynamic range of an SDR display.

EEE4. The method of EEE3, wherein at least one of the one or more backward reshaping mappings represents one of: a multi-piece polynomial, a multi-channel multiple regression (MMR) matrix based mapping, a backward reshaping curve, a backward reshaping function, a parametrized mapping function, or a backward lookup table (BLUT).

EEE5. The method of any preceding EEE, wherein the composer metadata of the k-th level comprises one or more coefficients trained based at least in part on a plurality of SDR-image-to-target-image pairs in a training database, the plurality of SDR-image-to-target-image pairs comprising a plurality of SDR images, and the plurality of SDR-image-to-target-image pairs comprising a plurality of target images, for the k-th reference target display, that corresponds to the plurality of SDR images.

EEE6. The method of EEE5, wherein the SDR image is transmitted from an upstream video encoder to the receiver in one of: a real-time video application, a near-real-time video application, an interactive video application, or a live broadcast.

EEE7. The method of any preceding EEE, wherein the method is performed by an upstream video encoder that receives a request for composing target images for the k-th reference target display from the receiver, and wherein the k-th reference target display is determined based on a peak luminance value supported by the device display with which the receiver operates.

EEE8. The method of any preceding EEE, wherein the receiver represents one of: a set-top box, a media source device, a smart television, a Blu ray player, or a media streaming client.

EEE9. The method of any preceding EEE, wherein the composed target image composed from the SDR image based on the composer metadata of the first level through the composer metadata of the k-th level is rendered as the display image by the display device with which the receiver operates.

EEE10. The method of any preceding EEE, wherein the display image rendered by the display device with which the receiver operates is derived by performing display management (DM) operations on the composed target image composed from the SDR image based on the composer metadata of the first level through the composer metadata of the k-th level is rendered as the display image by the display device with which the receiver operates.

EEE11. The method of EEE10, wherein the (DM) operations are performed, based on DM metadata for the k-th reference target display, on the composed target image, and wherein the DM metadata is generated by an upstream video encoder and transmitted with the SDR images in the output SDR video signal from the upstream video encoder to the receiver.

EEE12. The method of any preceding EEE, wherein at least one of the SDR image or the composed target image is represented in one of: an IPT PQ (ICtCp) color space, an YCbCr color space, an RGB color space, a Rec. 2020 color space, a Rec. 709 color space, an extended dynamic range (EDR) color space, a PQ color space, a gamma color space, a hybrid log gamma color space, a high-dynamic range 10 (HDR10) color space, or an SDR color space.

EEE 3. The method of any preceding EEE, wherein the SDR image is of a bit depth of one of 8, 9 or 10+ bits.

EEE14. The method of any preceding EEE, wherein the SDR image is received in an input SDR video signal that is of a same bit depth as the output SDR video signal.

EEE15. The method of any preceding EEE, wherein the SDR image is tone-mapped from a high dynamic range (HDR) image received in an input HDR video signal that is of a different bit depth as the output SDR video signal.

EEE16. The method of any preceding EEE, wherein the SDR image is created based a video professional's artistic intent.

EEE17. The method of any preceding EEE, wherein the plurality of target displays comprise target displays of peak luminance of 400 nits, 700 nits, 1000 nits, 2000 nits, 4000 nits, and 10000 or more nits.

EEE18. The method of any preceding EEE, wherein composer metadata of any two different levels comprises no coefficients of the same order.

EEE19. The method of any preceding EEE, wherein composer metadata of at least two different levels comprises coefficients of the same order.

EEE20. The method of any preceding EEE, wherein the composer metadata of the first level through the composer metadata of the N-th level is generated based on a plurality of different weighting factors applied to different reference target display in the N different reference target displays.

EEE21. The method of any preceding EEE, wherein the composer metadata of the first level through composer metadata of the k-th level is encoded consecutively encoded in the output SDR video signal.

EEE22. The method of any preceding EEE, wherein the composer metadata of the first level through composer metadata of the k-th level is encoded in the output SDR video signal in an order specified in signaling information encoded as a part of image metadata in the output SDR video signal.

EEE23. The method of any preceding EEE, wherein the composer metadata of the first level through the composer metadata of the i-th level comprises polynomial parameters fully specifying the i-th polynomial, among N different polynomials, for mapping SDR luma codewords in the SDR image into backward reshaped luma codewords of the i-th target image within the i-th dynamic range among the N different dynamic ranges; wherein the composer metadata of the first level through the composer metadata of the j-th level comprises polynomial parameters fully specifying the j-th polynomial, among N different polynomials, for mapping SDR luma codewords in the SDR image into backward reshaped luma codewords of the j-th target image within the j-th dynamic range among the N different dynamic ranges; wherein the polynomial parameters fully specifying the j-th polynomial comprises polynomial parameters in composer metadata of the (i+1)-th level through the composer metadata of the j-th level in combination with all of the polynomial parameters fully specifying the i-th polynomial.

EEE24. The method of EEE23, wherein the N different polynomials are concurrently generated; wherein the polynomial parameters in composer metadata of the (i+1)-th level through the composer metadata of the j-th level—which are in the j-th polynomial but not in the i-th polynomial—are generated concurrently with all of the polynomial parameters fully specifying the i-th polynomial by minimizing concurrently (a) errors between the backward reshaped luma codewords of the i-th target image and reference luma codewords of the i-th reference target image of N different reference target images and (b) errors between the backward reshaped luma codewords of the j-th target image and reference luma codewords of the j-th reference target image of the N different reference target images.

EEE25. The method of EEE23, wherein the N different polynomials are sequentially generated from the first polynomial to the N-th polynomial in the N different polynomials; wherein the polynomial parameters in composer metadata of the (i+1)-th level through the composer metadata of the j-th level—which are in the j-th polynomial but not in the i-th polynomial—are generated by minimizing errors between the backward reshaped luma codewords of the j-th target image and reference luma codewords of the j-th reference target image of N different reference target images after polynomial parameters in the composer metadata of the i-th level are generated by minimizing errors between the backward reshaped luma codewords of the i-th target image and reference luma codewords of the i-th reference target image of the N different reference target images.

EEE26. The method of any preceding EEE, wherein the composer metadata of the first level through the composer metadata of the i-th level comprises MMR coefficients fully specifying the i-th MMR mapping, among N different MMR mappings, for mapping SDR chroma codewords in the SDR image into backward reshaped chroma codewords of the i-th target image; wherein the composer metadata of the first level through the composer metadata of the j-th level comprises MMR coefficients fully specifying the j-th MMR mapping, among N different MMR mappings, for mapping SDR chroma codewords in the SDR image into backward reshaped chroma codewords of the j-th target image; wherein the MMR coefficients fully specifying the j-th MMR mapping comprises MMR coefficients in composer metadata of the (i+1)-th level through the composer metadata of the j-th level in combination with all of the MMR coefficients fully specifying the i-th MMR mapping.

EEE27. The method of EEE26, wherein the N different MMR mappings are concurrently generated; wherein the MMR coefficients in composer metadata of the (i+1)-th level through the composer metadata of the j-th level—which are in the j-th MMR mapping but not in the i-th MMR mapping are generated concurrently with all of the MMR coefficients fully specifying the i-th MMR mapping by minimizing concurrently (a) errors between the backward reshaped chroma codewords of the i-th target image and reference chroma codewords of the i-th reference target image of N different reference target images and (b) errors between the backward reshaped chroma codewords of the j-th target image and reference chroma codewords of the j-th reference target image of the N different reference target images.

EEE28. The method of EEE26, wherein the N different MMR mappings are sequentially generated from the first MMR mapping to the N-th MMR mapping in the N different MMR mappings; wherein the MMR coefficients in composer metadata of the (i+1)-th level through the composer metadata of the j-th level—which are in the j-th MMR mapping but not in the i-th MMR mapping are generated by minimizing errors between the backward reshaped chroma codewords of the j-th target image and reference target chroma codewords of the j-th reference target image of N different reference target images after MMR coefficients in the composer metadata of the i-th level are generated by minimizing errors between the backward reshaped chroma codewords of the i-th target image and reference target chroma codewords of the i-th reference target image of the N different reference target images.

EEE29. A method comprising:
receiving a standard dynamic range (SDR) video signal that is encoded with an SDR image and composer metadata of the first level through composer metadata of the k-th level in the composer metadata of the first level through composer metadata of the N-th level, where N is a positive integer greater than one (1), where $1<=k<=N$, where k is a positive integer, wherein the composer metadata of the first level through the composer metadata of the k-th level is progressively encoded from the first level to the k-th level;
wherein the composer metadata of the first level through the composer metadata of the N-th level was generated by an upstream video encoder;
wherein composer metadata of the i-th level in the composer metadata of the first level through the composer metadata of the N-th level was generated by the upstream video encoder jointly or sequentially with composer metadata of the j-th level in the composer metadata of the first level through the composer metadata of the N-th level, where $1<=i<j<=N$, where i and j are positive integers, and wherein the composer metadata of the j-th level was generated by the upstream video encoder dependent and based on the composer metadata of the first level through composer metadata of (j−1)-th level;
wherein the composer metadata of the first level through the composer metadata of the i-th level in the composer metadata of the first level through composer metadata of the N-th level is to be used for mapping the SDR image to the i-th target image specifically optimized for the i-th reference target display in N different reference target displays;
wherein the composer metadata of the first level through the composer metadata of the j-th level in the composer metadata of the first level through composer metadata of the N-th level is to be used for mapping the SDR image to the j-th target image specifically optimized for the j-th reference target display in the N different reference target displays;
using the composer metadata of the first level through the composer metadata of the k-th level to map the SDR image to a composed target image optimized for the k-th reference target display in the N different reference target displays;
causing a display device operating with a receiver of the SDR video signal to render a display image, wherein the display image is derived from a composed target image composed from the SDR image based on the composer metadata of the first level through composer metadata of the k-th level in the SDR video signal.

EEE30. The method of EEE29, wherein the k-th reference target display is selected by the receiver.

EEE31. The method of EEE29 or EEE30, wherein information for determining the k-th reference target display is indicated by the receiver to an upstream video encoder in a request for retrieving media content that includes the SDR image.

EEE32. The method of any one of EEE29 to EEE31, wherein the composer metadata of the first level through the composer metadata of the k-th level is carried in the SDR video signal as image metadata separate from the SDR image.

EEE33. The method of any one of EEE29 to EEE32, further comprising performing color space conversion on the composed target image.

EEE34. The method of any one of EEE29 to EEE33, wherein the display image rendered by the display device is derived from the composes target image without performing display management operations.

EEE35. The method of any one of EEE29 to EEE34, further comprising:
extracting display management (DM) metadata from the SDR video signal;
applying DM operations on the composed target image as a part of generating the display image from the composed EDR image.

EEE36. The method of any one of EEE29 to EEE35, wherein the composer metadata of the first level through the composer metadata of the k-th level specifies one or more backward reshaping mappings to backward reshape SDR luma and chroma codewords in the SDR image into target luma and chroma codewords for the k-th reference target display of a dynamic range different from a dynamic range of an SDR display; and the method further comprising:
performing smoothening operation on at least one of the one or more backward reshaping mappings.

EEE37. A computer system configured to perform any one of the methods recited in EEEs 1-36.

EEE38. An apparatus comprising a processor and configured to perform any one of the methods recited in EEEs 1-36.

EEE39. A non-transitory computer-readable storage medium having stored thereon computer-executable instruction for executing a method in accordance with any of the EEEs 1-36.

The invention claimed is:
1. A method comprising:
receiving a standard dynamic range (SDR) image;
generating composer metadata of a first level through composer metadata of an N-th level, where N is a positive integer greater than one (1);
wherein composer metadata of an i-th level in the composer metadata of the first level through the composer metadata of the N-th level is generated jointly or sequentially with composer metadata of a j-th level in the composer metadata of the first level through the composer metadata of the N-th level, where $1<=i<j<=N$, and wherein the composer metadata of the j-th level is generated dependent and based on the composer metadata of the first level through composer metadata of (j−1)-th level, where i and j are positive integers;
wherein the composer metadata of the first level through the composer metadata of the i-th level in the composer metadata of the first level through the composer metadata of the N-th level is to be used for mapping the SDR image to the i-th target image specifically optimized for the i-th reference target display in N different reference target displays;
wherein the composer metadata of the first level through the composer metadata of the j-th level in the composer metadata of the first level through the composer metadata of the N-th level is to be used for mapping the SDR image to the j-th target image specifically optimized for the j-th reference target display in the N different reference target displays;

encoding the SDR image and the composer metadata of the first level through composer metadata of a k-th level in the composer metadata of the first level through the composer metadata of the N-th level in an output SDR video signal, where 1<=k<=N, where k is a positive integer, wherein the composer metadata of the first level through the composer metadata of the k-th level is progressively encoded from the first level to the k-th level;

causing a display device operating with a receiver of the output SDR video signal to render a display image, wherein the display image is derived from a composed target image composed from the SDR image based on the composer metadata of the first level through the composer metadata of the k-th level in the output SDR video signal.

2. The method of claim 1, wherein the SDR image is in a sequence of SDR images that are encoded in the output SDR video signal.

3. The method of claim 1, wherein the composer metadata of the first level through the composer metadata of the k-th level specifies one or more backward reshaping mappings for the receiver to backward reshape SDR luma and chroma codewords in the SDR image into target luma and chroma codewords for the k-th reference target display of a dynamic range different from a dynamic range of an SDR display.

4. The method of claim 3, wherein at least one of the one or more backward reshaping mappings represents one of: a multi-piece polynomial, a multi-channel multiple regression (MMR) matrix based mapping, a backward reshaping curve, a backward reshaping function, a parametrized mapping function, or a backward lookup table (BLUT).

5. The method of claim 1, wherein the composer metadata of the k-th level comprises one or more coefficients trained based at least in part on a plurality of SDR-image-to-target-image pairs in a training database, the plurality of SDR-image-to-target-image pairs comprising a plurality of SDR images, and the plurality of SDR-image-to-target-image pairs comprising a plurality of target images, for the k-th reference target display, that corresponds to the plurality of SDR images.

6. The method of claim 1, wherein the display image rendered by the display device with which the receiver operates is derived by performing display management (DM) operations on the composed target image composed from the SDR image based on the composer metadata of the first level through the composer metadata of the k-th level is rendered as the display image by the display device with which the receiver operates.

7. The method of claim 6, wherein the (DM) operations are performed, based on DM metadata for the k-th reference target display, on the composed target image, and wherein the DM metadata is generated by an upstream video encoder and transmitted with the SDR images in the output SDR video signal from the upstream video encoder to the receiver.

8. The method of claim 1, wherein at least one of the SDR image or the composed target image is represented in one of: an IPT PQ (ICtCp) color space, an YCbCr color space, an RGB color space, a Rec. 2020 color space, a Rec. 709 color space, an extended dynamic range (EDR) color space, a PQ color space, a gamma color space, a hybrid log gamma color space, a high-dynamic range 10 (HDR10) color space, or an SDR color space.

9. The method of claim 1, wherein the plurality of target displays comprise target displays of peak luminance of 400 nits, 700 nits, 1000 nits, 2000 nits, 4000 nits, and 10000 or more nits.

10. The method of claim 1, wherein the composer metadata of the first level through the composer metadata of the N-th level is generated based on a plurality of different weighting factors applied to different reference target display in the N different reference target displays.

11. The method of claim 1, wherein the composer metadata of the first level through composer metadata of the k-th level is encoded consecutively encoded in the output SDR video signal.

12. The method of claim 1, wherein the composer metadata of the first level through composer metadata of the k-th level is encoded in the output SDR video signal in an order specified in signaling information encoded as a part of image metadata in the output SDR video signal.

13. The method of claim 1, wherein the composer metadata of the first level through the composer metadata of the i-th level comprises polynomial parameters fully specifying the i-th polynomial, among N different polynomials, for mapping SDR luma codewords in the SDR image into backward reshaped luma codewords of the i-th target image within the i-th dynamic range among the N different dynamic ranges; wherein the composer metadata of the first level through the composer metadata of the j-th level comprises polynomial parameters fully specifying the j-th polynomial, among N different polynomials, for mapping SDR luma codewords in the SDR image into backward reshaped luma codewords of the j-th target image within the j-th dynamic range among the N different dynamic ranges; wherein the polynomial parameters fully specifying the j-th polynomial comprises polynomial parameters in composer metadata of the (i+1)-th level through the composer metadata of the j-th level in combination with all of the polynomial parameters fully specifying the i-th polynomial.

14. The method of claim 1, wherein the composer metadata of the first level through the composer metadata of the i-th level comprises MMR coefficients fully specifying the i-th MMR mapping, among N different MMR mappings, for mapping SDR chroma codewords in the SDR image into backward reshaped chroma codewords of the i-th target image; wherein the composer metadata of the first level through the composer metadata of the j-th level comprises MMR coefficients fully specifying the j-th MMR mapping, among N different MMR mappings, for mapping SDR chroma codewords in the SDR image into backward reshaped chroma codewords of the j-th target image; wherein the MMR coefficients fully specifying the j-th MMR mapping comprises MMR coefficients in composer metadata of the (i+1)-th level through the composer metadata of the j-th level in combination with all of the MMR coefficients fully specifying the i-th MMR mapping.

15. A method comprising:

receiving a standard dynamic range (SDR) video signal that is encoded with an SDR image and composer metadata of a first level through composer metadata of a k-th level in the composer metadata of the first level through composer metadata of an N-th level, where N is a positive integer greater than one (1), where 1<=k<=N, where k is a positive integer, wherein the composer metadata of the first level through the composer metadata of the k-th level is progressively encoded from the first level to the k-th level;

wherein the composer metadata of the first level through the composer metadata of the N-th level was generated by an upstream video encoder;

wherein composer metadata of an i-th level in the composer metadata of the first level through the composer metadata of the N-th level was generated by the upstream video encoder jointly or sequentially with composer metadata of a j-th level in the composer metadata of the first level through the composer metadata of the N-th level, where $1<=i<j<=N$, where i and j are positive integers, and wherein the composer metadata of the j-th level was generated by the upstream video encoder dependent and based on the composer metadata of the first level through composer metadata of (j−1)-th level;

wherein the composer metadata of the first level through the composer metadata of the i-th level in the composer metadata of the first level through composer metadata of the N-th level is to be used for mapping the SDR image to the i-th target image specifically optimized for the i-th reference target display in N different reference target displays;

wherein the composer metadata of the first level through the composer metadata of the j-th level in the composer metadata of the first level through composer metadata of the N-th level is to be used for mapping the SDR image to the j-th target image specifically optimized for the j-th reference target display in the N different reference target displays;

using the composer metadata of the first level through the composer metadata of the k-th level to map the SDR image to a composed target image optimized for the k-th reference target display in the N different reference target displays;

causing a display device operating with a receiver of the SDR video signal to render a display image, wherein the display image is derived from a composed target image composed from the SDR image based on the composer metadata of the first level through composer metadata of the k-th level in the SDR video signal.

16. The method of claim 15, wherein the k-th reference target display is selected by the receiver.

17. The method of claim 15, wherein information for determining the k-th reference target display is indicated by the receiver to an upstream video encoder in a request for retrieving media content that includes the SDR image.

18. The method of claim 15, wherein the composer metadata of the first level through the composer metadata of the k-th level is carried in the SDR video signal as image metadata separate from the SDR image.

19. The method of claim 15, further comprising:
extracting display management (DM) metadata from the SDR video signal;
applying DM operations on the composed target image as a part of deriving the display image from the composed target image.

20. A non-transitory computer-readable storage medium having stored thereon computer-executable instruction for executing a method with one or more processors in accordance with claim 1.

* * * * *